United States Patent
Uchimura

(10) Patent No.: US 8,848,037 B2
(45) Date of Patent: Sep. 30, 2014

(54) DATA STRUCTURE, RECORDING MEDIUM, PLAYING DEVICE AND PLAYING METHOD, AND PROGRAM

(75) Inventor: Kouichi Uchimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 401 days.

(21) Appl. No.: 12/996,958

(22) PCT Filed: Apr. 9, 2010

(86) PCT No.: PCT/JP2010/056419
§ 371 (c)(1),
(2), (4) Date: Dec. 8, 2010

(87) PCT Pub. No.: WO2010/119815
PCT Pub. Date: Oct. 21, 2010

(65) Prior Publication Data
US 2011/0090312 A1    Apr. 21, 2011

(30) Foreign Application Priority Data

Apr. 15, 2009 (JP) ................................ 2009-099413
Mar. 18, 2010 (JP) ................................ 2010-063056

(51) Int. Cl.
*H04N 13/02* (2006.01)
*H04N 13/04* (2006.01)
(Continued)

(52) U.S. Cl.
CPC ........... *H04N 9/8233* (2013.01); *H04N 9/8227* (2013.01); *H04N 5/85* (2013.01); *H04N 21/431* (2013.01); *H04N 13/0066* (2013.01); *H04N 21/4884* (2013.01); *G11B 27/3027* (2013.01); *H04N 9/8205* (2013.01); *G11B 27/329* (2013.01); *H04N 21/4325* (2013.01); *H04N 13/0048* (2013.01); *H04N 13/0011* (2013.01); *H04N 13/0055* (2013.01); *H04N 13/007* (2013.01); *H04N 21/42646* (2013.01)
USPC ............................................. 348/43; 348/51

(58) Field of Classification Search
CPC ... H04N 13/04; H04N 13/02; H04N 13/0048; H04N 13/0055; H04N 13/007
USPC ............................... 386/353, 236; 348/43, 51
See application file for complete search history.

(56) References Cited

U.S. PATENT DOCUMENTS 7,991,262 B2 *   8/2011   Ogawa et al. .................. 386/223
7,991,263 B2 *   8/2011   Ogawa et al. .................. 386/223
(Continued)

FOREIGN PATENT DOCUMENTS

JP    2004-274125 A    9/2004
JP    2006-506868      2/2006
(Continued)

OTHER PUBLICATIONS

Office Action issued Feb. 16, 2012 in Japanese Patent Application No. 2012-013642.

*Primary Examiner* — Christopher S Kelley
*Assistant Examiner* — Deirdre Beasley
(74) *Attorney, Agent, or Firm* — Oblon, Spivak, McClelland, Maier & Neustadt, L.L.P.

(57) ABSTRACT

The present invention relates to a data structure, a recording medium, a playing device and a playing method, and a program, which enable providing of a video format for 3D display, suitable for 3D display of subtitles and menu buttons. Subtitle data for the left eye and subtitle data for the right eye which are used for 3D display of subtitles is recorded in a disc 501 in increments of epochs. The structures of epochs of subtitle data for the left eye and subtitle data for the right eye to be played simultaneously are the same. That is to say, the number of display sets making up an epoch of subtitle data for the left eye, and the number of display sets making up an epoch of subtitle data for the right eye, that are to be played simultaneously, are the same. The present invention can be applied to a disc for 3D display.

3 Claims, 83 Drawing Sheets

(51) Int. Cl.
*H04N 9/82* (2006.01)
*H04N 21/431* (2011.01)
*H04N 13/00* (2006.01)
*H04N 21/488* (2011.01)
*G11B 27/30* (2006.01)
*G11B 27/32* (2006.01)
*H04N 21/432* (2011.01)
*H04N 21/426* (2011.01)
*H04N 5/85* (2006.01)

(56) References Cited

U.S. PATENT DOCUMENTS

| | | | |
|---|---|---|---|
| 7,991,264 B2* | 8/2011 | Ogawa et al. | 386/223 |
| 8,050,533 B2* | 11/2011 | Ogawa et al. | 386/223 |
| 8,089,507 B2* | 1/2012 | Ikeda et al. | 348/43 |
| 8,265,453 B2* | 9/2012 | Okubo et al. | 386/241 |
| 8,369,690 B2* | 2/2013 | McCrossan et al. | 386/324 |
| 2012/0014665 A1* | 1/2012 | Ogawa et al. | 386/248 |

FOREIGN PATENT DOCUMENTS

| | | |
|---|---|---|
| JP | 2008-90627 | 4/2008 |
| JP | 2009-135686 | 6/2009 |
| JP | 2010-510558 | 4/2010 |
| JP | 4588120 | 9/2010 |
| WO | WO 2008-044191 A2 | 4/2008 |
| WO | WO 2010-058546 A1 | 5/2010 |

* cited by examiner root/BDMV/index.bdmv
root/BDMV/MovieObject.bdmv
root/BDMV/PLAYLIST/00000.mpls
root/BDMV/PLAYLIST/00001.mpls
...
root/BDMV/CLIPINF/01000.clpi
root/BDMV/CLIPINF/02000.clpi
...
root/BDMV/STREAM/01000.m2ts
root/BDMV/STREAM/02000.m2ts
...

| Title NO. | TYPE AND NO. OF OBJECT TO EXECUTE |
|---|---|
| First Play | MovieObject#1 |
| Top menu | MovieObject#2 |
| Title#1 | BD-J Object#1 |
| ... | ... |
| Title#N | MovieObject#M |

FIG. 7

| | 100 | 101 | | 500 | | 800 | |
|---|---|---|---|---|---|---|---|
| | V | A | | P | | I | |

FIG. 79

| Syntax |
|---|
| presentation_compostion_segment () { |
| SEGMENT IDENTIFIER |
| VIDEO INFORMATION TO BE SUPERIMPOSED |
| DISPLAY SET INFORMATION |
| |
| ... |
| SUB-IMAGE ID FOR EACH SUBTITLE |
| OFFSET DIRECTION (offset_flag) ⎤ |
| OFFSET VALUE (offset_value) ⎦ OFFSET INFORMATION |
| ... |
| NUMBER OF SUBTITLES ON SCREEN |
| REFERENCE INFORMATION TO WINDOW |
| POSITION INFORMATION OF EACH SUBTITLE |
| } |

FIG. 80

| Syntax |
|---|
| interactive_composition_segment () { |
| SEGMENT IDENTIFIER |
| VIDEO INFORMATION TO BE SUPERIMPOSED |
| DISPLAY SET INFORMATION |
| ... |
| interactive_composition () |
| } |

A

| Syntax | |
|---|---|
| interactive_composition () { | |
| ... | |
| OFFSET DIRECTION (offset_flag) | ⎱ OFFSET INFORMATION |
| OFFSET VALUE (offset_value) | ⎰ |
| } | |
| ... | |
| NUMBER OF PAGES | |
| BUTTON INFORMATION FOR EACH PAGE | |
| MENU CONTROL INFORMATION FOR EACH MENU BUTTON | |
| BUTTON ID FOR EACH MENU BUTTON | |
| } | |

B

US 8,848,037 B2

DATA STRUCTURE, RECORDING MEDIUM, PLAYING DEVICE AND PLAYING METHOD, AND PROGRAM

TECHNICAL FIELD

The present invention relates to a data structure, a recording medium, a playing device and a playing method, and a program, and more particularly relates to a data structure, a recording medium, a playing device and a playing method, and a program which enable providing of a video format for 3D display, suitable for 3D display of subtitles and menu buttons.

BACKGROUND ART

There are various types of displays having 3D (3 Dimensional) image display functions (hereinafter, 3D displays). Also, there are various types of video formats for 3D display (hereinafter called 3D video formats).

3D video formats include a method using images of three or more viewpoints (Multi-views), specifically for example, a 3D video format using 2-dimensional images and Depth images suitable of 3D display in a so-called lenticular method, and so forth.

Now, as a disc-type recording medium for recording data such as images and the like, there are play-only optical discs conforming to the Blu-ray Disc (registered trademark) standard. With this standard, subtitles are displayed on a plane separate from the plane on which moving images are displayed, and the subtitles and moving images are overlaid and displayed by the subtitle plane and moving image plane being synthesized. For example, one screen of image data wherein a subtitle is displayed on a moving image is generated by providing portions of a subtitle plane other than the subtitle with a transparent attribute, and the positioning the subtitle plane in front of the moving image plane. PTL 1 describes a technique wherein a moving image plane and subtitle plane are both provided based on the Blu-ray Disc standard which is a recoding/playing standard, and moving images according to video data and subtitles according to subtitle image data are displayed on one screen.

CITATION LIST

Patent Literature

PTL 1: Japanese Unexamined Patent Application Publication No. 2004-304767

SUMMARY OF INVENTION

Technical Problem

However, as of current, there is no video format for 3D display suitable for 3D display of subtitles and menu buttons.

The present invention has been made in light of the current situation, and it is an object thereof to enable providing of a video format for 3D display, suitable for 3D display of subtitles and menu buttons.

Solution to Problem

A data structure or recording medium according to an aspect of the present invention is a data structure or a recording medium in which data of the data structure is recorded, the data structure including: image data of an L image for left eye and an R image for right eye, of a sub-image, used for 3D (3 Dimensional) display of the sub-image made up of a subtitle or a menu button; wherein an epoch structure of image data of the L image and image data of the R image is the same.

With the data structure, or the data structure of which data is recorded in the recording medium, according to an aspect of the present invention, included is image data of an L image for left eye and an R image for right eye, of a sub-image, used for 3D (3 Dimensional) display of the sub-image made up of a subtitle or a menu button, wherein an epoch structure of image data of the L image and image data of the R image is the same.

A playing device according to an aspect of the present invention is a playing device which, in the event of playing data of a data structure including image data of an L image for left eye and an R image for right eye, of a sub-image, used for 3D (3 Dimensional) display of the sub-image made up of a subtitle or a menu button, wherein an epoch structure of image data of the L image and image data of the R image is the same; reads out image data of the L image and the R image included in the data, in increments of screens; and outputs, at the same time, image data of the L image in increments of screens, and image data of the R image in increments of screens.

A playing method and program according to an aspect of the present invention corresponds to the playing device according to an aspect of the present invention described above.

With the playing device and playing method, and program according to an aspect of the present invention, data of a data structure including image data of an L image for left eye and an R image for right eye, of a sub-image, used for 3D (3 Dimensional) display of the sub-image made up of a subtitle or a menu button, wherein an epoch structure of image data of the L image and image data of the R image is the same, is played as follows. That is to say, image data of an L image and R image included in the data in increments of screens is read out, and image data of the L image and R image included in the data in increments of screens is output at the same time.

ADVANTAGEOUS EFFECTS OF INVENTION

According to the present invention, 3D display of subtitles and menu buttons can be performed. Also, a video format for 3D display, suitable for 3D display of subtitles and menu buttons, can be provided.

BRIEF DESCRIPTION OF DRAWINGS

FIG. 7 is a diagram illustrating a detailed configuration example of a stream file.

FIG. 79 is a diagram illustrating an example of PCS syntax.

FIG. 80 is a diagram illustrating an example of ICS syntax.

DESCRIPTION OF EMBODIMENTS

First Embodiment

Configuration Example of First Embodiment of Disc

Figures 1, 2:
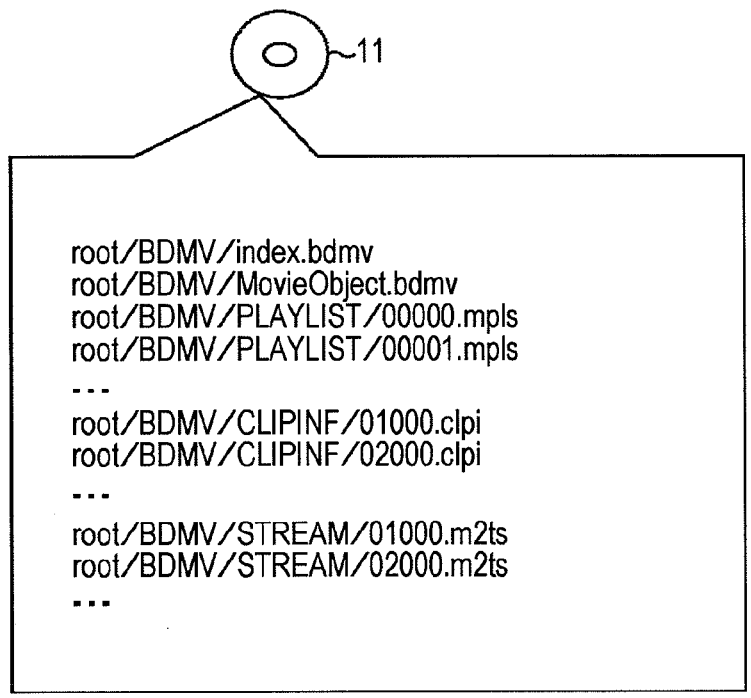
FIG. 1 is a diagram illustrating a configuration example of a first embodiment of a disc to which the present invention has been applied.
FIG. 2 is a diagram illustrating a detailed configuration example of an index file.

FIG. 1 is a diagram illustrating a configuration example of a first embodiment of a disc to which the present invention has been applied.

A disc 11 in FIG. 1 is configured of BD-ROM (Blue-ray Disc-Read Only Memory) and so forth, with an index file (index.bdmv) and movie object file (MovieObject.bdmv) being recorded in the disc 11. Also recorded in the disc 11 are a playlist file (PLAYLIST/XXXXX.mpls), clip information file (CLIPINF/XXXXX.clpi), stream file (STREAM/XXXXX.m2ts), and so forth. Note that X is an arbitrary numeral of 0 through 9.

A stream file is a TS (Transport Stream) file wherein video data which is main images of movies or the like, and audio data and the like, have been multiplexed conformant to ISO 13818-2. Hereinafter, this TS will be referred to as AV stream.

The detailed configuration of each file will be described below.

[Detailed Configuration Example of Index File]

FIG. 2 is a diagram illustrating a detailed configuration example of an index file.

As shown in FIG. 2, described in an index file are, for example, a list of title Nos. recorded in the disc, and types and Nos. of objects executed corresponding to the title Nos.

Note that title Nos. described are not just integer values provided in order from 1, but also "First Play" corresponding to an object executed when the disc 11 is inserted into a playing device. Also described is "Top Menu" corresponding to an object executed when displaying a top menu screen. As for types of objects, there are the two types of movie object (MovieObject) and BD-J object (BD-J Object).

In the example shown in FIG. 2, "MovieObject#1", "MovieObject#2", and "MovieObject#M", are described corresponding to "First Play", "Top menu", and "Title#N", respectively. Also, "BD-J Object#1" is described corresponding to "Title#1".

Note that MovieObject#i and BD-J Object#i each have as the type of object thereof a movie object and a BD-J object, with i representing the No. of the object. Also, Title#i represents that the No. of the tile is i.

BD-J objects are irrelevant to the present invention, and accordingly, description of BD-J objects will be omitted.

An index file such as described above is also called an index table.

[Detailed Configuration Example of Movie Object File]

Figure 3:
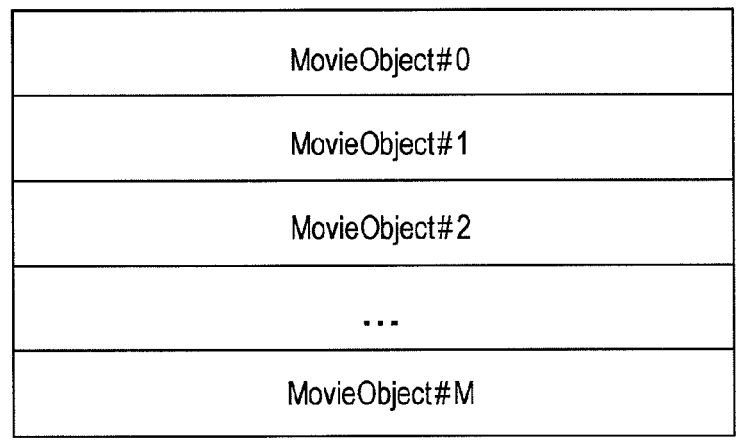
FIG. 3 is a diagram illustrating a detailed configuration example of a movie object file.

FIG. 3 is a diagram illustrating a detailed configuration example of a movie object file.

As shown in FIG. 3, multiple movie object files are described in a movie object file. In the example in FIG. 3, M movie objects, provided with Nos. of 0 through M are described in a movie object file. Commands are described in movie objects, and the playing device which plays the disc 11 sequentially executes these commands.

Figure 4:
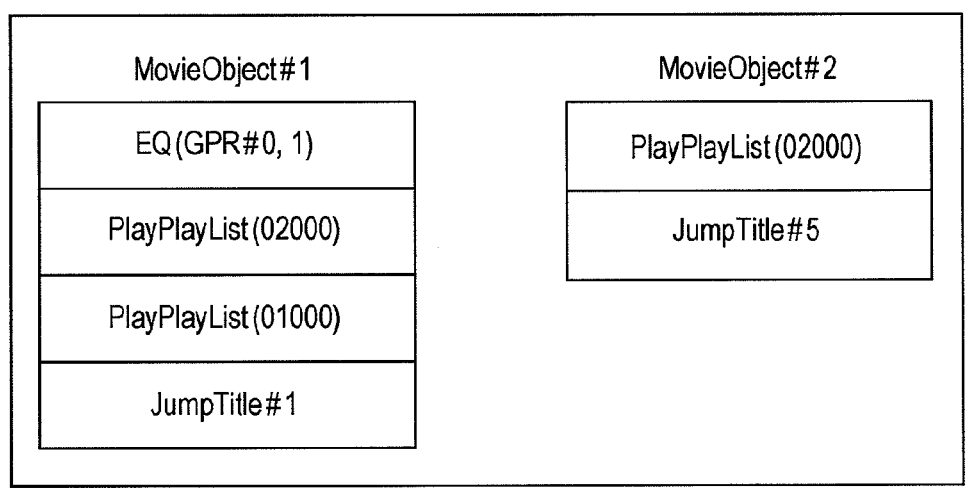
FIG. 4 is a diagram illustrating a detailed configuration example of a movie object.

FIG. 4 is a diagram illustrating a detailed configuration example of a movie object.

In the example in FIG. 4, described for the movie object #1 are EQ(GPR#0,1)", "PlayPlayList(02000)", "PlayPlayList(01000)", and "JumpTitle #1". Due to these commands, the playing device plays the playlist file (PLAYLIST/02000.mpls) in the event that the value of GPR#0 is 1, and otherwise plays the playlist file (PLAYLIST/01000.mpls). Subsequently, the playing device transitions to title #1. Since the BD-J object #1 is correlated with the title #1 in the index file, the playing device executes the BD-J object #1.

Also, with the example in FIG. 4, described for the movie object #2 are "PlayPlayList(02000)" and "JumpTitle#5". Due to these commands, the playing device plays the playlist file (PLAYLIST/02000.mpls). Subsequently, the playing device executes the object corresponding to the object type and No. described in the index file corresponding to the No. 5 title No.

[Detailed Configuration Example of Playlist File]

Figure 5:
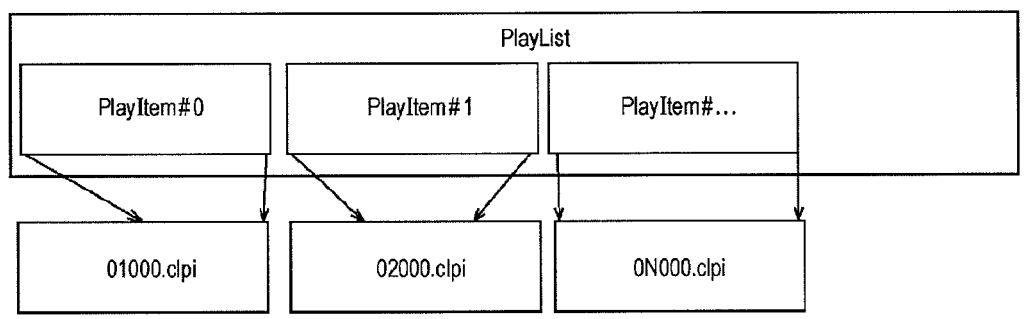
FIG. 5 is a diagram illustrating a detailed configuration example of a playlist file.

FIG. 5 is a diagram illustrating a detailed configuration example of a playlist file.

A playlist file is a file played only by a movie object or BD-J object, and information relating to the AV stream played with the one command described in these objects is described therein.

Specifically, as shown in FIG. 5, a playlist file is configured of multiple play items. Each play item has described therein information specifying a clip information file corresponding to the AV stream to be played, and time information representing the playing section of the AV stream.

[Detailed Configuration Example of Clip Information File]

Figure 6:
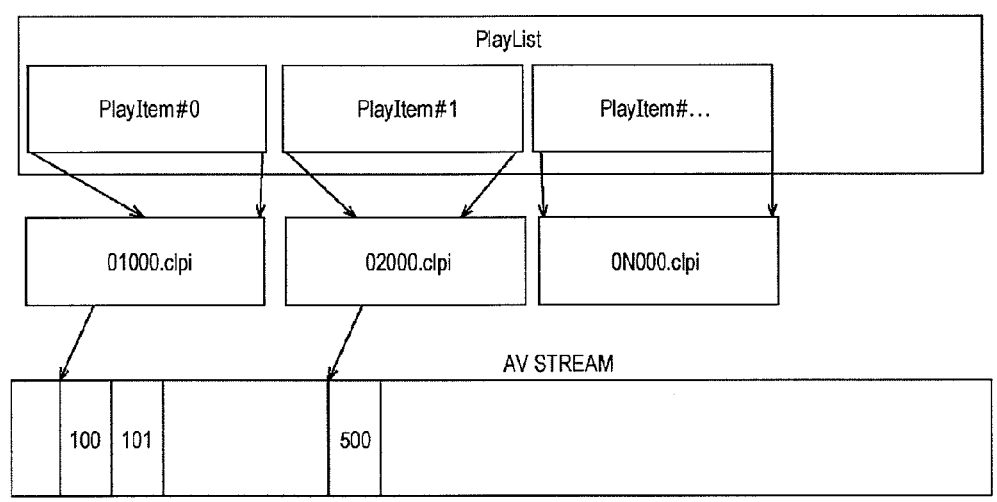
FIG. 6 is a diagram illustrating a detailed configuration example of a clip information file.

FIG. 6 is a diagram describing a detailed configuration example of a clip information file.

A clip information file has described therein a map correlating the time information described in the playlist and packet Nos. of the AV stream. Accordingly, the playing device can recognize the packet No. of the AV stream to be played, corresponding to each play item, by referencing the clip information file.

For example, as shown in FIG. 6, in the event of having read out the play item No. 0 in the playlist (Playtime), the playing device reads out the clip information file (01000.clpi) specified by that play item. The paling device then recognizes the packet No. of the playing section corresponding to the time information described in the play item #0 by making reference to the clip information file (01000.clpi), and plays the AV stream corresponding to that packet No. Accordingly, playing starts from the No. 100 packet No.

Also, in the event of having read out the play item No. 1 (PlayItem#1), the playing device reads out the clip information file (02000.clpi) specified by that play item. The playing device then recognizes the packet No. of the playing section corresponding to the time information described in the play item #1 by making reference to the clip information file (02000.clpi), and plays the AV stream corresponding to that packet No. Accordingly, playing starts from the No. 500 packet No.

[Detailed Configuration Example of Stream File]

Figure 7:
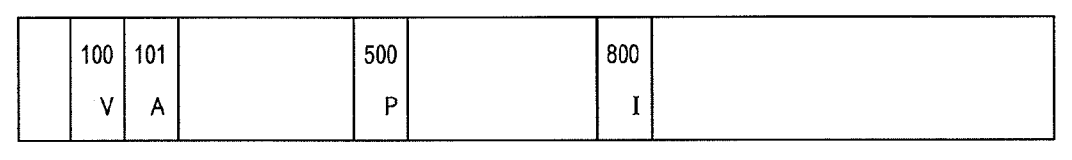

FIG. 7 is a diagram illustrating a detailed configuration example of a stream file.

As shown in FIG. 7, a stream file is configured of TS packets of video data (V), audio data (A), subtitle data (P), and menu data (I), encoded conforming to MPEG2, MPEG-4 AVC (Advanced Video Coding), VC1, or the like, and multiplexed, as an AV stream. Note that the video data, subtitle data, and menu data, are each data for displaying main images, subtitles, and menu buttons, respectively.

In the example in FIG. 7, the packet which is the 100th packet of the AV stream in the stream file is video data, the packet which is the 101st packet is audio data, the packet which is the 500th packet is subtitle data, and the packet which is the 800th packet is menu data. Note that one packet is made up of 192 bytes of data.

In the event of applying an AV stream of such a stream file, PES (Packetized Elementary Stream) packets are extracted from the AV stream.

[Description of PES Packets]

Figure 8:
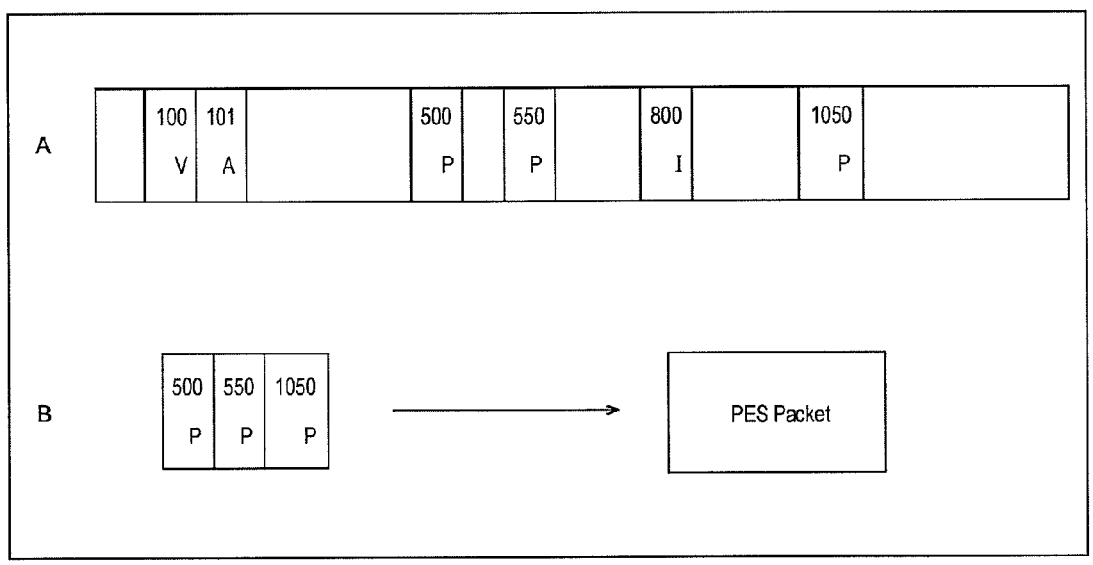
FIG. 8 is a diagram describing extracting of PES packets.

FIG. 8 is a diagram for describing extracting of PES packets.

In the event of playing a stream file of the AV stream shown in A in FIG. 8, the playing device extracts a PES packet from the AV stream as shown in B in FIG. 8.

Specifically, the packet which is the 100th packet of the AV stream shown in A in FIG. 8 is video data, the packet which is the 101st packet is audio data, the packets which are the 500th, 550th, and 1050th packets are subtitle data, and the packet which is the 800th packet is menu data. In this case, as shown in B in FIG. 8, the playing device extracts a PES packet made up of the 500th packet, 550th packet, and 1050th packet.

Figure 9:
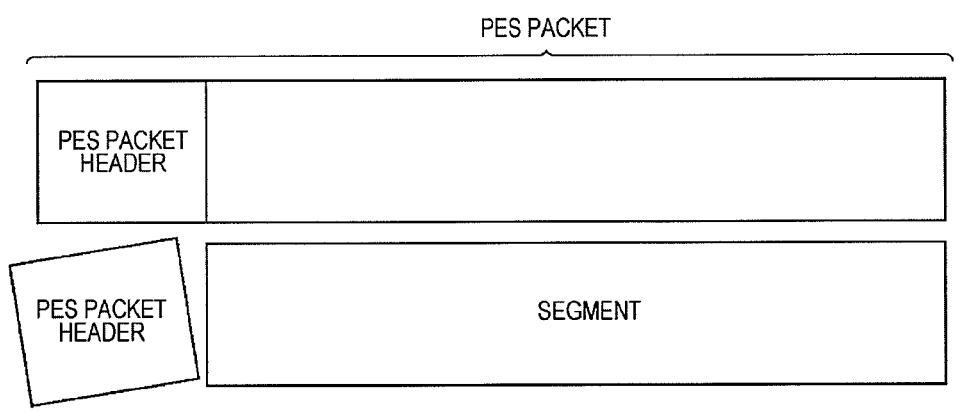
FIG. 9 is a diagram illustrating a detailed configuration example of PES packets.

FIG. 9 is a diagram illustrating a detailed configuration example of a PES packet.

As shown in FIG. 9, a PES packet is configured of a PES packet header and segment. Described in the PES packet header are a (Presentation Time Stamp), DTS(Decoding Time Stamp), and so forth, indicating display time.

As for segments included in a PES packet for subtitle data, there are PCS (Presentation Composition Segment), WDS (Window Definition Segment), PDS (Palette Definition Segment), ODS (Object Definition Segment), and END (End of Display Set Segment). Also, as for segments included in PES packets of the menu data, there are ICS (Interactive Composition Segment), PDS, and END.

Described in a PCS of subtitle data is an ID provided to subtitles corresponding to each ODS (hereinafter referred to as sub-image ID), offset information in increments of screens for 3D display of subtitles (details to be described later), and so forth. Described in a WDS of subtitle data is information indicating the structure of a window indicating the display range of the subtitle, such as position and size and so forth, an ID unique to the window (hereinafter referred to as window ID), and so forth. Described in a PDS of subtitle data is information of color which can be used as colors for the subtitle. Described in an ODS of subtitle data is information indicating the shape of the subtitle. The END in the subtitle data is a segment indicating the end of the display set (to be described in detail later).

The following is a description of offset information.

In order to show the user a 3D image, there is the need to show, to the left eye of the user, one of two images distanced by a predetermined distance in a predetermined direction, and the other image o the right eye.

However, the video data, subtitle data, and menu data recorded in the disc 11 are data for 2D display, so the playing device cannot display both images of a left eye image and a right eye image. Accordingly, an offset direction (offset_flag) indicating the direction of offset of the images for the left eye and for the right eye, and an offset value (offset_value) indicating the amount of offset, are described as offset information as to the 2D display image, in order to enable 3D display of an image. Note that the offset direction for the left eye and the offset direction for the right eye are opposite directions. Offset values are expressed in terms of number of pixels, for example.

Also, described in the menu data ICS is button information including offset information for 3D displaying of menu buttons, in increments of screens, menu control information such as IDs unique to menu buttons corresponding to each ODS (hereinafter referred to as button IDs) and commands executed by operating menu buttons, and so forth.

Described in the menu data PDS is information of colors which can be used as menu button colors. Described in the menu data ODS is information indicating the shape of menu buttons. The menu data END is a segment indicating the end of the display set.

Figure 10:
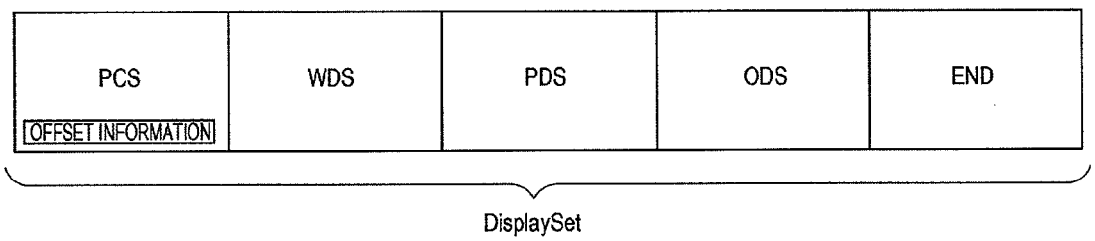
FIG. 10 is a diagram illustrating a configuration example of a display set of subtitle data.

FIG. 10 is a diagram illustrating a configuration example of a display set made up of subtitle data segments such as described above, and FIG. 11 is a diagram illustrating a configuration example of a display set made up of menu data segments.

As shown in FIG. 10, the subtitle data display set is made up of a PCS, a WDS, a PDS, an ODS, and an END, which are segments of one screen of subtitles. In the example in FIG. 10, the display set of subtitle data is made up of the PCS, WDS, PDS, ODS, and END.

Figure 11:
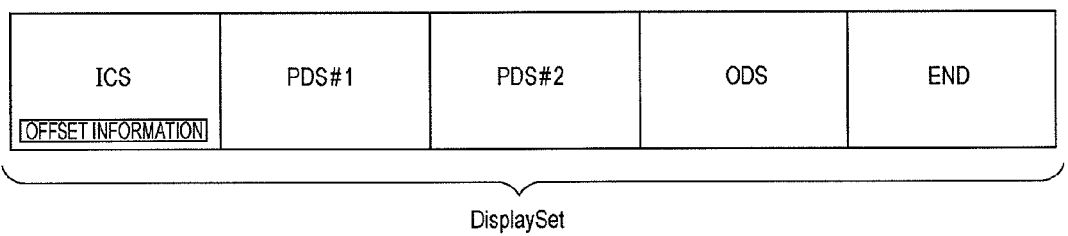
FIG. 11 is a diagram illustrating a configuration example of a display set of menu data.

As shown in FIG. 11, the menu data display set is made up of an ICS, PDSs, an ODS, and an END, which are segments of one screen of menu. In the example in FIG. 11, the display set of menu data is made up of the PCS, PDS#1, PDS#2, ODS, and END. In the example in FIG. 11, there are two types of types of information of color usable as colors for menu buttons for one screen, so two types of PDSs are disposed within the display set.

Figure 12:
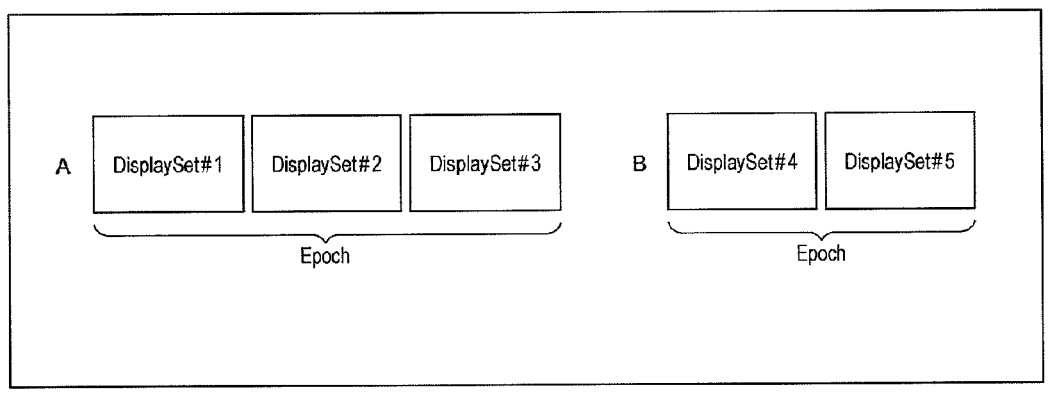
FIG. 12 is a diagram illustrating a configuration example of epochs.

FIG. 12 is a diagram illustrating a configuration example of epochs made up of display sets such as described above.

As shown in FIG. 12, an epoch is configured of an arbitrary number of display sets. In A in FIG. 12, the epoch is configured of three display sets, and in B in FIG. 12, the epoch is configured of two display sets.

The playing device continuously displays subtitles and menu buttons corresponding to one epoch, and after temporarily interrupting display, displays subtitles and menu buttons corresponding to the next epoch. That is to say, an epoch is an increment of display sets such as subtitles and menu buttons which can be continuously displayed.

[Configuration Example of Playing Device]

Figure 13:
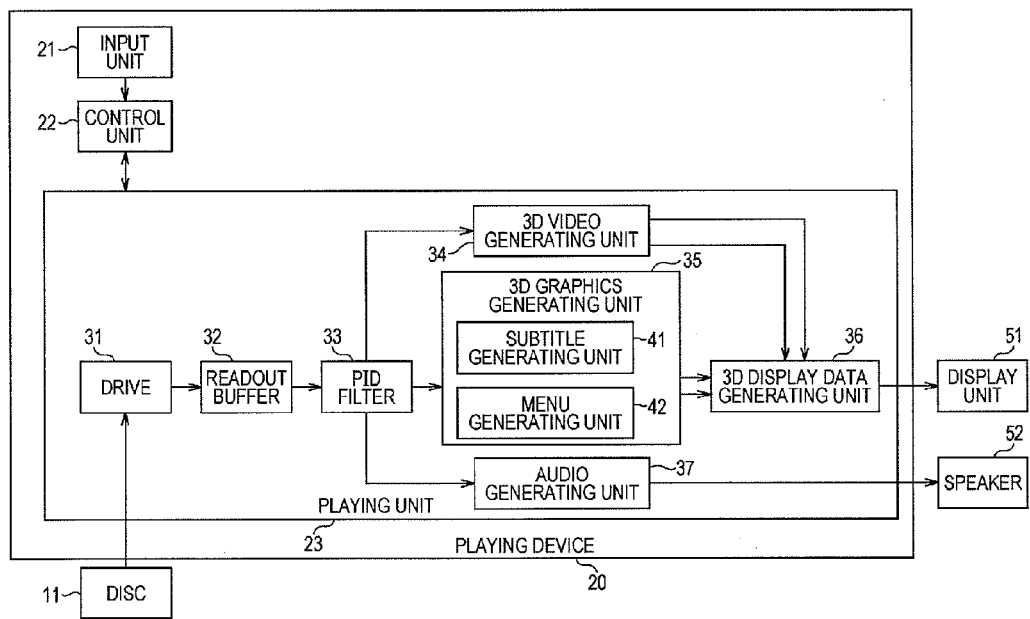
FIG. 13 is a block diagram illustrating a configuration example of a playing device.

FIG. 13 is a block diagram illustrating a configuration example of a playing device 20 for playing the above-described disc 11.

The playing device 20 shown in FIG. 13 is configured of an input unit 21, control unit 22, and playing unit 23.

The input unit 21 is made up of a keyboard, mouse, microphone, and so forth. The input unit 21 accepts instructions from the user, which are supplied to the control unit 22. The control unit 22 controls the playing unit 23 in accordance with the instructions from the input unit 21.

The playing unit 23 is made up of a drive 31, a readout buffer 32, a PID filter 33, a 3D video generating unit 34, a 3D graphics generating unit 35, a 3D display data generating unit 36, and an audio generating unit 37.

The drive 31 drives the disc 11 that has been mounted, under control of the control unit 22. Accordingly, the drive 31 reads out index files, AV streams, and so forth, recorded in the disc 11. The drive 31 supplies the index files and the like that have been read out to the control unit 22. The drive 31 supplies the AV streams that have been read out to the readout buffer 32.

Under control of the control unit 22, the readout buffer 32 holds the AV streams supplied from the drive 31, reads out the AV streams being held so as to be supplied to the PID filter 33, and so forth.

The PID filter 33 extracts the packets for each of the video data, subtitle data, menu data, and audio data, included in the AV stream, based on the packet ID (PID) of the packets of the AV stream from the readout buffer 32. Note that a PID is an ID unique for each type of data making up a packet, and is added to the packet.

The PID filter 33 extracts PES packets from each of the extracted packets for each of the video data, subtitle data, menu data, and audio data. The PID filter 33 then supplies the PES packets of the video data to the 3D video generating unit 34, and supplies the PES packets of the subtitle data and menu data to the 3D graphics generating unit 35. The PID filter 33 also supplies the PES packets of the audio data to the audio generating unit 37.

The 3D video generating unit 34 generates video data for the left eye and video data for the right eye, using the PES packets of video data supplied from the PID filter 33.

Specifically, the 3D video generating unit 34 decodes the PES packets of the video data, and takes the video data obtained as a result thereof as video data for the left eye. The 3D video generating unit 34 also generates video data of an image obtained by a main image corresponding to video data having been shifted in a predetermined offset direction by a predetermined offset value, as video data for the right eye. The 3D video generating unit 34 then supplies the video data for the left eye and video data for the right eye to the 3D display data generating unit 36, as 3D video data.

The 3D graphics generating unit 35 is configured of a subtitle generating unit 41 and menu generating unit 42. The subtitle generating unit 41 generates subtitle data for the right eye and subtitle data for the left eye, using the PES packets for subtitle data supplied from the PID filter 33. The subtitle generating unit 41 then supplies the subtitle data for the left eye and subtitle data for the right eye to the 3D display data generating unit 36, as 3D subtitle data. Details of the subtitle generating unit 41 will be described with reference to FIG. 14, which will be described later.

The menu generating unit 42 generates menu data for the right eye and menu data for the left eye, using the PES packets for menu data supplied from the PID filter 33. The menu generating unit 42 then supplies the menu data for the left eye and menu data for the right eye to the 3D display data generating unit 36, as 3D menu data.

The 3D display data generating unit 36 synthesizes the 3D video data supplied from the 3D video generating unit 34, and the 3D subtitle data and 3D menu data supplied from the 3D graphics generating unit 35 for each data for the left and right eyes. Specifically, the 3D display data generating unit 36 synthesizes the video data for the left eye, the subtitle data for the left eye, and the menu data for the left eye, and generates display data for the left eye. Also, the 3D display data generating unit 36 synthesizes the video data for the right eye, the subtitle data for the right eye, and the menu data for the right eye, and generates display data for the right eye. The 3D display data generating unit 36 supplies the display data for the left eye and the display data for the right eye to the display unit 51 as 3D display data.

The audio generating unit 37 decodes PES packets of audio data supplied from the PID filter 33, and supplies audio data obtained as a result thereof to a speaker 52.

The display unit 51 is configured of a 3D display and so forth. The display unit 51 performs output based on the 3D display data supplied from the 3D display data generating unit 36. As a result the user can view 3D images.

The speaker 52 outputs audio corresponding to the audio data supplied from the audio generating unit 37.

[Detailed Configuration Example of Subtitle Generating Unit]

Figure 14:
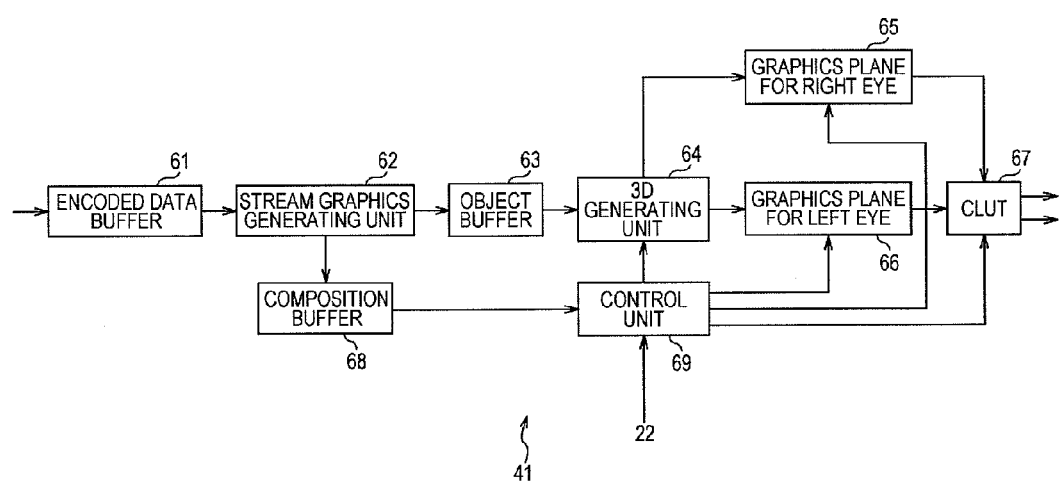
FIG. 14 is a block diagram illustrating a detailed configuration example of the playing device in FIG. 13.

FIG. 14 is a block diagram illustrating a detailed configuration example of the subtitle generating unit 41.

In FIG. 14, the subtitle generating unit 41 shown in FIG. 13 has an encoded data buffer 61, a stream graphics generating unit 62, an object buffer 63, a 3D generating unit 64, a graphics plane for right eye 65, a graphics plane for left eye 66, a CLUT (Color Look Up Table) 67, a composition buffer 68, and a control unit 69.

The encoded data buffer 61 holds segments of the PES packets of the subtitle data supplied from the PID filter 33. The encoded data buffer 61 supplies the PDS, ICS, WDS, and PCS streams to the stream graphics generating unit 62 based on the DTS included in the PES packet header of the subtitle data PES packets. The encoded data buffer 61 immediately supplies the PDS of subtitle data supplied from the PID filter 33 to the stream graphics generating unit 62.

The stream graphics generating unit 62 decodes the ODS supplied from the encoded data buffer 61, and supplies subtitle data in an uncompressed state (run-length data), that is made up of index color obtained as a result thereof, to the object buffer 63. Also, the stream graphics generating unit 62 supplies the PDS, PCS, and WDS supplied from the encoded data buffer 61 to the composition buffer 68.

The object buffer 63 holds the subtitle objects supplied from the stream graphics generating unit 62.

The 3D generating unit 64 reads out the subtitle objects from the object buffer 63 under control of the control unit 69. Based on offset information in increments of screens included in the PCS from the control unit 69, the 3D generating unit 64 generates subtitle objects for the right eye and subtitle objects for the left eye from subtitle objects corresponding to all ODSs included in the same display set as the PCS.

Specifically, the 3D generating unit 64 generates, as subtitle objects for the right eye and subtitle objects for the left eye, subtitle objects for subtitles in increments of screens obtained as the result of shifting subtitles in increments of screens corresponding to subtitles objects, by the offset value in the offset direction according to the offset information.

The 3D generating unit 64 then supplies the subtitle objects for the right eye to the graphics plane for right eye 65. The 3D generating unit 64 also supplies the subtitle objects for the left eye to the graphics plane for left eye 66.

The graphics plane for right eye 65 holds one screen of subtitle object for the right eye supplied from the 3D generating unit 64. The graphics plane for right eye 65 reads out the subtitle object for the right eye which it holds, and supplies this to the CLUT 67, in accordance with instructions from the control unit 69.

The graphics plane for left eye 66 holds one screen of subtitle object for the left eye supplied from the 3D generating unit 64. The graphics plane for left eye 66 reads out the subtitle object for the left eye which it holds, and supplies this to the CLUT 67, in accordance with instructions from the control unit 69.

Based on the PDS supplied from the control unit 69, the CLUT 67 stores a table correlating the index color and Y, Cr, Cb values. The CLUT 67 converts the index color of the subtitle object for the right eye supplied from the graphics plane for right eye 65 into image data of Y, Cr, Cb values, based on the table stored therein. The CLUT 67 converts the index color of the subtitle object for the left eye supplied from the graphics plane for left eye 66 into image data in the same way. The CLUT 67 then outputs the image data of the subtitle object for the right eye to the 3D display data generating unit 36 as subtitle data for the right eye, and outputs the image data of the subtitle object for the left eye to the 3D display data generating unit 36 as subtitle data for the left eye.

The composition buffer 68 holds the PDS, PCS, and WDS supplied from the stream graphics generating unit 62.

The control unit 69 reads out the offset information in increments of screens, included in the PCS from the composition buffer 68, and supplies this to the 3D generating unit 64. Also, at a timing based on the PTS included in the PES packet header, the control unit 69 instructs the graphics plane for right eye 65 to transfer the subtitle object for the right eye to the CLUT 67, and also instructs the graphics plane for left eye 66 to transfer the subtitle object for the left eye to the CLUT 67. Further, the control unit 69 reads out the PDS from the composition buffer 68, and supplies this to the CLUT 67.

Also, the control unit 69 controls each part following instructions from the control unit 22 (FIG. 13).

[Detailed Configuration Example of Menu Generating Unit]

The menu generating unit 42 is configured in the same way as the subtitle generating unit 41 in FIG. 14, except for the object of processing being menu data instead of subtitle data, so illustration thereof in the drawings is omitted.

The encoded data buffer of the menu generating unit 42 holds segments of the PES packets of the menu data, and the composition buffer holds the PCS and PDS. The stream graphics generating unit decodes the ODS of the menu data, and supplies the menu data in an uncompressed state that is made up of index color to the object buffer, so as to be held there.

The 3D graphics generating unit generates menu objects for the right eye from the menu objects from the object buffer, based on offset information in increments of screens included in the ICS of the menu data, and causes this to be held in the graphics plane for right eye. Also, the 3D graphics generating unit generates menu objects for the left eye from the menu objects from the object buffer, based on offset information in increments of screens included in the ICS of the menu data, and causes this to be held in the graphics plane for left eye. The CLUT converts menu objects for the right eye into image data, which is output to the 3D display data generating unit 36 as menu data for the right eye, and converts menu objects for the left eye into image data, which is output to the 3D display data generating unit 36 as menu data for the left eye.

[Description of Processing of Playing Device]

Figure 15:
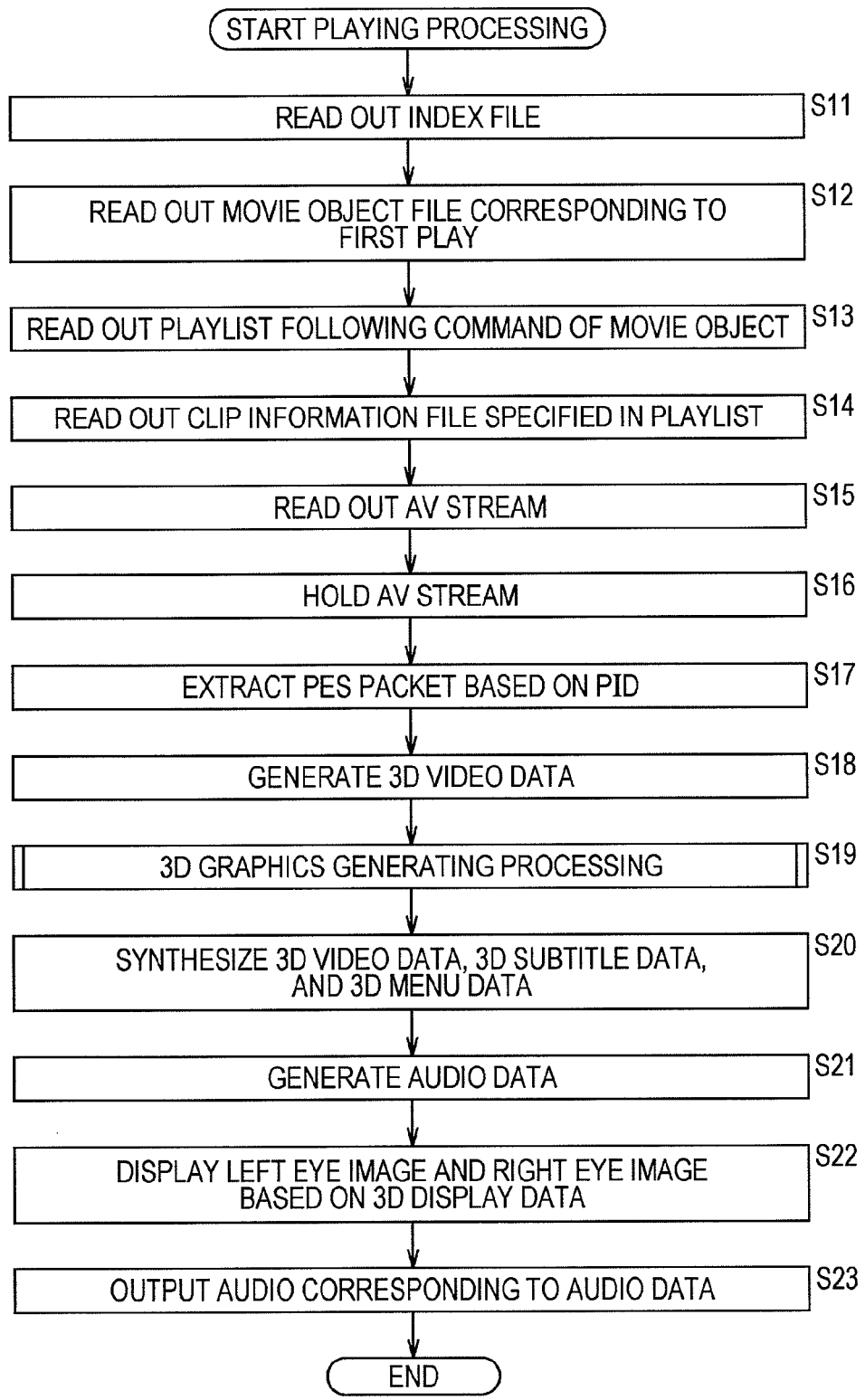
FIG. 15 is a flowchart for describing playing processing with the playing device in FIG. 13.

FIG. 15 is a flowchart for describing the playing processing performed by the playing device 20. This playing processing is started when, for example, a disc 11 is mounted to the drive 31.

In step S11 in FIG. 15, the drive 31 reads out an index file from the disc 11, and supplies this to the control unit 22 in response to instructions from the control unit 22.

In step S12, in accordance with commands from the control unit 22 based on the index file, the drive 31 reads out a movie object file corresponding to the first play (First Play) of the index file, and supplies this to the control unit 22. The control unit 22 recognizes a command described in a movie object included in the movie object file, and instructs the drive 31 to read out a playlist in accordance with that command.

In step S13, the drive 31 reads the play list out from the disc 11 following the command of the movie object in accordance with the instruction from the control unit control unit 22, and supplies this to the control unit 22.

In step S14, in accordance with an instruction from the control unit 22 based on the playlist, the drive 31 reads out a clip information file specified in the playlist from the disc 11, and supplies this to the control unit 22. The control unit 22 recognizes packet Nos. of an AV stream to be played, based on the playlist and clip information file. The control unit 22 then instructs the drive 31 to read out an AV stream of the packets of the packet Nos. to be played.

In step S15, the drive 31 reads out the AV stream to be played from the disc 11 in accordance with the instruction from the control unit 22, and supplies this to the read buffer 32. In step S16, the readout buffer 32 holds the AV stream supplied from the drive 31. The readout buffer 32 reads out the AV stream held therein, and supplies this to the PID filter 33.

In step S17, the PID filter 33 extracts the PES packets for each of the video data, subtitle data, menu data, and audio data of the AV stream, based on the PIDs of the packets in the AV stream from the readout buffer 32. The PID filter 33 then supplies the PES packets of the video data to the 3D video generating unit 34, and supplies the PES packets of the subtitle data and menu data to the 3D graphics generating unit 35. Also, the PID filter 33 supplies the PES packets of the audio data to the audio generating unit 37.

In step S18, the 3D video generating unit 34 generates 3D video data using the PES packets of the video data supplied from the PID filter 33, and supplies this to the 3D display data generating unit 36.

In step S19, the 3D graphics generating unit 35 performs 3D graphics generating processing for generating 3D subtitle data and 3D menu data. Details of the 3D graphics generating processing will be described with reference to FIG. 16 which will be described later.

In step S20, the 3D display data generating unit 36 synthesizes the 3D video data from the 3D video generating unit 34, and the 3D subtitle data and 3D menu data from the 3D graphics generating unit 35, for each data of the left and right eyes. The 3D display data generating unit 36 then supplies the display data for the left eye and the display data for the right eye obtained as the result of synthesizing, to the display unit 51 as 3D display data.

In step S21, the audio generating unit 37 decodes the PES packets for audio data supplied from the PID filter 33, and generates audio data. The audio generating unit 37 then supplies the generated audio data to the speaker 52.

In step S22, the display unit 51 alternately or simultaneously displays the left eye image corresponding to the display data for the left eye and right eye image corresponding to the display data for the right eye, based on the 3D display data supplied from the 3D display data generating unit 36.

In step S23, the speaker 52 outputs audio corresponding to the audio data supplied from the audio generating unit 37. The processing then ends.

Now, while output of images and audio have been described in separate steps to facilitate description, in reality the images and audio are output synchronously. This is the same of later-described playing processing as well.

Also, while description has been made with FIG. 15 regarding playing processing immediately following mounting of the disc 11, the same playing processing is performed also in the case of playing a title corresponding to a movie object file other than for first play. Note however, that in this case, the movie object file read out in step S12 is a movie object file corresponding to the title No. of a title to be played in the index file.

For example, in the event that the user instructs display of a top menu screen by operating the input unit 21, the playing device 20 performs the playing processing in FIG. 15 wherein the No. 2 movie object file corresponding to the title No. "Top Menu" in step S12 is read out.

Figure 16:
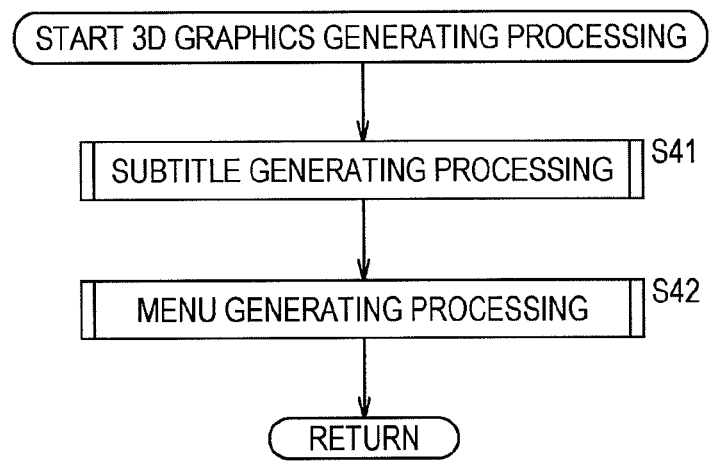
FIG. 16 is a flowchart for describing the processing for generating 3D graphics in FIG. 15.

FIG. 16 is a flowchart for describing the details of 3D graphics generating processing in step S19 of FIG. 15.

In step S41 of FIG. 16, the subtitle generating unit 41 performs subtitle generating processing for generating 3D subtitle data. Details of this subtitle generating processing will be described with reference to FIG. 17 which will be described later.

In step S42, the menu generating unit 42 performs menu generating processing for generating 3D menu data, and the flow returns to step S19 in FIG. 15. Processing of step S20 and on is then performed.

Figure 17:
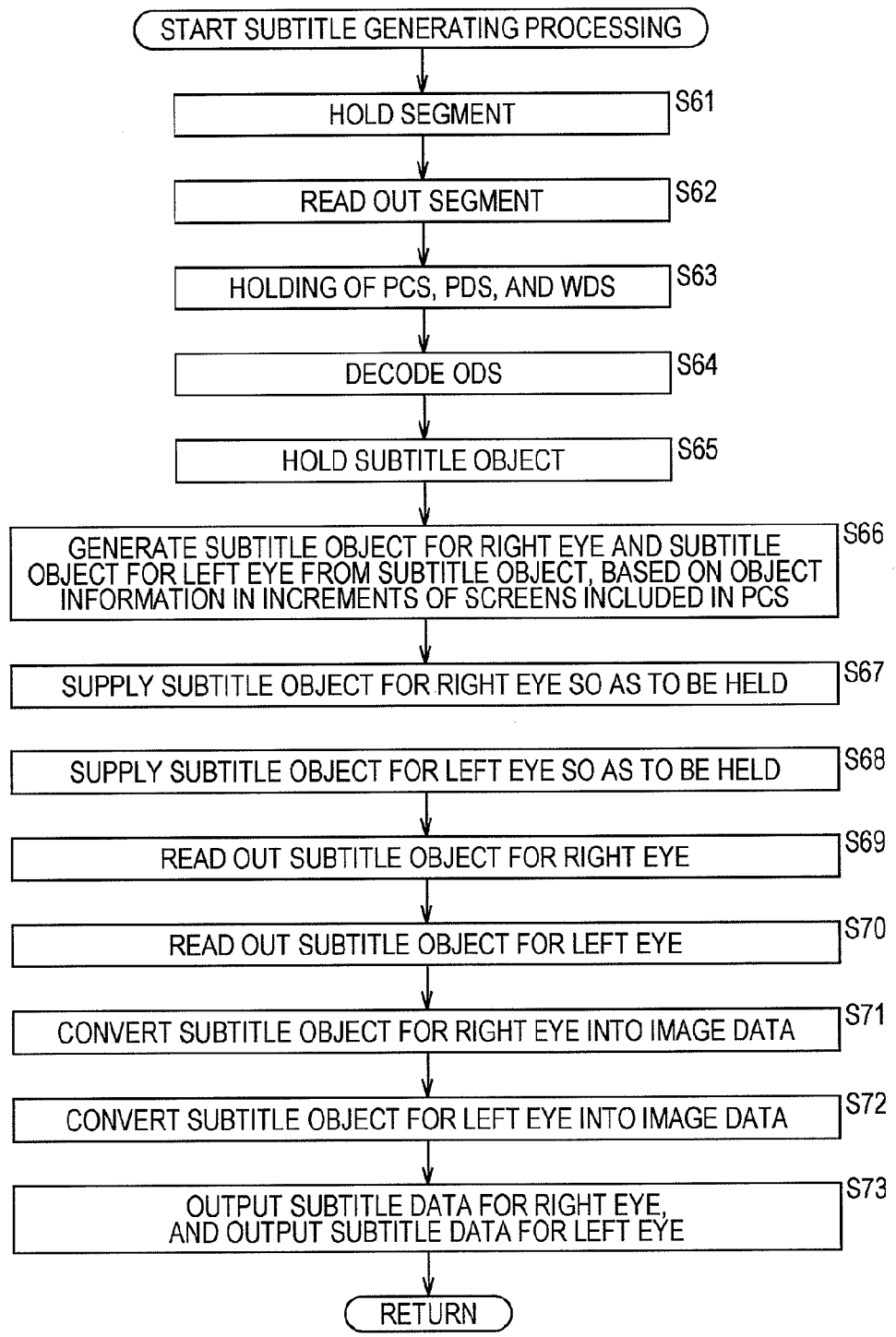
FIG. 17 is a flowchart for describing details of the subtitle generating processing in FIG. 16.

FIG. 17 is a flowchart for describing the details of the subtitle generating processing in step S41 of FIG. 16.

In step S61 of FIG. 17, the encoded data buffer 61 holds, of the PES packets of the subtitle data supplied from the PID filter 33, the segments. In step S62, the encoded data buffer 61 reads out the segments held therein, and supplies these to the stream graphics generating unit 62.

In step S63, the stream graphics generating unit 62 supplies the PCS, PDS, and WDS supplied from the encoded data buffer 61 to the composition buffer 68, so as to be held.

In step S64, the stream graphics generating unit 62 decodes the ODS supplied from the encoded data buffer 61, and supplies the subtitle objects obtained as a result thereof to the object buffer 63. In step S65, the object buffer 63 holds the subtitle objects supplied from the stream graphics generating unit 62.

In step S66, the 3D generating unit 64 generates subtitle objects for the right eye and subtitle objects for the left eye, from subtitle objects corresponding to all ODSs included in the same display set as the PCS. In step S67, the 3D generating unit 64 supplies the subtitle objects for the right eye to the graphics plane for right eye 65, so as to be held there.

In step S68, the 3D generating unit 64 supplies the subtitle objects for the left eye to the graphics plane for left eye 66, so as to be held there.

In step S69, the graphics plane for right eye 65 reads out the subtitle objects for the right eye held therein, and supplies these to the CLUT 67, in accordance with instructions from the control unit 69. In step S70, the graphics plane for left eye 66 reads out the subtitle objects for the left eye held therein, and supplies these to the CLUT 67, in accordance with instructions from the control unit 69.

In step S71, the CLUT 67 converts the index color of the subtitle object for the right eye supplied from the graphics plane for right eye 65 into image data of Y, Cr, Cb values, based on the table stored therein.

In step S72, the CLUT 67 converts the index color of the subtitle object for the left eye supplied from the graphics plane for left eye 66 into image data of Y, Cr, Cb values, based on the table stored therein.

In step S73, the CLUT 67 outputs the image data of the subtitle object for the right eye to the 3D display data generating unit 36 as subtitle data for the right eye, and outputs the image data of the subtitle object for the left eye to the 3D display data generating unit 36 as subtitle data for the left eye. The flow then returns to step S41 in FIG. 16, and advances to step S42.

Note that the menu generating processing in step S42 is performed in the same way as the subtitle generating processing in FIG. 17, except for the object of processing being menu data instead of subtitle data, so illustration thereof in the drawings is omitted.

[Example of 3D Display of Subtitles]

Figure 18:
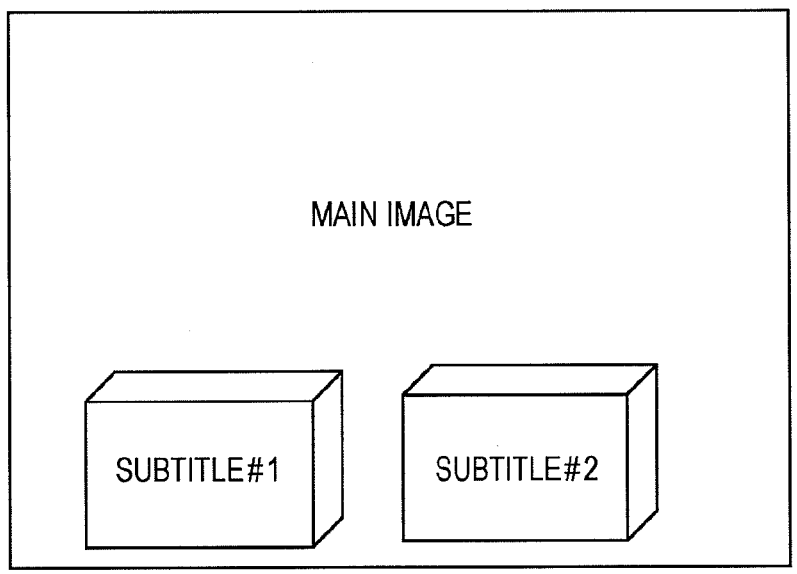
FIG. 18 is a diagram illustrating an example of a subtitle displayed in 3D at the display unit in FIG. 13.

FIG. 18 is a diagram illustrating an example of subtitle displayed in 3D on the display unit 51 of the playing device 20.

Based on the offset information in increments of screens included in the PCS, the playing device 20 generates, as subtitle objects for the right eye and subtitle objects for the left eye, subtitle objects of subtitles obtained as the result of shifting, in opposite directions, subtitles in increments of screens corresponding to all ODSs included in the same display set as the PCS.

Accordingly, as shown in FIG. 18, subtitle #1 and subtitle #2 serving as a 3D image display in one screen have the same length in the same depth direction. Note that the depth direction is a direction perpendicular to the display face of the unit 51. With the direction toward the closer side of the display screen as a positive direction and a direction toward the far side of the display screen as a negative direction, the subtitles appear to be protruding forward in the event that the position of the subtitle in the depth direction is positive, and the subtitles appear to be recessed if negative. Subtitle #i represents the i'th subtitle displayed in one screen.

As described above, subtitle data and menu data is recorded in the disc 11, and also offset information is recorded in increments of screens. The playing device 20 generates 3D subtitle data from subtitle data based on the offset information in increments of screens, and generates 3D menu data from menu data, whereby subtitles and menu buttons can be displayed in 3D.

Second Embodiment

Configuration Example of Display Set in Second Embodiment of Disc

Figure 19:
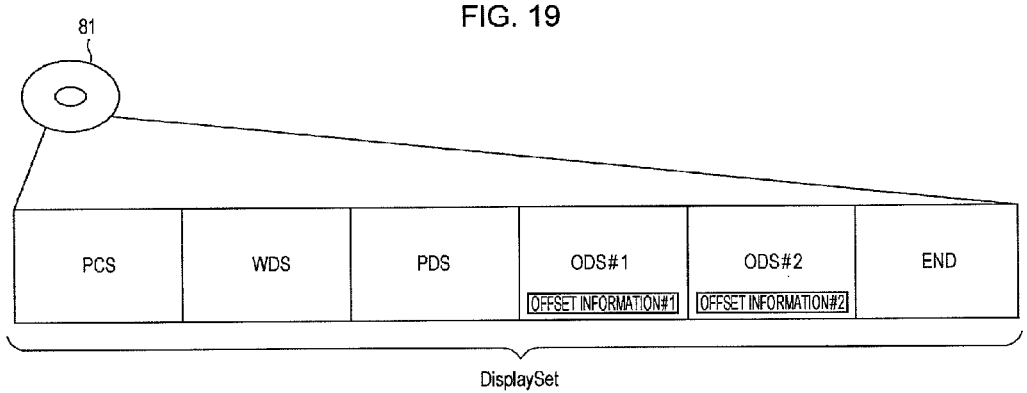
FIG. 19 is a diagram illustrating a configuration example of a display set of subtitle data according to a second embodiment of a disc to which the present invention has been applied.
Figure 20:
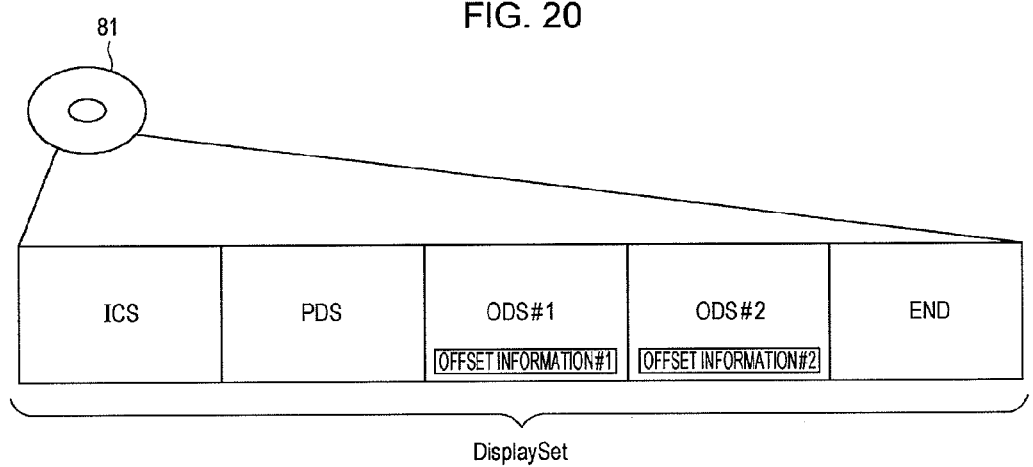
FIG. 20 is a diagram illustrating a configuration example of a display set of menu data according to the second embodiment of the disc to which the present invention has been applied.

FIG. 19 is a diagram illustrating a configuration example of a display set of subtitle data according to a second embodiment of a disc to which the present invention has been applied, and FIG. 20 is a diagram illustrating a configuration example of a display set of menu data.

As shown in FIG. 19, unlike the disc 11, with the disc 81 offset information is described in the ODSs in increments of ODSs, rather than PCSs. Accordingly, offset information can be set for each subtitle.

The display set in FIG. 19 is an example of a display set for displaying two subtitles in one screen, with two ODSs of ODS#1 and ODS#2 being placed in the display set. Each of the ODS#1 and ODS#2 have described therein offset information #1 and offset information #2, in increments of ODSs.

Also, as shown in FIG. 20, unlike the disc 11, with the disc 81 offset information is described in the ODSs in increments of ODSs rather than the ICS. Accordingly, offset information can be set for each menu button.

The display set in FIG. 20 is an example of a display set for displaying two menu buttons in one screen, with two ODSs of ODS#1 and ODS#2 being placed in the display set. Each of the ODS#1 and ODS#2 have described therein offset information #1 and offset information #2, in increments of ODSs.

[Detailed Configuration Example of Playing Device]

Figure 21:
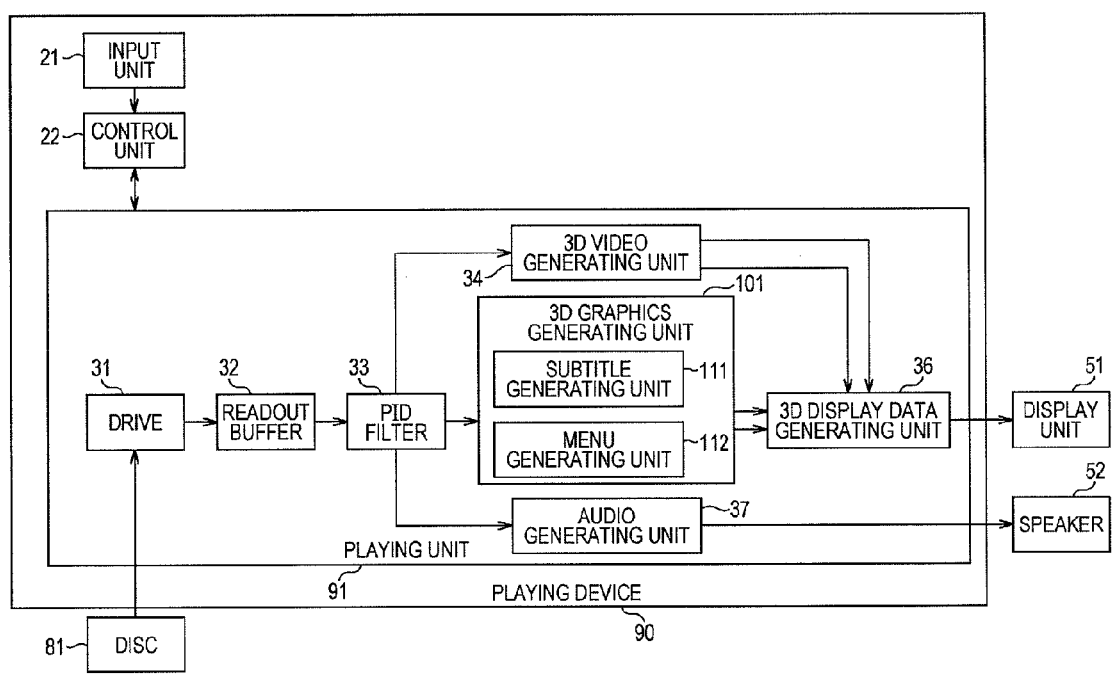
FIG. 21 is a block diagram illustrating a configuration example of a playing device.

FIG. 21 is a block diagram illustrating a configuration example of a playing device 90 for playing the above-described disc 81.

Of the configurations shown in FIG. 21, configurations the same as the configurations in FIG. 13 are denoted with the same reference numerals. Redundant description will be omitted as appropriate.

The configuration of the playing device 90 in FIG. 21 mainly differs from the configuration in FIG. 13 with regard to the point that a playing unit 91 is provided instead of the playing unit 23. The configuration of the playing unit 91 differs from the configuration in FIG. 13 with regard to the point that a 3D graphics generating unit 101 is provided instead of the 3D graphics generating unit 35.

The graphics generating unit 101 is configured of a subtitle generating unit 111 and menu generating unit 112. The subtitle generating unit 111 generates subtitle data for the right eye and subtitle data for the left eye based on the offset information in increments of ODSs, using PES packets of subtitle data supplied from the PID filter 33. The subtitle generating unit 111 then supplies the subtitle data for the right eye and subtitle data for the left eye to the 3D display data generating unit 36 as 3D subtitle data. Details of the subtitle generating unit 111 will be described with reference to the later-described FIG. 22.

The menu generating unit 112 generates menu data for the right eye and menu data for the left eye based on the offset information in increments of ODSs, using PES packets of menu data supplied from the PID filter 33. The menu generating unit 112 then supplies the menu data for the right eye and menu data for the left eye to the 3D display data generating unit 36 as 3D menu data.

[Detailed Configuration Example of Subtitle Generating Unit]

Figure 22:
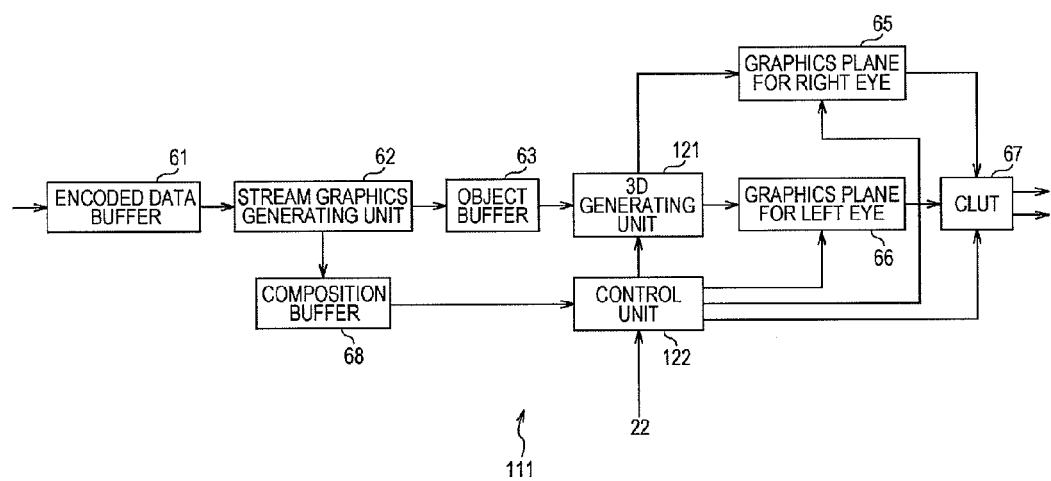
FIG. 22 is a block diagram illustrating a detailed configuration example of the subtitle generating unit in FIG. 21.

FIG. 22 is a block diagram illustrating a detailed configuration example of the subtitle generating unit 111 of the playing device 90.

Of the configurations shown in FIG. 22, configurations the same as the configurations in FIG. 14 are denoted with the same reference numerals. Redundant description will be omitted as appropriate.

The configuration of the subtitle generating unit 111 in FIG. 22 mainly differs from the configuration in FIG. 14 with regard to the point that a 3D generating unit 121 has been provided instead of the 3D generating unit 64, and the point that a control unit 122 has been provided instead of the control unit 69.

As with the case of the 3D generating unit 64, the 3D generating unit 121 reads out the subtitle objects from the object buffer 63 under control of the control unit 122. Based on offset information in increments of ODSs included in the ODS from the control unit 122, the 3D generating unit 121 generates subtitle objects for the right eye and subtitle objects for the left eye from subtitle objects corresponding to ODSs.

Specifically, the 3D generating unit 121 generates, as subtitle objects for the right eye and subtitle objects for the left eye, subtitle objects for subtitles in increments of screens obtained as the result of shifting subtitles within the screen corresponding to subtitles objects, by the offset value in the offset direction according to the offset information in increments of ODSs corresponding to that subtitle.

The 3D generating unit 121 then supplies the subtitle objects for the right eye to the graphics plane for right eye 65. The 3D generating unit 121 also supplies the subtitle objects for the left eye to the graphics plane for left eye 66.

The control unit 122 reads out the offset information in increments of ODSs, included in each ODS from the composition buffer 68, and supplies this to the 3D generating unit 121. Also, in the same way as with the control unit 69, at a timing based on the PTS included in the PES packet header, the control unit 122 instructs the graphics plane for right eye 65 to transfer, and also instructs the graphics plane for left eye 66 to transfer. Further, in the same way as with the control unit 69, the control unit 122 reads out the PDS from the composition buffer 68, and supplies this to the CLUT 67.

Also, in the same way as with the control unit 69, the control unit 122 controls each part following instructions from the control unit 22 (FIG. 21).

[Detailed Configuration Example of Menu Generating Unit]

The menu generating unit 122 is configured in the same way as the subtitle generating unit 111 in FIG. 22, except for the object of processing being menu data instead of subtitle data, so illustration thereof in the drawings is omitted.

[Description of Processing of Playing Device]

Playing processing and 3D graphics generating processing by the playing device 90 are each the same as the playing processing in FIG. 15 and 3D graphics generating processing in FIG. 16, so description will be omitted.

Figure 23:
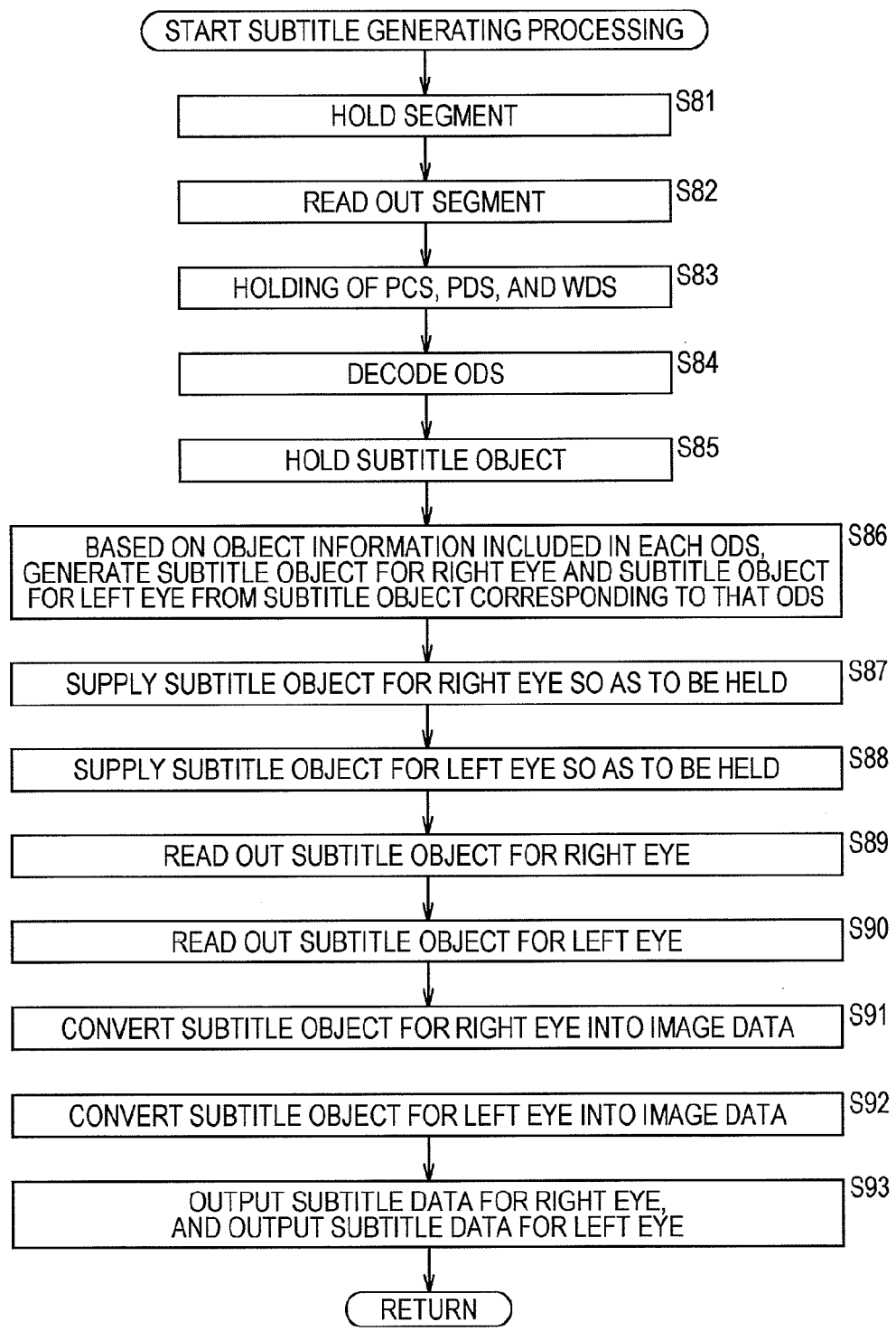
FIG. 23 is a flowchart describing subtitle generating processing with the playing device in FIG. 21.

FIG. 23 is a flowchart for describing the details of subtitle generating processing in step S41 in FIG. 16 by the playing device 90.

The processing of S81 through S85 in FIG. 23 is the same as the processing of steps S61 through S65 in FIG. 17, and accordingly description will be omitted.

Based on offset information included in each ODS from the control unit 122, in step S86 the 3D generating unit 121 generates a subtitle object for the right eye and a subtitle object for the left eye from the subtitle object corresponding to that ODS. The flow then advances to step S87.

The processing of S87 through S93 is the same as the processing of steps S67 through S73 in FIG. 17, and accordingly description will be omitted.

Note that the menu generating processing in step S42 in FIG. 16 is performed in the same way as the subtitle generating processing in FIG. 23, except for the object of processing being menu data instead of subtitle data, so illustration thereof in the drawings is omitted.

[Example of 3D Display of Subtitles]

Figure 24:
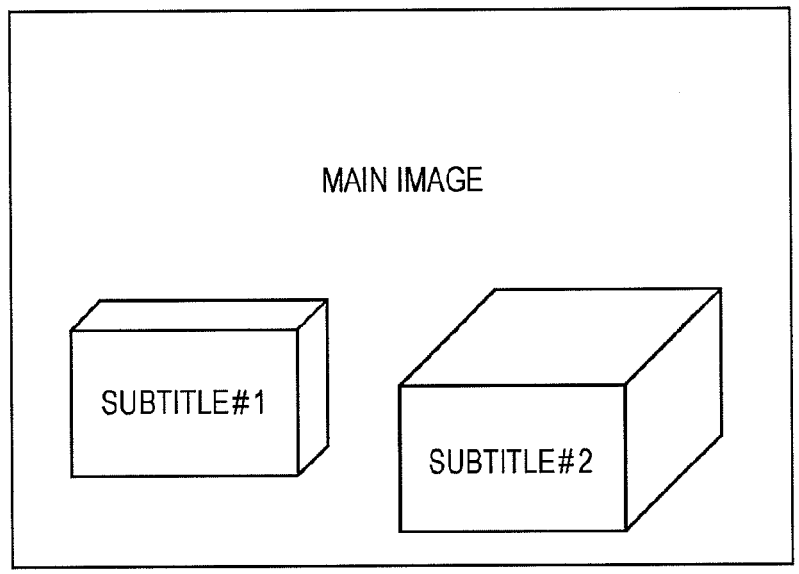
FIG. 24 is a diagram illustrating an example of a subtitle displayed in 3D at the display unit in FIG. 21.

FIG. 24 is a diagram illustrating an example of subtitle displayed in 3D on the display unit 51 of the playing device 90.

Based on the offset information in increments of ODSs included in each ODS, the playing device 90 generates, as subtitle objects for the right eye and subtitle objects for the left eye, subtitle objects of subtitles obtained as the result of shifting, in opposite directions, subtitles corresponding to the ODSs.

Accordingly, as shown in FIG. 24, the position of the subtitle #1 and subtitle #2 serving as a 3D image display in one screen in the depth direction can be made to differ. Also, with the example in FIG. 24, whether the position of the subtitle #1 and subtitle #2 in the depth direction is positive or negative is the same, i.e., both the subtitle #1 and subtitle #2 appear to be protruding forward, but may be made to differ.

Figure 52:
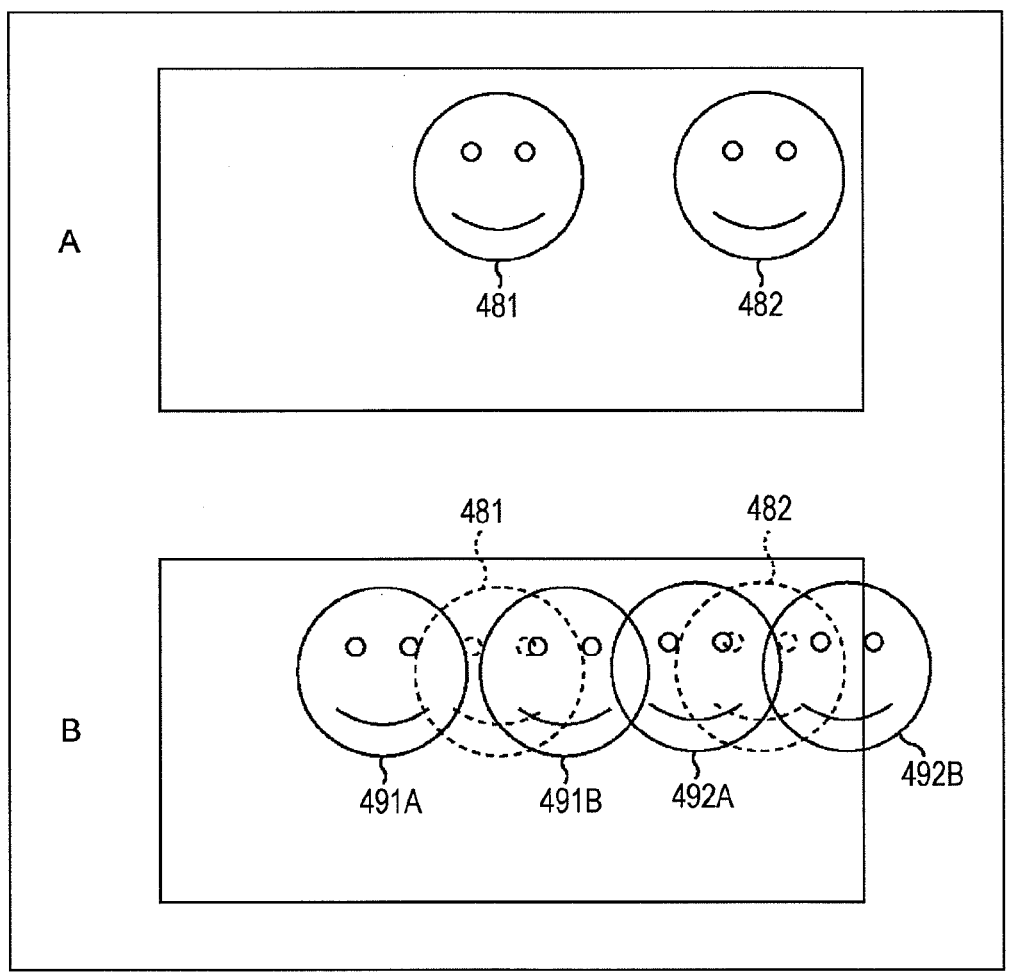
FIG. 52 is a diagram describing a method for deciding offset information.

Further, as an additional condition, the subtitles or menu buttons for each eye must not run over the edge of the plane (screen), as shown in FIG. 52. Also, in the event that there are multiple menu buttons within one screen, and offset information is to be set for each button, i.e., in the event that offset information is described in increments of ODSs, the image for the right eye and the image for the left eye for a certain menu button must not overlap with the image for the right eye and the image for the left eye for another menu button.

As described above, subtitle data and menu data is recorded in the disc 81, and also offset information is recorded in increments of ODSs. Accordingly, the playing device 90 generates 3D subtitle data from subtitle data based on the offset information in increments of ODSs, and generates 3D menu data from menu data, whereby subtitles and menu buttons can be displayed in 3D.

Third Embodiment

Configuration Example of Display Set in Third Embodiment of Disc

Figure 25:
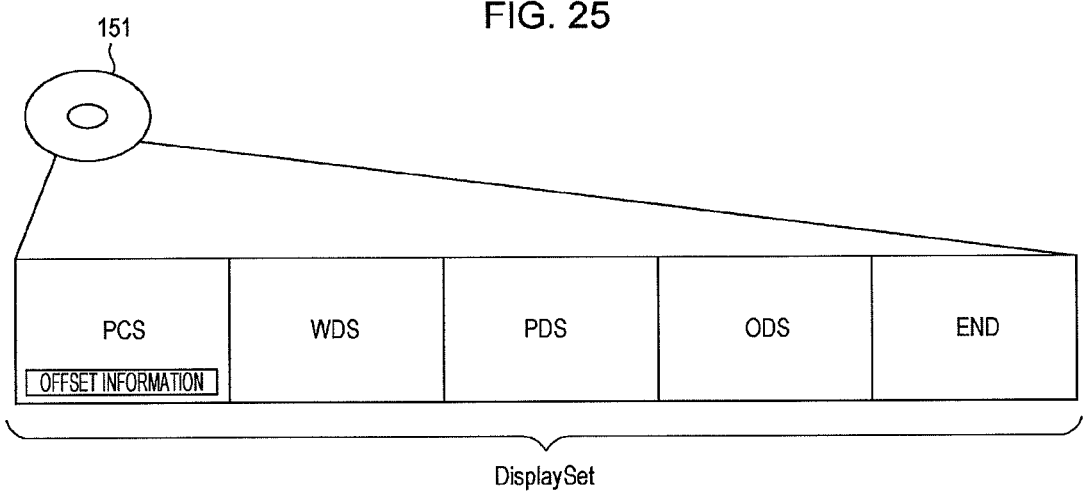
FIG. 25 is a diagram illustrating a configuration example of a display set of subtitle data according to a third embodiment of a disc to which the present invention has been applied.
Figure 26:
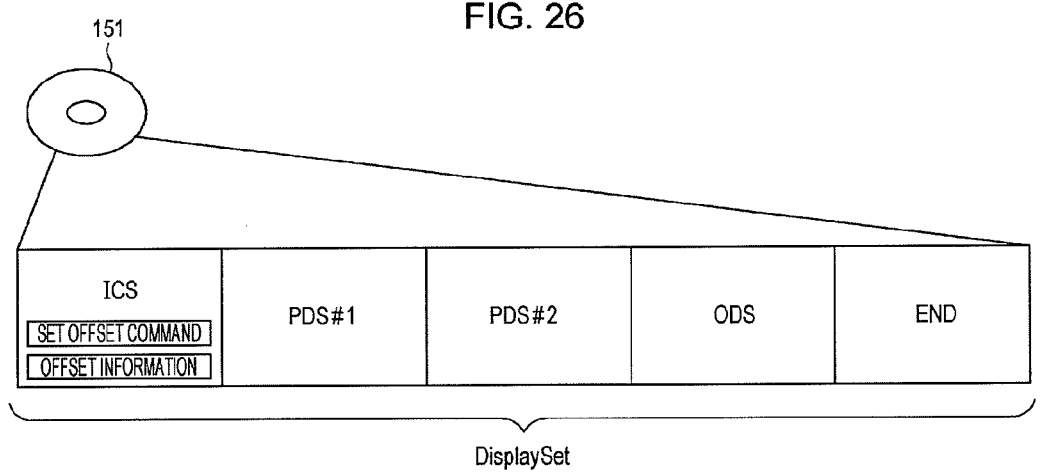
FIG. 26 is a diagram illustrating a configuration example of a display set of menu data according to the third embodiment of the disc to which the present invention has been applied.

FIG. 25 is a diagram illustrating a configuration example of a display set of subtitle data according to a third embodiment of a disc to which the present invention has been applied, and FIG. 26 is a diagram illustrating a configuration example of a display set of menu data.

As shown in FIG. 25, with the disc 151, offset information in increments of screens is described in the PCS in the same way as with the disc 11. Also, as shown in FIG. 26, with the disc 151, offset changing information in increments of screens is described in the ICS in the same way as with the disc 11. Also, with the disc 151, set offset commands are described in the ICS.

A set offset command is a navigation command for setting offset changing information including offset changing information representing offset information following changing of subtitles and menu buttons in increments of screens, including the offset changing information. With the third embodiment and a later-described fourth embodiment, offset information representing the difference in vectors, between vectors representing offset information which is set and vectors representing offset information after changing, is used.

In the event of executing a set offset command, a playing device 160 for playing the disc 151 changes the offset information in increments of screens for subtitles and menu buttons, based on the offset changing information in increments of screens for the subtitles and menu buttons described in the set offset command, and the offset changing information in increments of screens for the subtitles and menu buttons currently set.

[Detailed Configuration Example of Playing Device]

Figure 27:
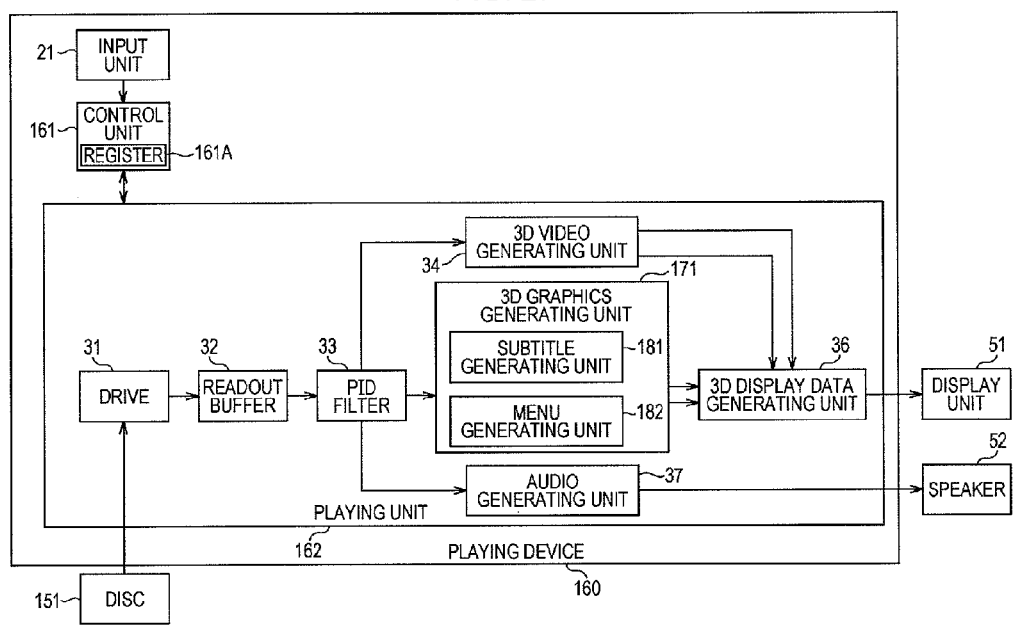
FIG. 27 is a block diagram illustrating a configuration example of a playing device.

FIG. 27 is a block diagram illustrating a configuration example of the playing device 160 for playing the above-described disc 151.

Of the configurations shown in FIG. 27, configurations the same as the configurations in FIG. 13 are denoted with the same reference numerals. Redundant description will be omitted as appropriate.

The configuration of the playing device 160 in FIG. 27 mainly differs from the configuration in FIG. 13 with regard to the point that a control unit 161 is provided instead of the control unit 22, and the point that a playing unit 162 is provided instead of the playing unit 23. The configuration of the playing unit 162 differs from the configuration in FIG. 13 with regard to the point that a 3D graphics generating unit 171 is provided instead of the 3D graphics generating unit 35.

The control unit 161 controls the playing unit 162 in accordance with instructions from the input unit 21. Also, in response to an instruction corresponding to operation of a menu button from the input unit 21, the control unit 161 requests the 3D graphics generating unit 171 for a command corresponding to that button. The control unit 161 then sets the offset changing information, in increments of screens, of the subtitles and menu buttons described in the set offset command transmitted thereto as a result thereof, by holding in a built-in register 161A. The control unit 161 supplies the offset changing information in increments of screens of the subtitles and menu buttons held in the register 161A to the 3D graphics generating unit 171.

The register 161A is configured of a register called a PSR (Player Status Registers) which holds the setting state and playing state of the playing device, for example. The register 161A holds offset changing information in increments of screens of subtitles and menu buttons, and so forth.

The 3D graphics generating unit 171 is configured of a subtitle generating unit 181 and menu generating unit 182. The subtitle generating unit 181 generates subtitle data for the right eye and subtitle data for the left eye based on the offset information in increments of screens, using PES packets of subtitle data supplied from the PID filter 33, in the same way as the subtitle generating unit 41 in FIG. 13. The subtitle generating unit 181 then supplies the subtitle data for the right eye and subtitle data for the left eye to the 3D display data generating unit 36 as 3D subtitle data.

Also, the subtitle generating unit 181 updates the offset information of subtitles in increments of screens, based on the offset changing information in increments of screens of subtitles transmitted from the control unit 161, and the currently set offset information.

The menu generating unit 182 generates menu data for the right eye and menu data for the left eye based on the offset information in increments of screens, using PES packets of subtitle data supplied from the PID filter 33, in the same way as the menu generating unit 42 in FIG. 13. The menu generating unit 112 then supplies the menu data for the right eye and menu data for the left eye to the 3D display data generating unit 36 as 3D menu data.

Also, the menu generating unit 182 transmits a set offset command included in the ICS to the control unit 161, in response for a request from the control unit 161 for a command corresponding to an offset changing button, which is a menu button for instructing changing of the offset. The menu generating unit 182 then updates the offset information in increments of screens for the menu button, based on the offset changing information in increments of screens of the menu button transmitted from the control unit 161 as a result thereof, and the currently set offset information.

[Detailed Configuration Example of Subtitle Generating Unit]

Figure 28:
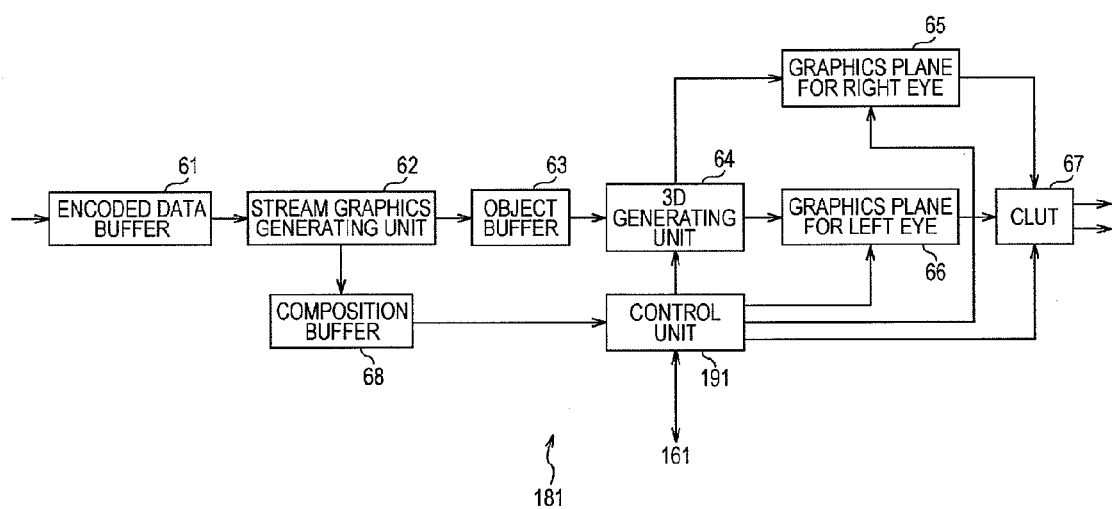
FIG. 28 is a block diagram illustrating a detailed configuration example of the subtitle generating unit in FIG. 27.

FIG. 28 is a block diagram illustrating a detailed configuration example of the subtitle generating unit 181 of the playing device 160.

Of the configurations shown in FIG. 28, configurations the same as the configurations in FIG. 14 are denoted with the same reference numerals. Redundant description will be omitted as appropriate.

The configuration of the subtitle generating unit 181 in FIG. 28 mainly differs from the configuration in FIG. 14 with regard to the point that a control unit 191 has been provided instead of the control unit 69.

In the same way as with the control unit 69, the control unit 191 reads out the offset information in increments of screens, included in each PCS from the composition buffer 68, and supplies this to the 3D generating unit 64. Also, at a timing based on the PTS included in the PES packet header, the control unit 191 instructs the graphics plane for right eye 65 to transfer, and also instructs the graphics plane for left eye 66 to transfer. Further, in the same way as with the control unit 69, the control unit 191 reads out the PDS from the composition buffer 68, and supplies this to the CLUT 67.

Also, the control unit 191 controls each part following instructions from the control unit 161 (FIG. 27).

Further, the control unit 191 receives offset changing information in increments of screens of subtitles stored in the register 161A, transmitted from the control unit 161. The control unit 161 adds the vector representing the offset changing information in increments of screens of subtitles that has been received, and the vector representing the offset information in increments of screens, included in the PCS, and sets the offset information in increments of screens which that vector represents, as new offset information in increments of screens. The control unit 191 then supplies the offset information in increments of screens to the 3D generating unit 64.

[Detailed Configuration Example of Menu Generating Unit]

The menu generating unit 182 of the playing device 160 is configured in the same way as the subtitle generating unit 181 in FIG. 28, except for the object of processing being menu data instead of subtitle data, so illustration thereof in the drawings is omitted. Note, however, that the control unit of the menu generating unit 182 reads out a set offset command included in the ICS from the composition buffer and transmits this to the control unit 161, in response to a request for a command corresponding to the offset changing button from the control unit 161.

[Description of Processing of Playing Device]

Playing processing, 3D graphics generating processing, and subtitle generating processing, by the playing device 160, are each the same as the playing processing in FIG. 15, the 3D graphics generating processing in FIG. 16, and subtitle generating processing in FIG. 17, so description will be omitted.

Figure 29:
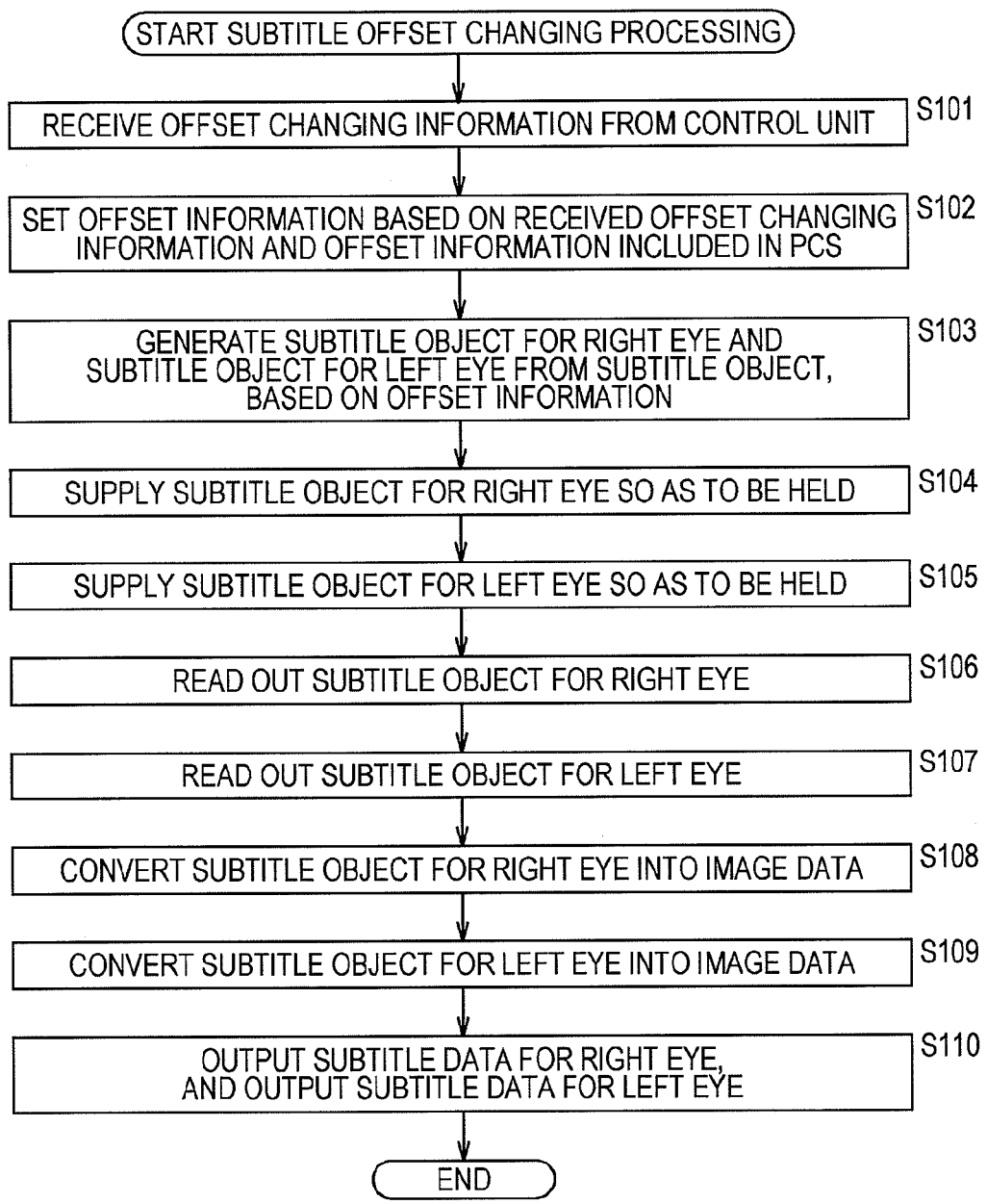
FIG. 29 is a flowchart describing subtitle offset changing processing with the playing device in FIG. 27.

FIG. 29 is a flowchart for describing the details of subtitle offset changing processing by the subtitle generating unit 181 of the playing device 160. This subtitle offset changing processing is started when the control unit 161 transmits offset changing information in response to an instruction corresponding to an operation of the offset changing button from the input unit 21.

In step S101 of FIG. 29, the control unit 191 receives offset changing information, in increments of screens, of subtitles held in the register 161A, from the control unit 161.

In step S102, the control unit 191 sets new offset information in increments of screens, based on the offset changing information in increments of screens of subtitles received from the control unit 161, and the offset information in increments of screens included in the PCS. The control unit 191 then supplies the offset information in increments of screens that has been set to the 3D generating unit 64, and the flow advances to step S103.

Based on offset information in increments of screens supplied form the control unit 191, in step S103 the 3D generating unit 64 generates a subtitle object for the right eye and a subtitle object for the left eye from the subtitle object, and the flow advances to step S104. The processing of S104 through S110 is the same as the processing of steps S67 through S73 in FIG. 17, and accordingly description will be omitted.

Note that the menu offset changing processing by the menu generating unit 182 is performed in the same way as the subtitle generating processing in FIG. 29, except for the object of processing being menu data instead of subtitle data, so illustration thereof in the drawings is omitted.

Figure 30:
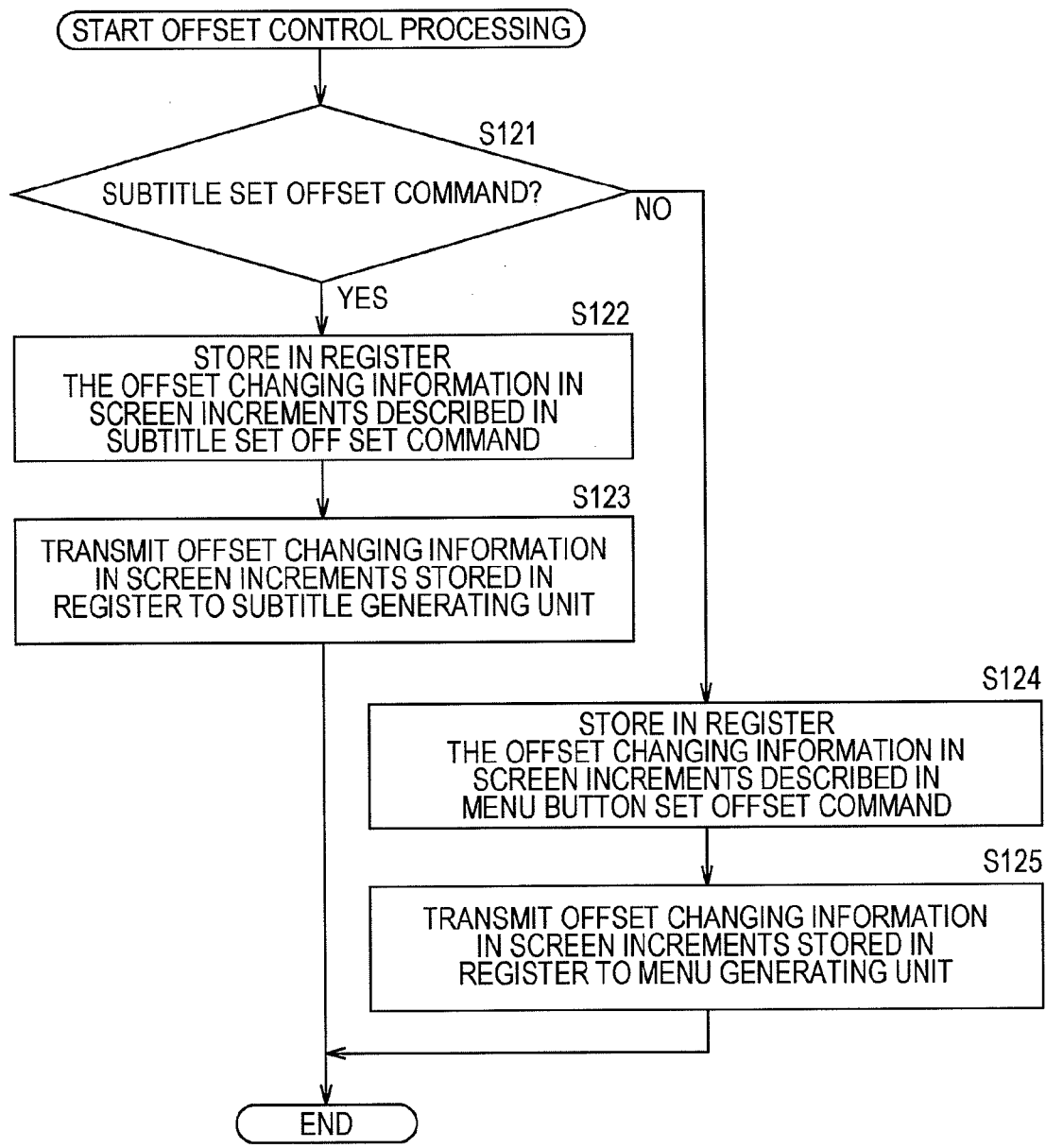
FIG. 30 is a flowchart describing subtitle offset changing processing with the playing device in FIG. 27.

FIG. 30 is a flowchart for describing the details of offset control processing by the playing device 160. This offset control processing is started when the control unit 161 requests the menu generating unit 182 for a command corresponding to the offset changing button in response to an instruction for offset changing from the input unit 21.

In step S121 of FIG. 30, the control unit 161 determines whether or not the set offset command transmitted from the menu generating unit 182 in response to the request is a set offset command for a subtitle. In the event that determination is made in step S121 that it is a set offset command for a subtitle, in step S122 the control unit 161 stores the offset changing information in increments of screens of the subtitle described in the set offset command for the subtitle in the register 161A.

In step S123, the control unit 161 transmits the offset changing information in increments of screens of the subtitle stored in the register 161A to the subtitle generating unit 181, and the processing ends.

On the other hand, in the event that determination is made in step S121 that it is not a set offset command for a subtitle, i.e., that it is a set offset command for a menu button which has been transmitted from the menu generating unit 182, the flow proceeds to step S124. In step S124 the control unit 161 stores the offset changing information in increments of screens for the menu described in the set offset command for the menu in the register 161A.

In step S125, the control unit 161 transmits the offset changing information in increments of screens of the menu stored in the register 161A to the menu generating unit 182, and the processing ends.

[Example of 3D Display of Subtitles]

Figure 31:
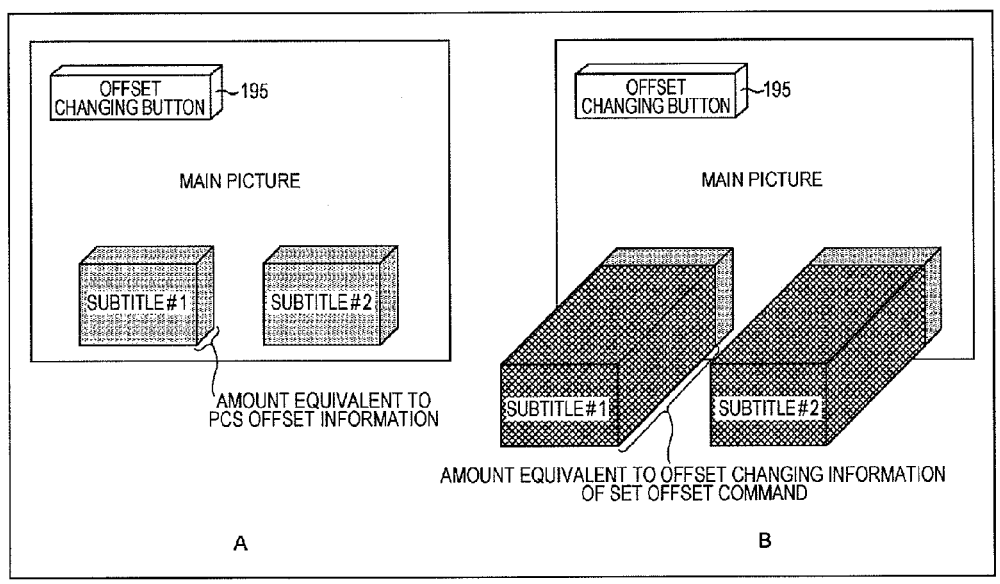
FIG. 31 is a diagram illustrating an example of a subtitle displayed in 3D at the display unit in FIG. 27.

FIG. 31 is a diagram illustrating an example of subtitles displayed in 3D on the display unit 51 of the playing device 160.

As shown in A in FIG. 31, with the playing device 160, an offset changing button 195 which is a 3D image having a predetermined length in a predetermined depth direction is displayed on the screen of the display unit 51 based on the offset information in increments of screens included in the ICS. In the example in A in FIG. 31, a subtitle #1 and subtitle #2 which are 3D images having the same length in a predetermined depth direction are displayed on this screen based on the offset information in increments of screens included in the PCS.

With the screen in A in FIG. 31, upon the user operating the offset changing button 195 using the input unit 21, to instruct changing of offset, the screen of the display unit 51 is changed to the screen shown in B in FIG. 31.

Specifically, upon the offset changing button 195 being operated, at the playing device 160 offset changing information in increments of screens of subtitles described in the set offset command included in the ICS corresponding to this offset changing button 195 is held in the register 161A. Offset information in increments of screens represented by a vector obtained as the result of adding a vector representing the offset changing information in increments of screens to a vector representing the offset information in increments of screens that is currently set, is set as new offset information in increments of screens. As a result, the length of the subtitle #1 and subtitle #2 in the depth direction increases in the depth direction by a length corresponding to the offset changing information in increments of screens, as shown in B in FIG. 31.

Fourth Embodiment

Configuration Example of Display Set in Fourth Embodiment of Disc

Figure 32:
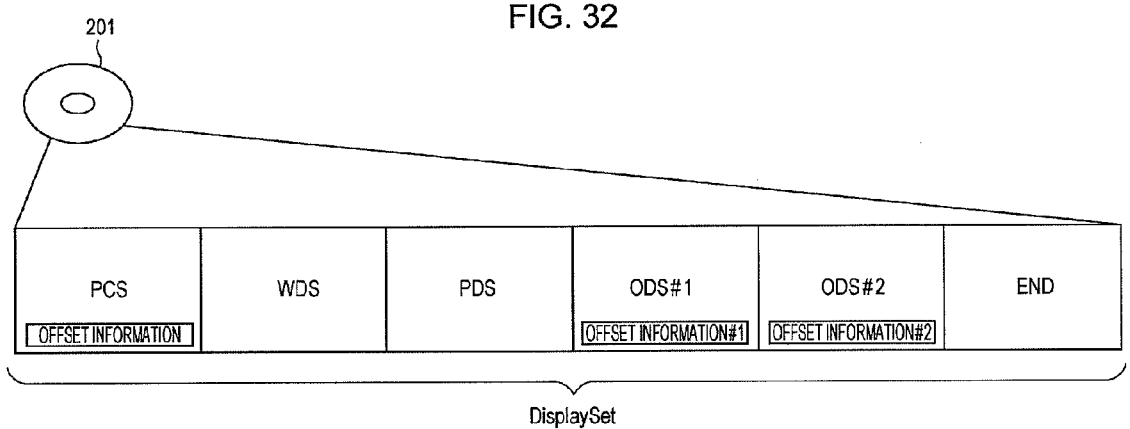
FIG. 32 is a diagram illustrating a configuration example of a display set of subtitle data according to a fourth embodiment of a disc to which the present invention has been applied.
Figure 33:
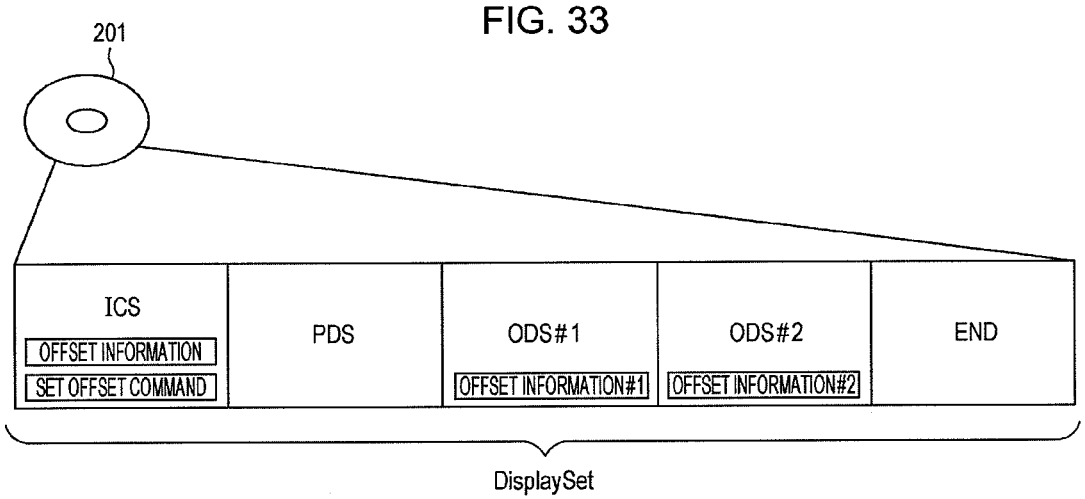
FIG. 33 is a diagram illustrating a configuration example of a display set of menu data according to the fourth embodiment of the disc to which the present invention has been applied.

FIG. 32 is a diagram illustrating a configuration example of a display set of subtitle data according to a fourth embodiment of a disc to which the present invention has been applied, and FIG. 33 is a diagram illustrating a configuration example of a display set of menu data.

In a disc 201 is recorded all of the information related to offset information that is recorded in the discs 11, 81, and 151.

Specifically, as shown in FIG. 32, with the disc 201, offset information in increments of screens is described in the PCS in the same way as with the disc 11. Also, with the disc 201, offset information in increments of ODSs is described in the ODS in the same way as with the disc 81.

Also, as shown in FIG. 33, with the disc 201, offset changing information in increments of screens is described in the ICS in the same way as with the disc 11. Also, with the disc 201, offset information in increments of ODSs is described in the ODS in the same way as with the disc 81.

[Detailed Configuration Example of Playing Device]

Figure 34:
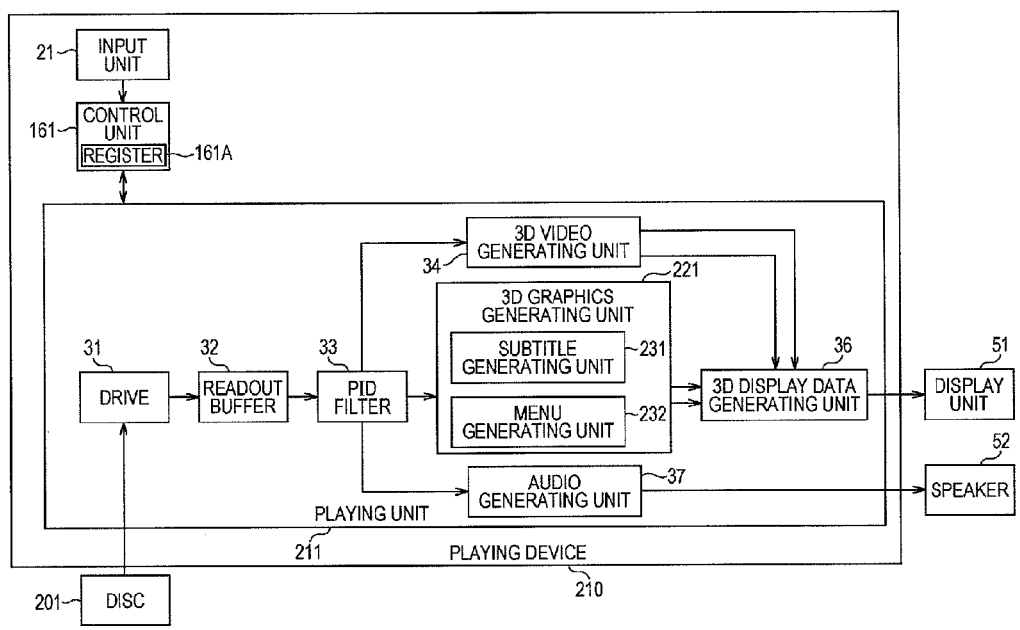
FIG. 34 is a block diagram illustrating a configuration example of a playing device.

FIG. 34 is a block diagram illustrating a configuration example of the playing device 210 for playing the above-described disc 201.

The playing device 210 shown in FIG. 34 has all functions of the playing device 20 in FIG. 13, the playing device 90 in FIG. 21, and the playing device 160 in FIG. 27.

Specifically, the playing device 210 in FIG. 34 is configured of an input unit 21, display unit 51, speaker 52, control unit 161, and playing unit 211. Of the configurations shown in FIG. 34, configurations the same as the configurations in FIG. 27 are denoted with the same reference numerals. Redundant description will be omitted as appropriate.

The configuration of the playing device 211 mainly differs from the configuration in FIG. 27 with regard to the point that a 3D graphics generating unit 221 is provided instead of the 3D graphics generating unit 171.

The 3D graphics generating unit 221 is configured of a subtitle generating unit 231 and menu generating unit 232. The subtitle generating unit 231 generates offset information in increments of screens and subtitle data for the right eye and subtitle data for the left eye based on the offset information in increments of ODSs, using PES packets of subtitle data supplied from the PID filter 33. The subtitle generating unit 231 then supplies the subtitle data for the right eye and subtitle data for the left eye to the 3D display data generating unit 36 as 3D subtitle data.

Also, the subtitle generating unit 231 updates the offset information of subtitles in increments of screens, based on the offset changing information in increments of screens of subtitles transmitted from the control unit 161, and the currently set offset information, in the same way as with the subtitle generating unit 181 in FIG. 27.

The menu generating unit 232 generates menu data for the right eye and menu data for the left eye based on the offset information in increments of screens and offset information in increments of ODSs, using PES packets of subtitle data supplied from the PID filter 33. The menu generating unit 232 then supplies the menu data for the right eye and menu data for the left eye to the 3D display data generating unit 36 as 3D menu data.

Also, the menu generating unit 232 transmits a set offset command included in the ICS to the control unit 161, in response for a request from the control unit 161 for a command corresponding to the offset changing button 195, in the same way as with the menu generating unit 182. The menu generating unit 232 then updates the offset information in increments of screens for the menu button, based on the offset changing information in increments of screens of the menu button transmitted from the control unit 161 as a result thereof, and the currently set offset information, in the same way as with the menu generating unit 182.

[Detailed Configuration Example of Subtitle Generating Unit]

Figure 35:
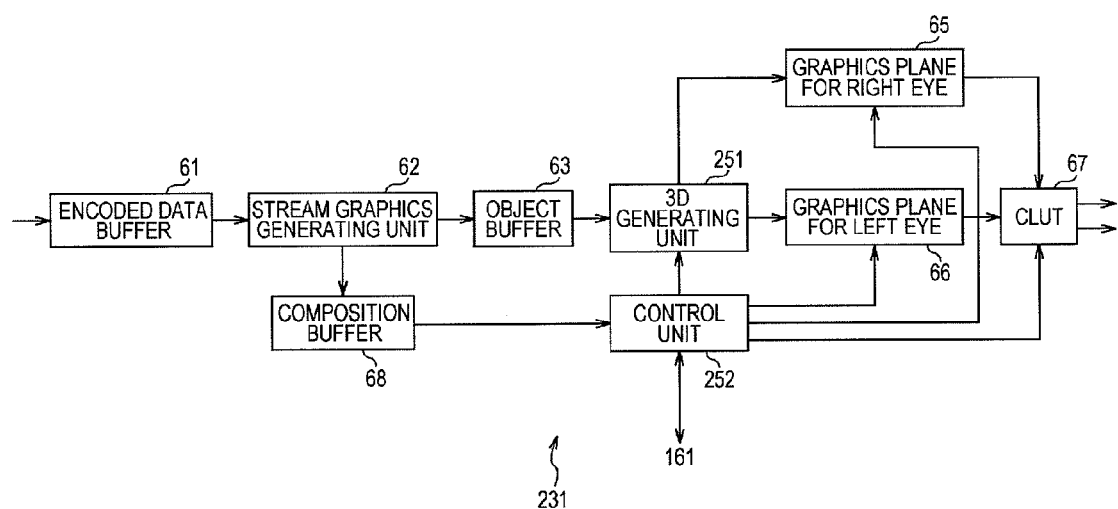
FIG. 35 is a block diagram illustrating a detailed configuration example of the subtitle generating unit in FIG. 34.

FIG. 35 is a block diagram illustrating a detailed configuration example of the subtitle generating unit 231 of the playing device 210.

The subtitle generating unit 231 in FIG. 35 has all of the functions of the subtitle generating unit 41 in FIG. 14, the subtitle generating unit 111 in FIG. 22, and the subtitle generating unit 181 in FIG. 28.

Specifically, the subtitle generating unit 231 in FIG. 35 has the encoded data buffer 61, stream graphics generating unit 62, object buffer 63, graphics plane for right eye 65, and graphics plane for left eye 66. The subtitle generating unit 231 also has the CLUT 67, composition buffer 68, 3D generating unit 251, and control unit 252. Of the configurations shown in FIG. 35, configurations the same as the configurations in FIG. 28 are denoted with the same reference numerals. Redundant description will be omitted as appropriate.

The 3D generating unit 251 has the functions of both of the 3D generating unit 64 in FIG. 14 and the 3D generating unit 121 in FIG. 22. Specifically, the 3D generating unit 251 reads out subtitle objects from the object buffer 63 under control of the control unit 252. The 3D generating unit 251 generates subtitle objects of the right eye and subtitle objects for the left eye from the subtitle objects corresponding to each of the ODSs, based on offset information in increments of screens and in increments of ODSs from the control unit 252. The 3D generating unit 251 then supplies the subtitle objects for the right eye to the graphics plane for right eye 65. The 3D generating unit 251 also supplies the subtitle objects of the left eye to the graphics plane for left eye 66.

In the same way as with the control unit 69, the control unit 252 reads out the offset information in increments of screens, included in each PCS from the composition buffer 68, and supplies this to the 3D generating unit 121. Also, in the same way as with the control unit 69, at a timing based on the PTS included in the PES packet header, the control unit 252 instructs the graphics plane for right eye 65 to transfer, and also instructs the graphics plane for left eye 66 to transfer. Further, in the same way as with the control unit 69, the control unit 252 reads out the PDS from the composition buffer 68, and supplies this to the CLUT 67.

Also, the control unit 252 reads out offset information in increments of ODSs included in each of the ODSs from the composition buffer 68, and supplies this to the 3D generating unit 121, in the same way as with the control unit 122 in FIG. 22.

The control unit 252 receives offset changing information in increments of screens of subtitles stored in the register 161A, transmitted from the control unit 161 in the same way as with the control unit 191. The control unit 252 sets new offset information in increments of screens, based on the offset changing information in increments of screens of the subtitle that has been received, and the offset information in increments of screens included in the PCS, in the same way as with the control unit 161. The control unit 252 then supplies the offset information in increments of screens to the 3D generating unit 251, in the same way as with the control unit 191.

[Detailed Configuration Example of Menu Generating Unit]

The menu generating unit 232 of the playing device 210 is configured in the same way as the subtitle generating unit 231 in FIG. 35, except for the object of processing being menu data instead of subtitle data, so illustration thereof in the drawings is omitted. Note, however, that the control unit of the menu generating unit 232 reads out a set offset command included in the ICS from the composition buffer and transmits this to the control unit 161, in response to a request for a command corresponding to the offset changing button from the control unit 161.

[Description of Processing of Playing Device]

Playing processing, 3D graphics generating processing, and subtitle generating processing, by the playing device 210, are each the same as the playing processing in FIG. 15, the 3D graphics generating processing in FIG. 16, offset changing processing in FIG. 29, and offset control processing in FIG. 30, so description will be omitted.

Figure 36:
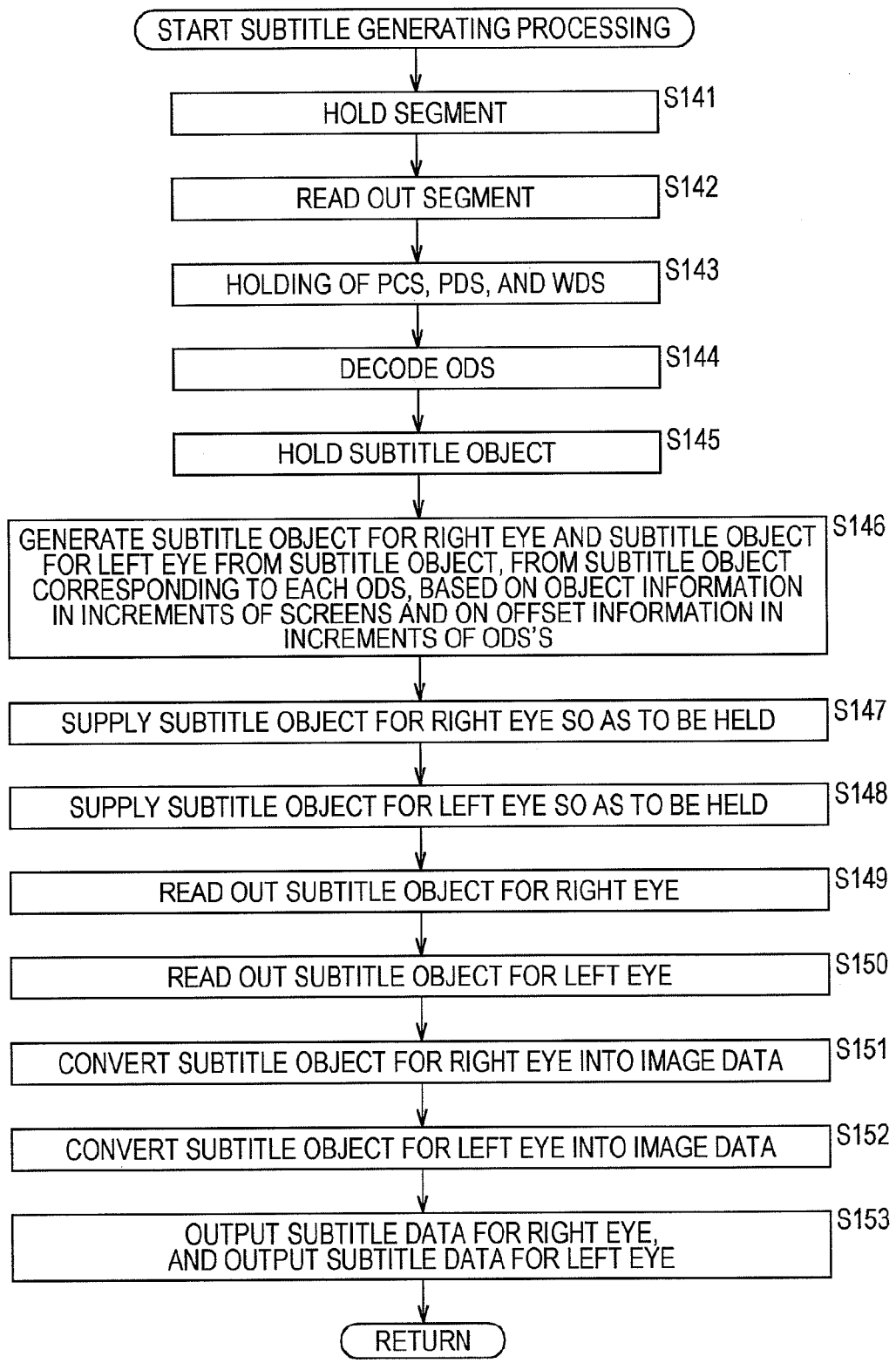
FIG. 36 is a flowchart describing subtitle generating processing with the playing device in FIG. 34.

FIG. 36 is a flowchart for describing the details of subtitle generating processing in step S41 of FIG. 16 by the playing device 210.

The processing of steps S141 through S145 in FIG. 36 is the same as the processing of steps S61 through S65 in FIG. 17, and accordingly description will be omitted.

In step S146, the 3D generating unit 251 generates subtitle objects for the right eye and subtitle objects for the left eye from subtitle objects corresponding to each of the ODSs, based on the offset information in increments of screens and offset information in increments of ODSs, from the control unit 252. The flow then advances to step S147.

The processing of steps S147 through S153 is the same as the processing of steps S67 through S73 in FIG. 17, and accordingly description will be omitted.

Note that the menu offset changing processing in step S42 in FIG. 16 by the playing device 210 is performed in the same way as the subtitle generating processing in FIG. 36, except for the object of processing being menu data instead of subtitle data, so description will be omitted.

[Example of 3D Display of Subtitles]

Figure 37:
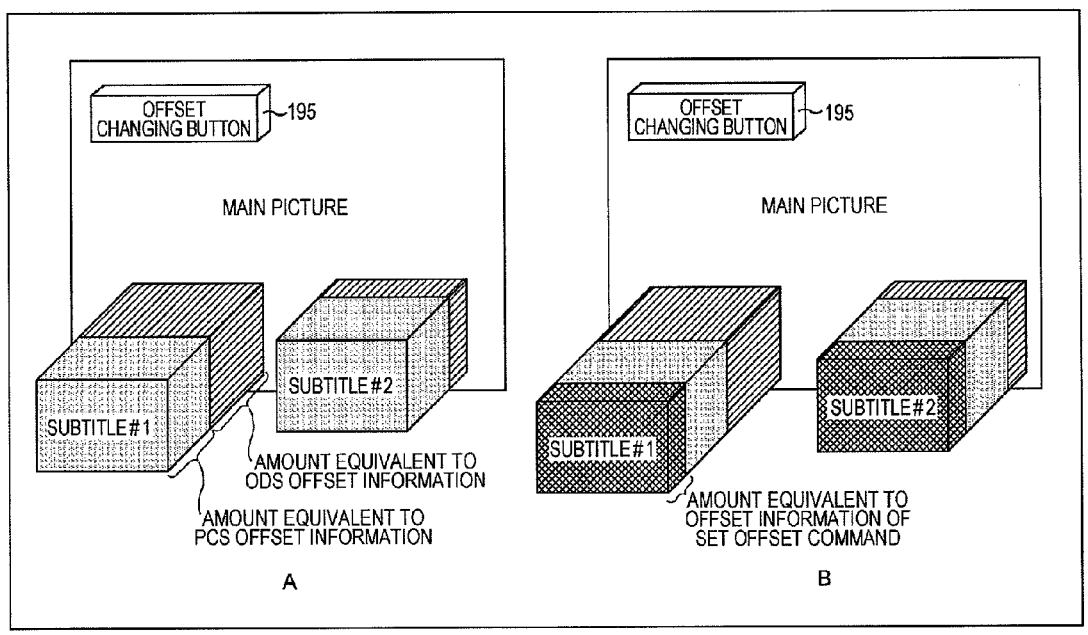
FIG. 37 is a diagram illustrating an example of a subtitle displayed in 3D at the display unit in FIG. 34.

FIG. 37 is a diagram illustrating an example of subtitles displayed in 3D on the display unit 51 of the playing device 210.

As shown in A in FIG. 37, with the playing device 210, an offset changing button 195 which is a 3D image having a predetermined length in a predetermined depth direction is provided on the screen of the display unit 51 based on the offset information in increments of screens and offset information in increments of ODSs.

Also, with the playing device 210, subtitle objects are generated for subtitles obtained as the result of subtitles corresponding to each of the ODSs being each shifted in the opposite direction based on the offset information in increments of ODSs, and further, all subtitles within the screen each being shifted in the opposite direction based on the offset information in increments of screens described in the PCS. The playing device 210 takes the subtitle objects as subtitle objects for the right eye and subtitle objects for the left eye.

As a result, in the example in A in FIG. 37, a subtitle #1 and subtitle #2 which are 3D images having different lengths in the same depth direction are displayed on this screen. The length of the subtitle #1 in the depth direction is the sum of the length in the depth direction corresponding to the offset information in increments of ODSs described in the ODS for the subtitle #1, and the length in the depth direction corresponding to the offset information in increments of screens described in the PCS including the subtitle #1.

In the same way as with the case of the subtitle #1, the length of the subtitle #2 in the depth direction is also the sum of the length in the depth direction corresponding to the offset information in increments of ODSs for the subtitle #2, and the length in the depth direction corresponding to the offset information in increments of screens including the subtitle #2.

With the screen in A in FIG. 37, upon the user operating the offset changing button 195 using the input unit 21, to instruct changing of offset, the screen of the display unit 51 is changed to the screen shown in B in FIG. 37.

Specifically, upon the offset changing button 195 being operated, at the playing device 210 offset changing information in increments of screens of subtitles described in the set offset command included in the ICS corresponding to this offset changing button 195 is held in the register 161A. Offset information in increments of screens represented by a vector obtained as the result of adding a vector representing the offset changing information in increments of screens to a vector representing the offset information in increments of screens that is currently set, is set as new offset information in increments of screens. As a result, the lengths of the subtitle #1 and subtitle #2 in the depth direction increase in the depth direction by a length corresponding to the offset changing information in increments of screens.

Fifth Embodiment

Configuration Example of Display Set in Fifth Embodiment of Disc

Figure 38:
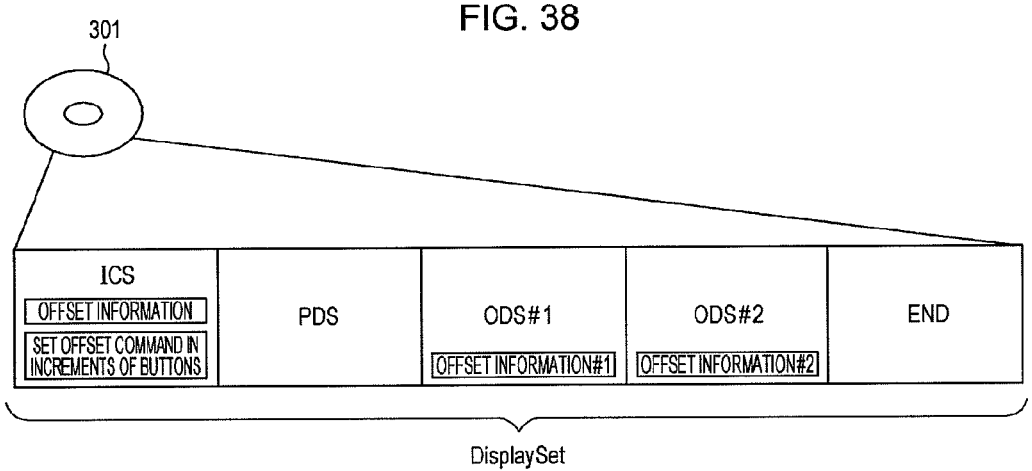
FIG. 38 is a diagram illustrating a configuration example of a display set of menu data according to a fifth embodiment of a disc to which the present invention has been applied.

FIG. 38 is a diagram illustrating a configuration example of a display set of subtitle data according to a fifth embodiment of a disc to which the present invention has been applied.

As shown in FIG. 38, with a disc 301, offset information in increments of screens is described in the ICS in the same way as with the disc 11, and offset information in increments of ODSs is described in the ODS in the same way as with the disc 81.

Also, with the disc 301, set offset commands in increments of buttons are described in the PCS. A set offset command in increments of buttons is a navigation command for setting offset changing information in increments of menu buttons, i.e., including offset changing information in increments of ODSs, for those increments of ODSs. Specifically, in a set offset command in increments of buttons is described a button ID, and offset changing information of a button identified by that button ID.

Thus, with the disc 301, set offset commands in increments of buttons are set in the ICS, so a playing device 301 (described later) for playing the disc 301 can change offset information in increments of menu buttons.

Note that the configuration of the display set of subtitle data recorded in the disc 301 is the same as the configuration of the display set of subtitle data recorded in the disc 11 shown in FIG. 10, so description will be omitted.

[Detailed Configuration Example of Playing Device]

Figure 39:
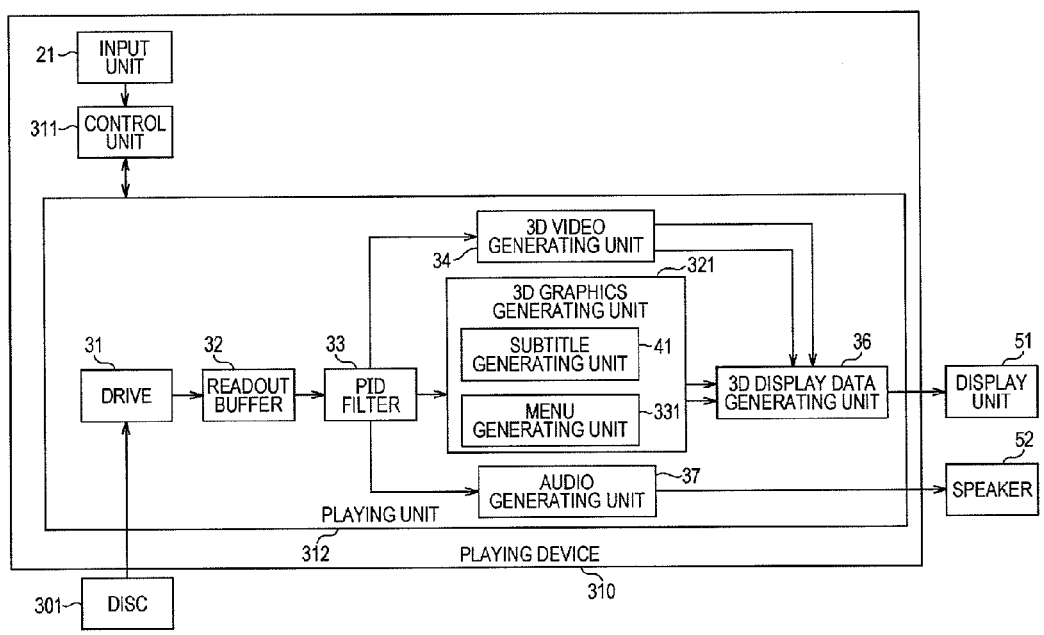
FIG. 39 is a block diagram illustrating a configuration example of a playing device.

FIG. 39 is a block diagram illustrating a configuration example of the playing device 310 for playing the above-described disc 301.

Of the configurations shown in FIG. 39, configurations the same as the configurations in FIG. 34 are denoted with the same reference numerals. Redundant description will be omitted as appropriate.

The configuration of the playing device 310 in FIG. 39 mainly differs from the configuration in FIG. 34 with regard to the point that a control unit 311 is provided instead of the control unit 161, and a playing unit 312 is provided instead of the playing unit 211. The configuration of the playing unit 312 differs from the configuration in FIG. 34 with regard to the point that a 3D graphics generating unit 321 is provided instead of the 3D graphics generating unit 221.

The control unit 311 controls the playing unit 312 in accordance with instructions from the input unit 21. Also, the control unit 311 requests the 3D graphics generating unit 321 for a set offset command corresponding to a menu button in response to an instruction corresponding to the operation of that menu button from that input unit 21. The control unit 311 supplies the offset changing information in increments of menu buttons and the button ID described in the set offset command in increments of buttons that is transmitted from the menu generating unit 331 as a result thereof, to the menu generating unit 331.

The 3D graphics generating unit 321 is configured of the subtitle generating unit 41 shown in FIG. 13, and the menu generating unit 331. In the same way as with the menu generating unit 232 in FIG. 34, the menu generating unit 331 generates menu data for the right eye and menu data for the left eye based on the offset information in increments of screens and offset information in increments of ODSs, using PES packets of menu data supplied from the PID filter 33. The menu generating unit 331 then supplies the menu data for the right eye and menu data for the left eye to the 3D display data generating unit 36 as 3D menu data.

Also, the menu generating unit 331 transmits a set offset command in increments of buttons included in the ICS to the control unit 311, in response for a request from the control unit 311 for a command corresponding to the offset changing button 195. The menu generating unit 311 then updates the offset information in increments of screens for the menu button, based on the offset changing information in increments of menu buttons transmitted from the control unit 311 as a result thereof.

[Detailed Configuration Example of Menu Generating Unit]

Figure 40:
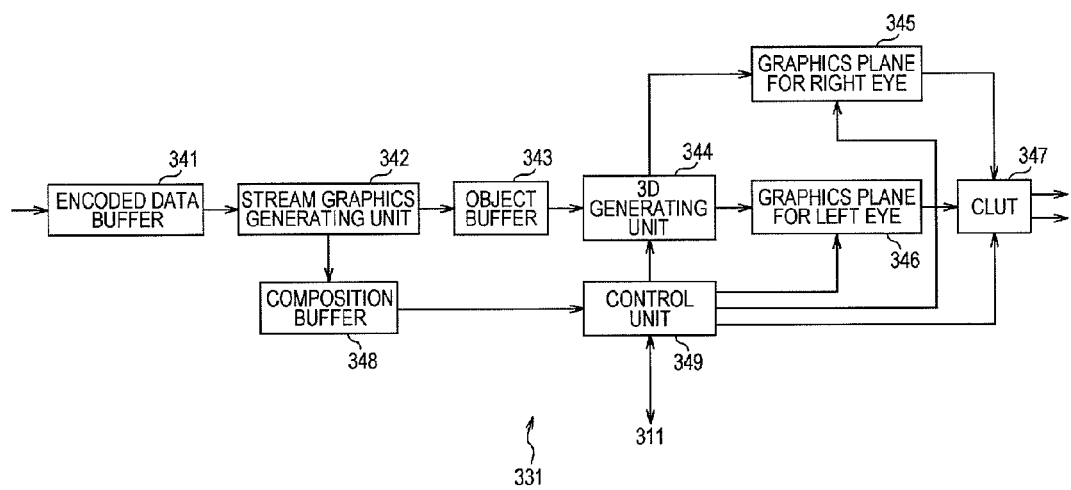
FIG. 40 is a block diagram illustrating a detailed configuration example of a menu generating unit 331 in FIG. 39.

FIG. 40 is a block diagram illustrating a detailed configuration example of the menu generating unit 331 in FIG. 40.

The menu generating unit 331 in FIG. 40 is configured of an encoded data buffer 341, a stream graphics generating unit 342, an object buffer 343, a 3D generating unit 344, a graphics plane for right eye 345, a graphics plane for left eye 346, a CLUT 347, a composition buffer 348, and a control unit 349.

Of the configurations shown in FIG. 40, configurations other than the control unit 349 are same as the configurations of the menu generating unit 232 in FIG. 34, so description will be omitted.

The control unit 349 reads out the offset information in increments of screens, included in the ICS from the composition buffer 348, and supplies this to the 3D generating unit 344. Also, at a timing based on the PTS included in the PES packet header, the control unit 349 instructs the graphics plane for right eye 345 to transfer, and also instructs the graphics plane for left eye 346 to transfer. Further, the control unit 349 reads out the PDS from the composition buffer 348, and supplies this to the CLUT 347.

Also, the control unit 349 reads out offset information in increments of ODSs included in each of the ODSs from the composition buffer 348, and supplies this to the 3D generating unit 344. The control unit 349 controls each part following instructions from the control unit 311 (FIG. 39).

The control unit 349 reads out set offset commands in increments of buttons included in the ICS from the composition buffer 348 in accordance with a request from the control unit 311 for a command corresponding to the offset changing button 195, and transmits to the control unit 311. Also, the control unit 349 receives the offset changing information in increments of menu buttons, and button IDs, transmitted from the control unit 311 as a result thereof. The control unit 349 updates the offset information in increments of ODSs, based on the offset changing information in increments of buttons that is received, and the offset information currently set in an ODS corresponding to the button ID transmitted along with the offset information.

[Description of Processing of Playing Device]

Playing processing and 3D graphics generating processing by the playing device 310 are each the same as the playing processing in FIG. 15 and the 3D graphics generating processing in FIG. 16, so description will be omitted. Also, subtitle generating processing and subtitle offset changing processing by the playing device 310 are each the same as the subtitle generating processing in FIG. 36 and subtitle offset changing processing in FIG. 29, so description will be omitted.

Figure 41:
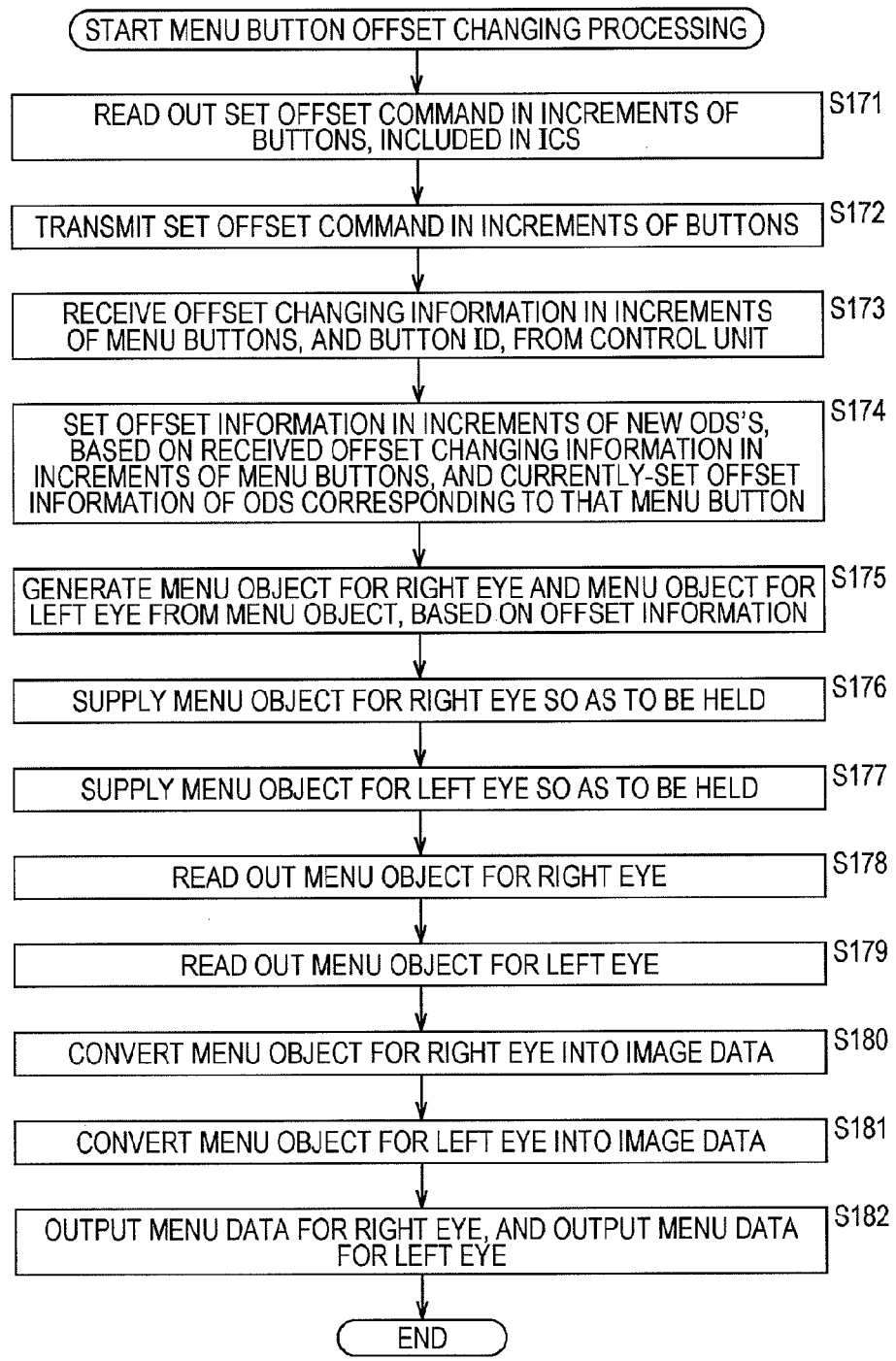
FIG. 41 is a flowchart describing menu button offset changing processing with the menu generating unit in FIG. 40.

FIG. 41 is a flowchart for describing the details of menu button offset changing processing by the menu generating unit 331 of the playing device 310. This menu button offset changing processing is started when the control unit 311 requests a command to the menu generating unit 331 for a command corresponding to the offset changing button 195, in response to an instruction corresponding to operation of the offset changing button 195 from the input unit 21 from the input unit 21.

In step S171 in FIG. 41, the control unit 349 reads out a set offset command in increments of buttons included in the ICS from the composition buffer 348, in response to the request for the command corresponding to the offset changing button 195 from the control unit 311.

In step S172, the control unit 349 transmits the set offset command in increments of buttons read out in step S171 to the control unit 311. The control unit 311 transmits the offset changing information in increments of menu buttons described in the set offset command in increments of buttons that is transmitted from the control unit 349, and the button ID thereof, to the control unit 349.

In step S173, the control unit 349 receives the offset changing information in increments of buttons and the button ID from the control unit 311. The control unit 349 recognizes the ODS corresponding to the button ID transmitted from the control unit 311 based on the button ID included in the ICS held in the composition buffer 348.

In step S174, the control unit 349 sets new offset information in increments of ODSs, based on the offset changing information in increments of menu buttons received form the control unit 311, and the offset information currently set to the ODS corresponding to that menu button. The control unit 349 then supplies the offset information in increments of ODSs to the 3D generating unit 344.

In step S175, the 3D generating unit 344 generates a menu object for the right eye and a menu object for the left eye from the menu object based on the offset information in increments of ODSs supplied from the control unit 349, and the flow is advanced to step S176. The processing of steps S176 through S182 is the same as the processing of step S67 through S73 except for the point that the object of processing is menu data rather than subtitle data, so description will be omitted.

Figure 42:
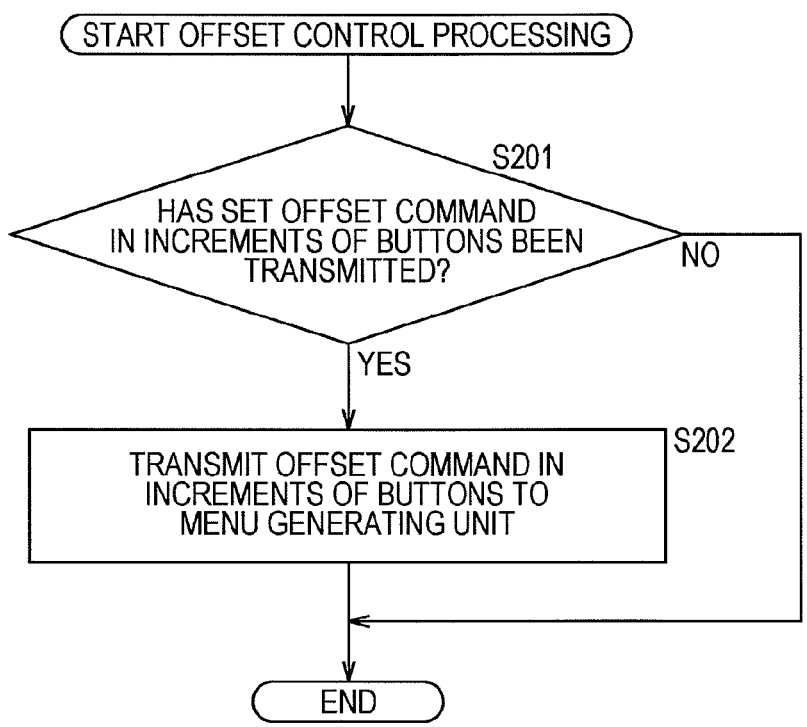
FIG. 42 is a flowchart describing offset control processing with the playing device in FIG. 39.

FIG. 42 is a flowchart for describing offset control processing by the playing device 310. This offset control processing is started when the control unit 311 requests the menu generating unit 331 for a command corresponding to the offset changing button 195, in response to an instruction corresponding to operation of the offset changing button 195 from the input unit 21.

In step S201 in FIG. 42, the control unit 311 determines whether or not a set offset command in increments of buttons has been transmitted from the menu generating unit 331 in response to the request. In the event that determination is made in step S201 that a set offset command in increments of buttons has been transmitted, in step S202 the control unit 311 transmits the offset changing information in increments of menu buttons described in the set offset command in increments of buttons, and the button ID, to the menu generating unit 331, and the processing ends.

On the other hand, in the event that determination is made in step S201 that a set offset command in increments of buttons has not been transmitted, the processing ends.

[Example of 3D Display of Menu button]

Figure 43:
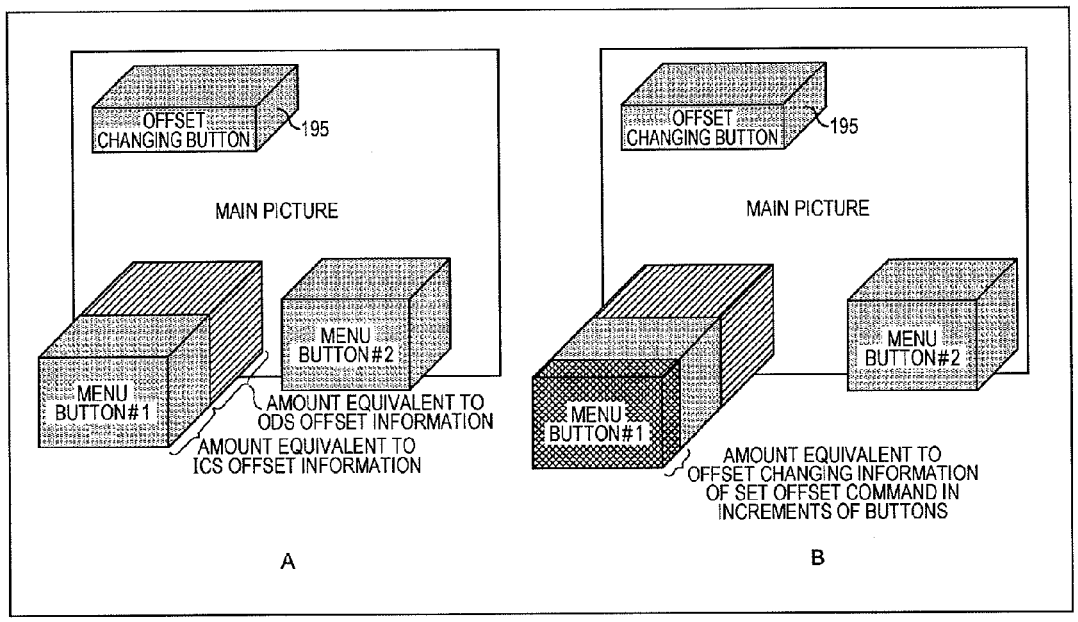
FIG. 43 is a diagram illustrating an example of a menu button displayed in 3D at the display unit in FIG. 39.

FIG. 43 is a diagram illustrating an example of a menu button displayed in 3D on the display unit 51 of the playing device 310.

The playing device 310 shifts, in opposite directions, menu buttons corresponding to each ODS, based on offset information in increments of ODSs, and further generates menu button objects of menu buttons obtained as a result of shifting all menu buttons within the screen in the opposite direction based on the offset information in increments of screens. The playing device 310 then makes the menu button object to be a menu button object for the right eye and a menu button object for the left eye.

As a result, in the example in A in FIG. 43, a menu button #1 and menu button #2, and an offset changing button 195, which are 3D images having different lengths in the same depth direction, are displayed on this screen. Note that while description is made as offset changing button 195 here to make the description easier to understand, the offset changing button 195 is a menu button #3.

The length of the menu button #1 in the depth direction is the sum of the length in the depth direction corresponding to the offset information in increments of ODSs described in the ODS for the menu button #1, and the length in the depth direction corresponding to the offset information in increments of screens of the image including the menu button #1.

In the same way as with the case of the menu button #1, the length of the menu button #2 and the offset changing button 195 in the depth direction is also the sum of the length in the depth direction corresponding to the offset information in increments of ODSs for the menu button #2 and the offset changing button 195, and the length in the depth direction corresponding to the offset information in increments of screens including the menu button #2 and the offset changing button 195. Note however, that with the example in FIG. 43, the offset value included in the offset information in increments of ODSs for the menu button #2 and the offset changing button 195 is 0, so the length of the menu button #2 and the offset changing button 195 in the depth direction is a length corresponding to the offset information in increments of screens of the screen including the menu button #2 and the offset changing button 195.

With the screen in A in FIG. 43, upon the user operating the offset changing button 195 using the input unit 21, to instruct changing of offset, the screen of the display unit 51 is changed to the screen shown in B in FIG. 43.

Specifically, upon the offset changing button 195 being operated, the playing device 310 adds a vector representing the offset changing information in increments of menu buttons within the set offset command in increments of buttons, to a vector representing the offset information in increments of ODSs that is currently set. The offset information in increments of ODSs, represented by a vector obtained as the result of addition, is set as new offset information in increments of ODSs. As a result, the lengths of the menu button #1, menu button #2, and offset changing button 195 in the depth direction increase in the depth direction by a length corresponding to the offset changing information in increments of menu buttons within the set offset command in increments of buttons.

Note that in the example in FIG. 43, offset changing information is not included in the set offset command in increments of buttons for the menu button #2 and offset changing button 195, so the distance in the depth direction of the menu button #2 and offset changing button 195 does not change before and after operation of the offset changing button 195.

Sixth Embodiment

Configuration Example of Display Set in Sixth Embodiment of Disc

Figure 44:
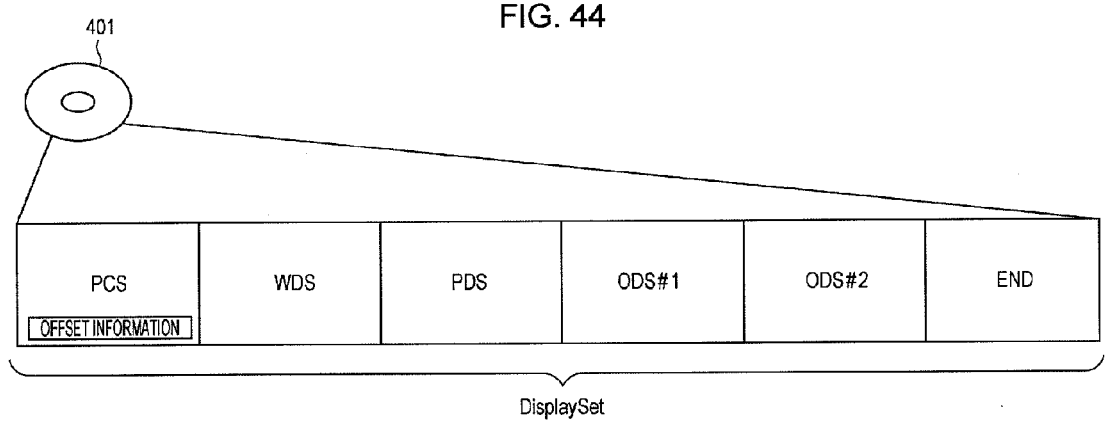
FIG. 44 is a diagram illustrating a configuration example of a display set of subtitle data according to a sixth embodiment of a disc to which the present invention has been applied.
Figure 45:
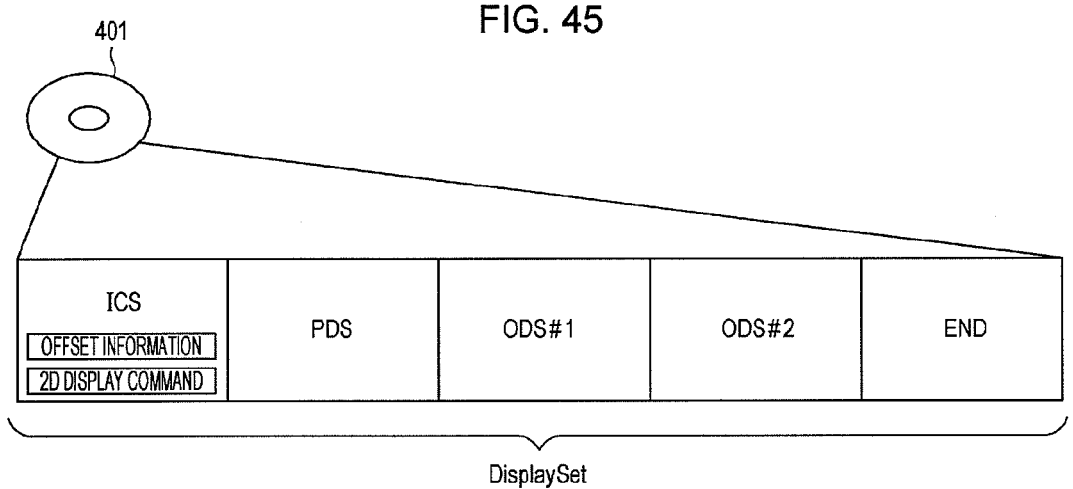
FIG. 45 is a diagram illustrating a configuration example of a display set of menu data according to the sixth embodiment of the disc to which the present invention has been applied.

FIG. 44 is a diagram illustrating a configuration example of a display set of subtitle data according to a sixth embodiment of a disc to which the present invention has been applied, and FIG. 45 is a diagram illustrating a configuration example of a display set of menu data.

As shown in FIG. 44, with a disc 401, offset information in increments of screens is described in the PCS in the same way as with the disc 11.

As shown in FIG. 45, with the disc 401, offset information in increments of screens is described in the ICS in the same way as with the disc 11. Also, with the disc 401, 2D display commands are described in the ICS.

A 2D display command is a navigation command for changing subtitles and menu buttons displayed in 3D into 2D display. With the sixth embodiment, the offset values of subtitles and menu buttons in increments of screens are ignored due to a 2D display command.

That is to say, in the case of a subtitle, the offset value described in the PCS, the offset value for each plane set by the navigation command, and the offset value set in each ODS, are ignored. In the same way, in the case of a menu button, the offset value described in the ICS, the offset value for each plane set by the navigation command, and the offset value set in each ODS, are ignored. In the event that offset values have been set for each menu button by navigation commands, these values are ignored as well, so that a playing device 410 (described later) displays in 2D the subtitles and menus which should be displayed in 3D.

As described above, a 2D command is described in the disc 401, so display of subtitles and menu buttons at the playing device 410 can be changed from 3D to 2D display. In the same way, display can be changed again from 2D display to 3D display as necessary.

[Detailed Configuration Example of Playing Device]

Figure 46:
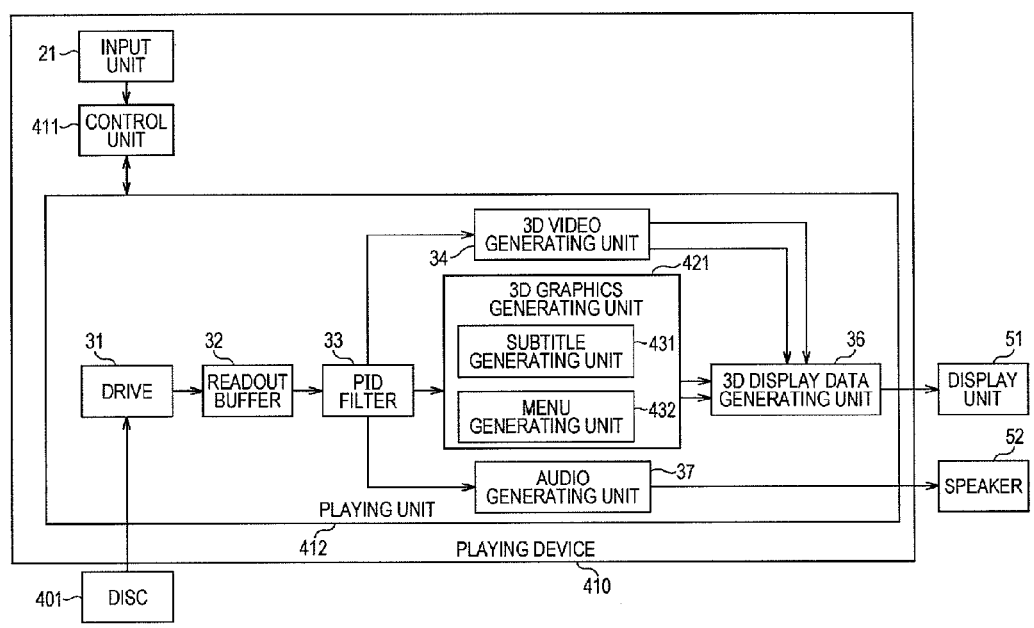
FIG. 46 is a block diagram illustrating a configuration example of a playing device.

FIG. 46 is a block diagram illustrating a configuration example of the playing device 410 for playing the above-described disc 401.

Of the configurations shown in FIG. 46, configurations the same as the configurations in FIG. 13 are denoted with the same reference numerals. Redundant description will be omitted as appropriate.

The configuration of the playing device 410 in FIG. 46 mainly differs from the configuration in FIG. 13 with regard to the point that a control unit 411 is provided instead of the control unit 22, and a playing unit 412 is provided instead of the playing unit 23. The configuration of the playing unit 412 differs from the configuration in FIG. 13 with regard to the point that a 3D graphics generating unit 421 is provided instead of the 3D graphics generating unit 35.

The control unit 411 controls the playing unit 412 in accordance with instructions from the input unit 21. Also, in response to an instruction corresponding to the operation of that menu button from the input unit 21, the control unit 411 requests the 3D graphics generating unit 421 for a command corresponding to the menu button. The control unit 411 then supplies an instruction to the 3D graphics generating unit 421, to invalidate the offset values in accordance with the 2D display command that is transmitted as a result thereof.

The 3D graphics generating unit 421 is configured of a subtitle generating unit 431, and a subtitle generating unit 432. The subtitle generating unit 431 generates subtitle data for the right eye and subtitle data for the left eye based on the offset information in increments of screens, using PES packets of subtitle data supplied from the PID filter 33. The subtitle generating unit 431 then supplies the subtitle data for the right eye and subtitle data for the left eye to the 3D display data generating unit 36 as 3D subtitle data. In the event that the 2D display command has already been received at this point, the offset values are not reflected at the playing device, and there are cases wherein 2D-izing processing is performed by making the subtitle data for the right eye and the subtitle data for the left eye to be the same. The following is a continuation of the description of performing 2D-izing processing after having performed 3D-izing processing first.

The subtitle generating unit 431 views the offset value of subtitles in increments of screens to be 0 in accordance with the command transmitted from the control unit 411, and updates the offset information of subtitles in increments of screens.

The menu generating unit 432 generates menu data for the right eye and menu data for the left eye based on the offset information in increments of screens, using PES packets of menu data supplied from the PID filter 33. The menu generating unit 432 then supplies the menu data for the right eye and menu data for the left eye to the 3D display data generating unit 36 as 3D menu data. In the event that the 2D display command has already been received at this point, the offset values are not reflected at the playing device, and there are cases wherein 2D-izing processing is performed by making the menu data for the right eye and the menu data for the left eye to be the same.

Also, the menu generating unit 432 transmits the 2D display command included in the ICS to the control unit 411, in response to a request from the control unit 411 for a command corresponding to the 2D display button which is a menu button for instructing 2D display. The menu generating unit 432 then views the offset value of menu buttons in increments of screens in accordance to the instruction transmitted from the control unit 411 to be 0, and updates the offset information in increments of screens for the menu button.

[Detailed Configuration Example of Subtitle generating Unit]

Figure 47:
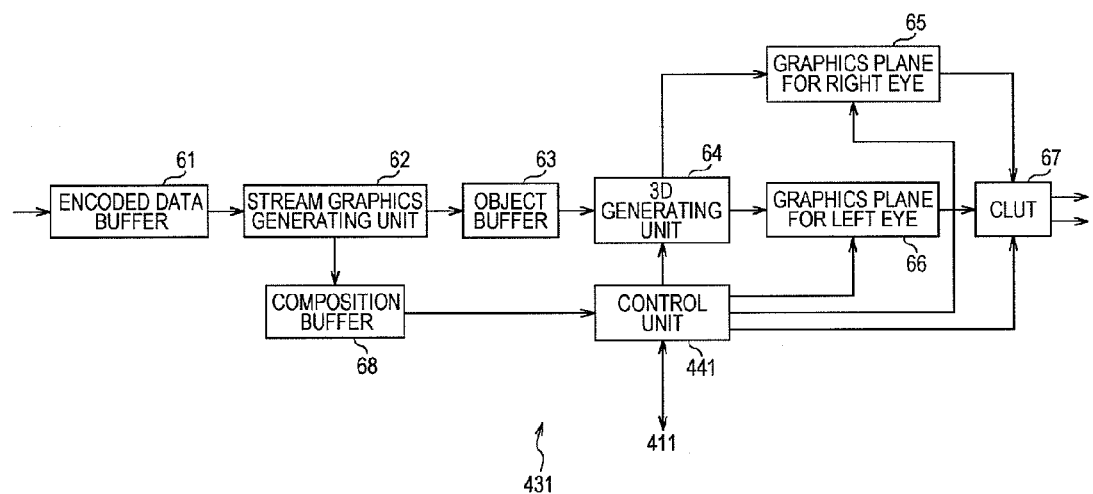
FIG. 47 is a block diagram illustrating a detailed configuration example of the subtitle generating unit in FIG. 46.

FIG. 47 is a block diagram illustrating a detailed configuration example of the subtitle generating unit 431 of the playing device 410.

Of the configurations shown in FIG. 47, configurations the same as the configurations in FIG. 14 are denoted with the same reference numerals. Redundant description will be omitted as appropriate.

The configuration of the subtitle generating unit 431 in FIG. 47 mainly differs from the configuration in FIG. 14 with regard to the point that a control unit 441 is provided instead of the playing unit control unit 69.

In the same way as with the control unit 69, the control unit 441 reads out the offset information in increments of screens, included in each PCS from the composition buffer 68, and supplies this to the 3D generating unit 64. Also, in the same way as with the control unit 69, at a timing based on the PTS included in the PES packet header, the control unit 441 instructs the graphics plane for right eye 65 to transfer, and also instructs the graphics plane for left eye 66 to transfer. Further, in the same way as with the control unit 69, the control unit 441 reads out the PDS from the composition buffer 68, and supplies this to the CLUT 67.

Also, the control unit 441 controls each part in accordance with commands from the control unit 411 (FIG. 46). Further, the control unit 441 receives the instruction to invalidate the offset values transmitted from the control unit 411. The control unit 441 sets 0 to the new offset information in increments of screens, in accordance with the received instruction. The control unit 441 supplies the offset information including that offset value in increments of screens to the 3D generating unit 64.

[Detailed Configuration Example of Menu Generating Unit]

The menu generating unit 432 of the playing device 410 is configured in the same way as the subtitle generating unit 431 in FIG. 47, except for the object of processing being menu data instead of subtitle data, so illustration thereof in the drawings is omitted. Note, however, that the control unit of the menu generating unit 432 reads out the 2D command included in the ICS from the composition buffer and transmits this to the control unit 411, in response to a request for a command corresponding to the 2D display button from the control unit 411.

[Description of Processing of Playing Device]

Playing processing, 3D graphics generating processing, and subtitle generating processing, by the playing device 410, are each the same as the playing processing in FIG. 15, the 3D graphics generating processing in FIG. 16, and subtitle generating processing in FIG. 17, so description will be omitted.

Figure 48:
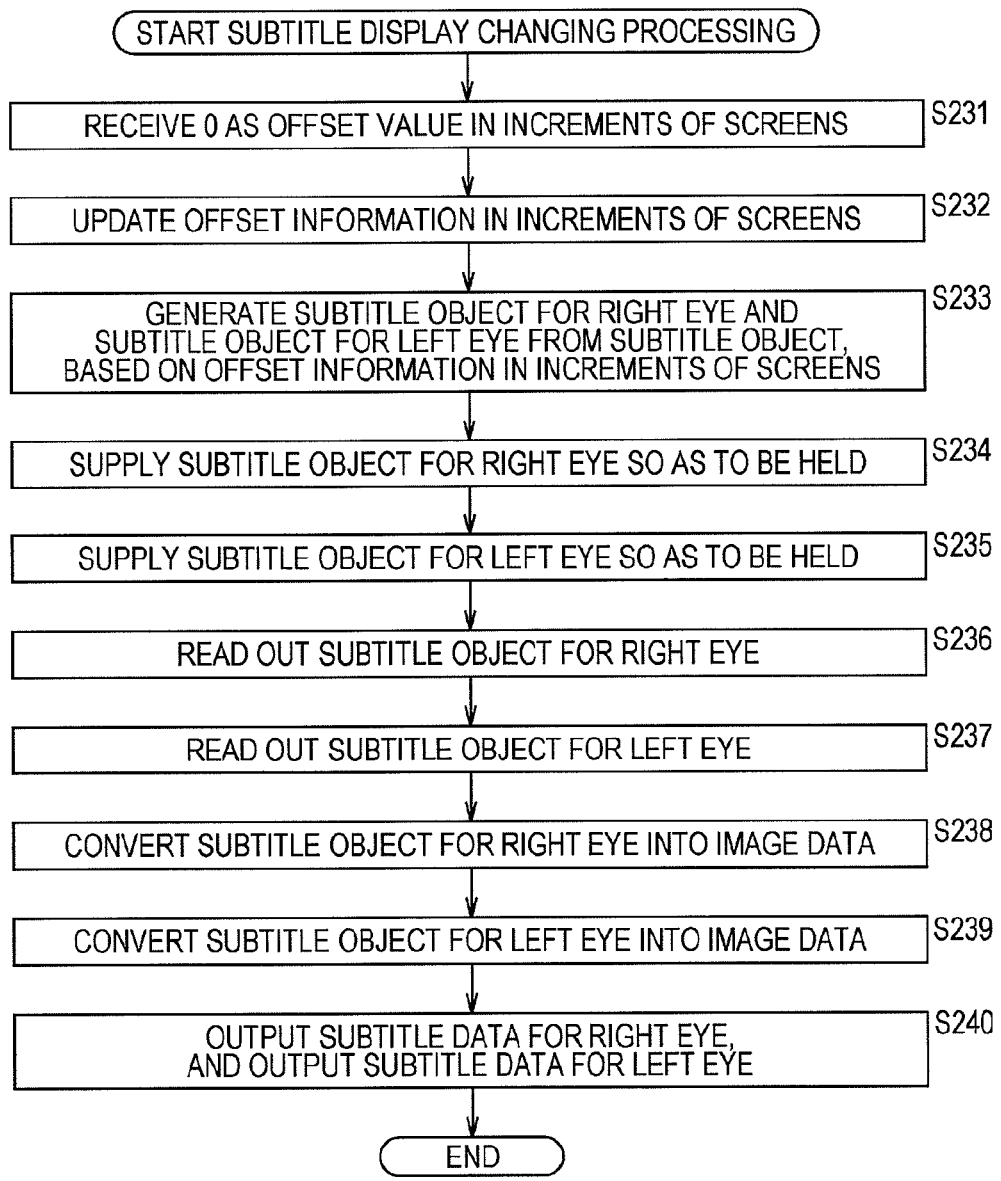
FIG. 48 is a flowchart describing subtitle display changing processing with the subtitle generating unit in FIG. 47.

FIG. 48 is a flowchart for describing the details of subtitle display changing processing by the subtitle generating unit 431 of the playing device 410. This subtitle display changing processing is started when the control unit 411 transmits an instruction to invalidate the offset values, in response to an instruction corresponding to an operation of the 2D display button from the input unit 21.

In step S233 of FIG. 48, the control unit 441 receives 0 as an offset value of subtitles in increments of screens from the control unit 411 (receives an instruction to invalidate offset values). In step S232, the control unit 441 views the offset values of subtitles in increments of screens to be 0 in accordance with the instruction received form the control unit 411, and updates the offset information in increments of screens. The control unit 441 then supplies the offset information following updating to the 3D generating unit 64, and advances the flow to step S233.

In step S233, the 3D generating unit 64 generates subtitle objects for the right eye and subtitle objects for the left eye based on the offset information in increments of screens supplied from the control unit 441, and advances the flow to step S234. The processing of steps S234 through S240 is the same as the processing of steps S67 through S73 in FIG. 17, and accordingly description will be omitted.

Note that the menu display changing processing menu generating unit 432 is performed in the same way as the subtitle display changing processing in FIG. 48, except for the object of processing being menu data instead of subtitle data, so description will be omitted.

Figure 49:
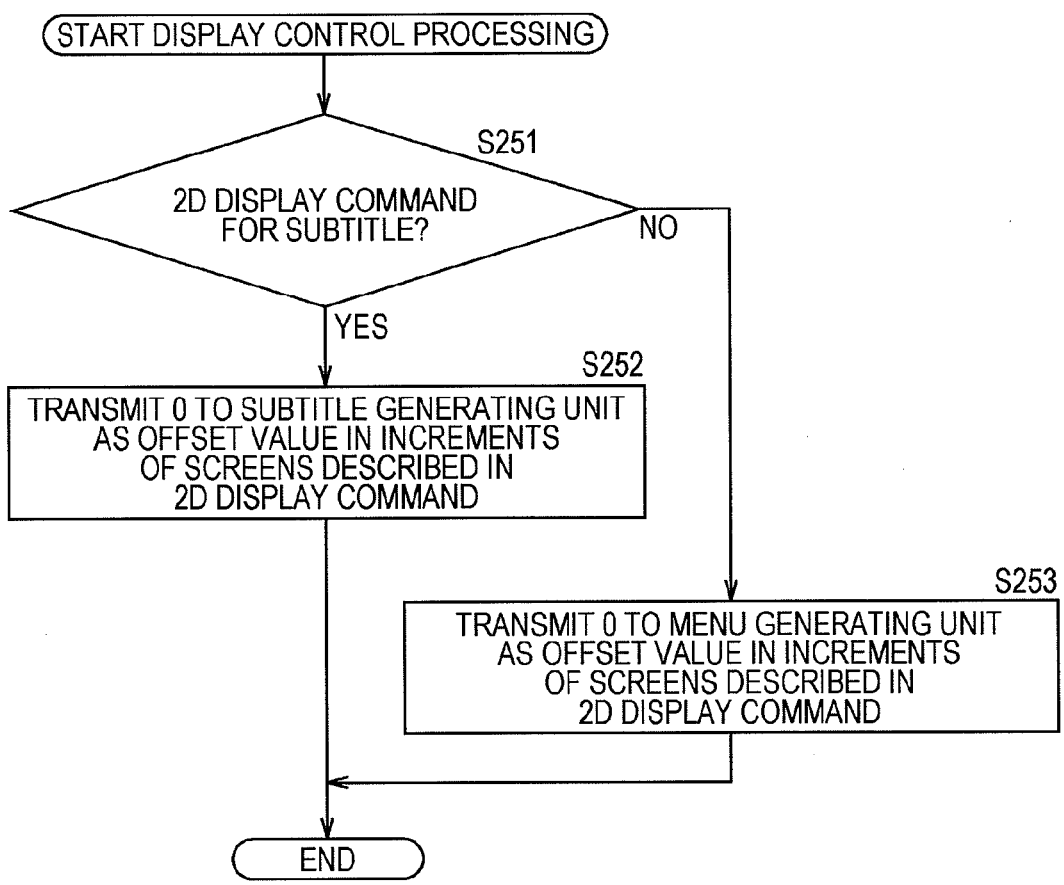
FIG. 49 is a diagram describing details of display control processing with the display device in FIG. 46.

FIG. 49 is a flowchart for describing details of display control processing by the playing device 410. This display control processing is started when the control unit 411 requests the menu generating unit 432 for a command corresponding to the 2D display button, in response to the instruction corresponding to operation of the 2D display button from the input unit 21.

In step S251 in FIG. 49, the control unit 411 determines whether or not the 2D display command transmitted from the menu generating unit 432 in response to the request is a 2D display command for subtitles. In the event that determination is made in step S251 to be a 2D display command for subtitles, in step S252 the control unit 411 transmits 0 to the subtitle generating unit 431, as the offset value in increments of screens of the subtitle described in the 2D display command for subtitles. That is to say, the control unit 411 supplies the subtitle generating unit 431 with an instruction to invalidate the offset value. The flow then ends.

On the other hand, in the event that determination is made in step S251 not to be a 2D display command for subtitles, i.e., in the event that a 2D display command for menu buttons has been transmitted from the menu generating unit 432, the flow advances to step S253. In step S253, the control unit 411 transmits 0 to the menu generating unit 432, as the offset value in increments of screens of the menu buttons described in the 2D display command for subtitles. That is to say, the control unit 411 supplies the menu generating unit 432 with an instruction to invalidate the offset value. The flow then ends.

Seventh Embodiment

Figure 50:
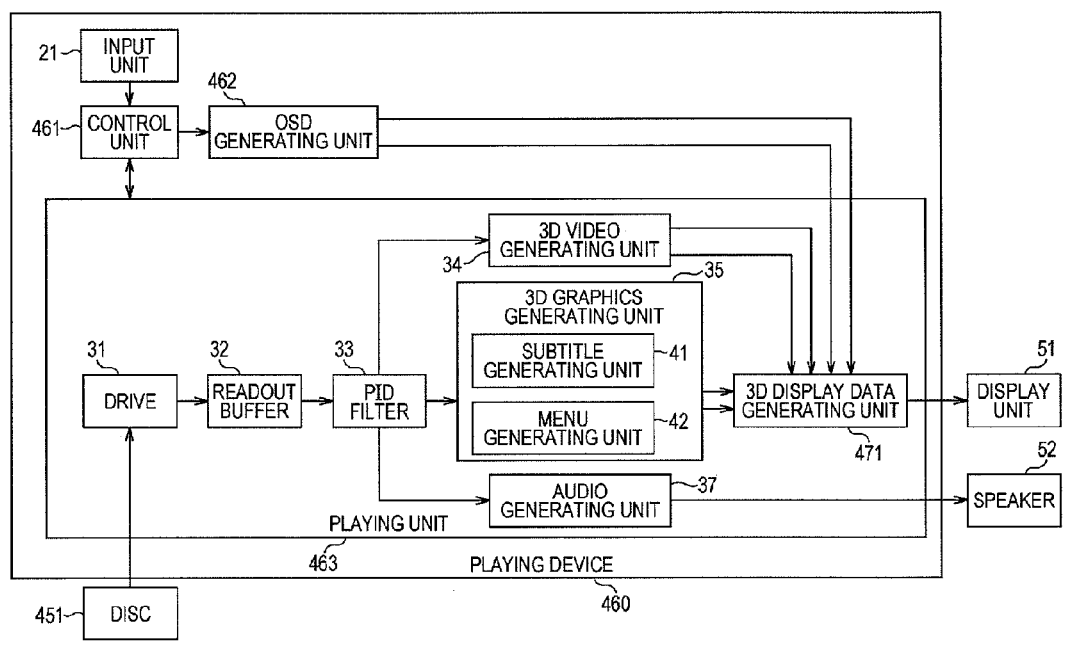
FIG. 50 is a block diagram illustrating a configuration example of a playing device for playing a disc according to a seventh embodiment to which the present invention has been applied.

FIG. 50 is a block diagram illustrating a configuration example of a playing device for playing discs according to a seventh embodiment to which the present invention has been applied.

Of the configurations shown in FIG. 50, configurations the same as the configurations in FIG. 13 are denoted with the same reference numerals. Redundant description will be omitted as appropriate.

The configuration of a playing device 460 in FIG. 50 mainly differs from the configuration in FIG. 13 with regard to the point that a control unit 461 is provided instead of the control unit 22, the point that an OSD generating unit 462 is newly provided, and the point that a playing unit 463 is provided instead of the playing unit 23. The configuration of the playing unit 463 differs from the configuration in FIG. 13 with regard to the point that a 3D display data generating unit 471 is provided instead of the 3D display data generating unit 36.

The playing device 460 is a playing device for playing a disc 451. With the disc 451, of the offset information described in the disc 451 that which has a 3D display at the nearest side based on the offset information thereof is described in the index file as maximum offset information. The playing device 460 displays an OSD (On Screen Display) image such as a menu unique to the playing device 460 at the closest side, based on user instructions and the maximum offset information.

Specifically, the control unit 461 controls the playing unit 463 in accordance with an instruction from the input unit 21. For example, the control unit 461 controls the drive 31 in accordance with an instruction for OSD display from the input unit 21, reads out the maximum offset information described in the index file of the disc 451, and supplies this to an OSD generating unit 462.

The OSD generating unit 462 generates OSD image data from predetermined OSD image data stored in unshown memory built into the playing device 460, based on the maximum offset information supplied from the control unit 461. The playing device 460 may be holding image data for the right eye and left eye for 3D display of the OSD, in the storage region of the memory within the playing device 460. The following is description of a configuration for 3D display of an OSD.

Specifically, the OSD generating unit 462 takes predetermined OSD image data stored in unshown memory as OSD image data for the left eye. The OSD generating unit 462 generates OSD image data for an OSD image obtained as a result of shifting an OSD image corresponding to the OSD image data for the left eye in the offset direction according to the maximum offset information, by a value greater than the offset value. The OSD generating unit 462 then takes that OSD image data as image data for the right eye. The OSD generating unit 462 supplies the OSD image data for the right eye and the OSD image data for the left eye to the 3D display data generating unit 471 of the playing unit 463 as 3D OSD image data.

The 3D display data generating unit 471 synthesizes 3D video data from the 3D video generating unit 34, 3D subtitle data from the 3D graphics generating unit 35, and 3D OSD image data from the OSD generating unit 462, with each data for the left and right eyes. The 3D display data generating unit 471 supplies the display data for the left eye and the display data for the right eye obtained as a result of synthesizing, to the display unit 51 as 3D display data.

[Description of Processing of Playing Device]

Playing processing, 3D graphics generating processing, and subtitle generating processing, by the playing device 460, are each the same as the playing processing in FIG. 15, the 3D graphics generating processing in FIG. 16, and subtitle generating processing in FIG. 17, so description will be omitted.

Figure 51:
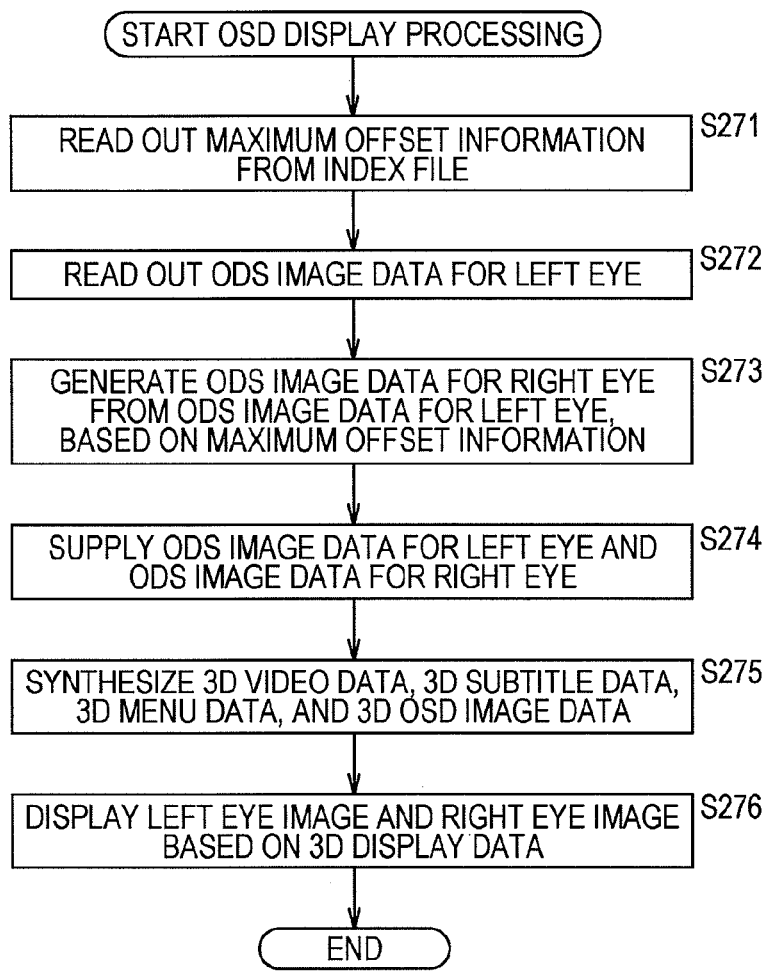
FIG. 51 is a flowchart describing OSD display processing with the playing device in FIG. 50.

FIG. 51 is a flowchart for describing the details of OSD display processing by the playing device 460. This OSD display processing is started when the display of an OSD image has been instructed from the input unit 21.

In step S271 of FIG. 51, the control unit 461 controls the drive 31 to read out maximum offset information from the index file in the disc 451, and supplies this to the OSD generating unit 462.

In step S272, the OSD generating unit 462 reads out predetermined OSD image data from unshown memory as OSD image data for the left eye. In step S273, the OSD generating unit 462 generates OSD image data for the right eye from the OSD image data for the left eye, based on the maximum offset information.

In step S274, the OSD generating unit 462 supplies the ODS image data for the left eye and the OSD image data for the right eye to the 3D display data generating unit 471 as 3D OSD image data. In step S275, the 3D display data generating unit 471 synthesizes 3D video data from the 3D video generating unit 34, 3D subtitle data and 3D menu data from the 3D graphics generating unit 35, and 3D OSD image data from the OSD generating unit 462. The 3D display data generating unit 471 then supplies the display data for the left eye and the display data for the right eye obtained as a result of synthesizing, to the display unit 51 as 3D display data.

In step S276, the display unit 51 displays a left eye image corresponding to the display data for the left eye and a right eye image corresponding to the display data for the right eye alternately or simultaneously, based on the 3D image data supplied from the 3D display data generating unit 471. The flow then ends.

As described above, maximum offset information is described in the disc 451, so the playing device 460 can display the OSD image at the closest side based on the maximum offset information. Accordingly, the user can visually recognize the OSD image in a sure manner.

Also, the maximum offset information is described in the index file of the disc 451, so the display position in the depth direction of OSD images can be made constant for the entire disc 451. As a result, user confusion due to changing display positions in the depth direction of OSD images can be prevented.

Note that instead of the maximum offset information, an offset value based on the maximum offset information may be described in the index file. For example, an offset value restricted to an offset direction in the positive direction where the display position is further at the closer side than the 3D display position corresponding to the maximum offset information. In this case, in the event that the offset direction of the maximum offset information is the negative direction, for example, 0 is described in the index file as an offset value.

Eighth Embodiment

Configuration Example of Display Set in Eighth Embodiment of Disc

Figure 53:
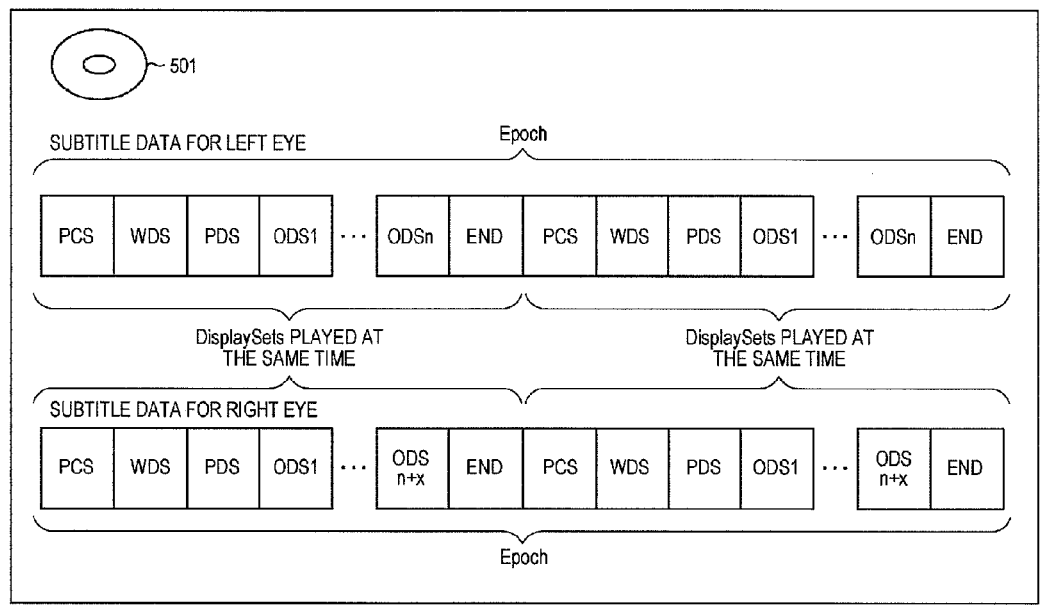
FIG. 53 is a diagram describing a configuration example of epochs of subtitle data according to an eighth embodiment of a disc to which the present invention has been applied.

FIG. 53 is a diagram illustrating a configuration example of epochs (Epoch) of subtitle data in an eighth embodiment of a disc to which the present invention has been applied.

With a disc 501 in FIG. 53, two AV streams of an AV stream for the left eye and an AV stream for the right eye are recorded. As shown in FIG. 53, the structures of the epochs of the stream for the left eye and the AV stream for the right eye, which are played simultaneously, are the same. That is to say, the number of display sets in the epoch for the left eye and the number of display sets in the epoch for the right eye which are played simultaneously, are the same.

Also, the PTS of each segment is the same between a display set for the left eye and a display set for the right eye, which are played simultaneously. Accordingly, the timing for displaying subtitles for the left eye and subtitles for the right eye can be made to be the same time.

The PTS included in the PES packet header of the PCS is obtained based on the time necessary for rendering the subtitles corresponding to the ODS and the time necessary for rendering the window, at the time of decoding the ODS corresponding to the PCS. Accordingly, between a display set for the left eye and a display set for the right eye, which are played simultaneously, the vertical and horizontal size of the subtitles corresponding to the ODS with the same sub-image ID, and the vertical and horizontal size of the windows having the same window ID, are the same. Accordingly, PTSs included in the PES packet header of the PCS can be synchronized between a display set for the left eye and a display set for the right eye, without contradiction.

Also, the sub-image ID and window ID is the same between a display set for the left eye and a display set for the right eye which are played simultaneously. Accordingly, images corresponding to the same subtitle are displayed at the same time, so the user can view the subtitle in 3D.

Further, between a display set for the left eye and a display set for the right eye which are played simultaneously, the number of segments excluding the ODS is the same, and the DTS of each segment are the same.

Note that the shape of the subtitle or menu button corresponding to the same sub-image ID may be different. Further, the PDS may be different.

The structure of epochs in menu data, and the relation of display sets for the left eye and display sets for the right eye which are played simultaneously, is the same except that the PCS is replaced with the ICS, so description will be omitted.

It should be noted however, that in the event that an animation is to be run at a predetermined frame rate at the time of a user selecting a menu button or the like, there is the need for the frame rate of the animation for the menu button for the left eye and the menu button for the right eye to be the same. Accordingly, the field for determining the frame rate of animation, included in the ICS, is the same between a display set for the left eye and a display set for the right eye corresponding to such a menu button. Accordingly, the menu button for the left eye and the menu button for the right eye are constantly animated at a certain frame rate, so the user can view the 3D menu button being animated at a certain frame rate.

Also, in the event of performing slide-in or the like due to animation, called effects, such as at the time of starting display of a menu button or the like, there is a need to set the number of frames of animation and the intervals thereof to be the same between the menu button for the left eye and the menu button for the right eye. Accordingly, between a display set for the left eye and a display set for the right eye corresponding to such a menu button, the field describing the number of frames of animation and the intervals thereof included in the ICS are the same. Accordingly, the menu button for the left eye and the menu button for the right eye always exhibit effects in a corresponding manner, so the user can view the 3D menu button with effects.

[Description of Window]

Figure 54:
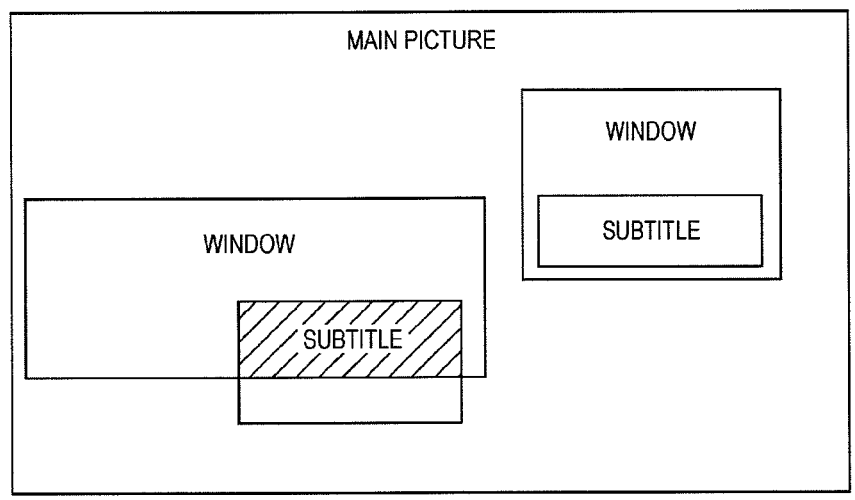
FIG. 54 is a diagram describing windows for subtitle data.

FIG. 54 is a diagram describing windows corresponding to display sets of subtitle data.

As shown in FIG. 54, two or less windows are placed within a screen corresponding to display sets of subtitle data, so as to not overlap. Subtitles corresponding to ODS are displayed just within regions in windows. Accordingly, with the subtitle displayed at the left side within the screen in FIG. 54, only the region displayed with hatching within the window is displayed, and other portions are not displayed.

[Configuration Example of Playing Device]

Figure 55:
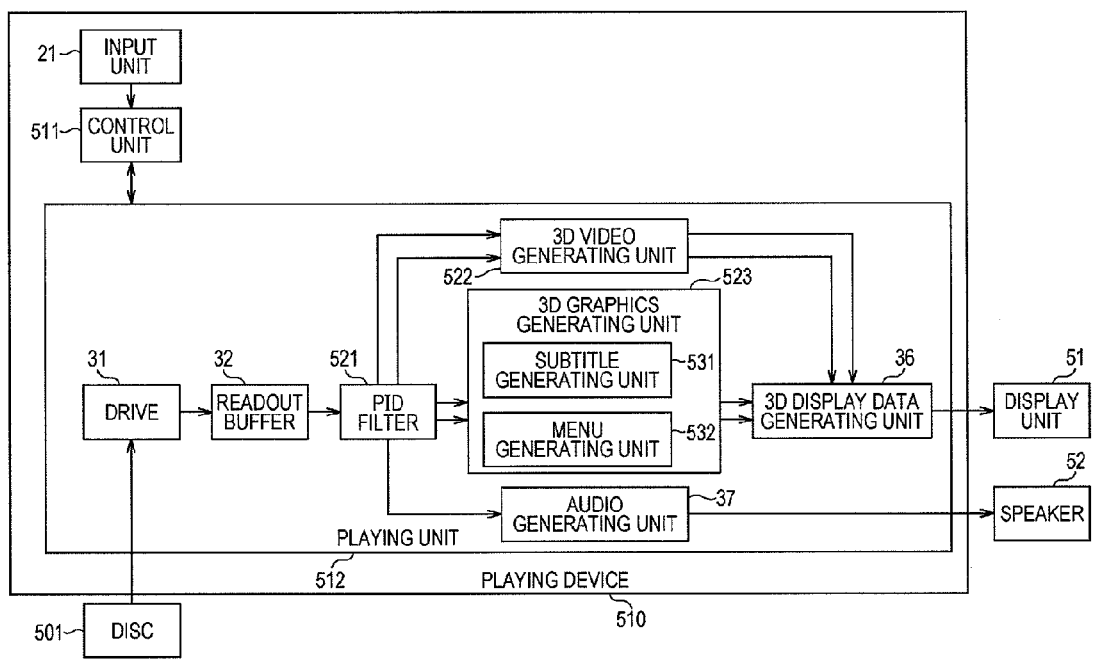
FIG. 55 is a block diagram describing a configuration example of a playing device.

FIG. 55 is a block diagram illustrating a configuration example of the playing device 510 for playing the above-described disc 501.

Of the configurations shown in FIG. 55, configurations the same as the configurations in FIG. 13 are denoted with the same reference numerals. Redundant description will be omitted as appropriate.

The configuration of the playing device 510 in FIG. 55 mainly differs from the configuration in FIG. 13 with regard to the point that a control unit 511 is provided instead of the control unit 22, and a playing unit 512 is provided instead of the playing unit 23. The configuration of the playing unit 512 differs from the configuration in FIG. 13 with regard to the point that a PID filter 521, a 3D video generating unit 522, and a 3D graphics generating unit 523, are provided instead of the PID filter 33, 3D video generating unit 34, and 3D graphics generating unit 35.

The control unit 511 controls the playing unit 512 in accordance with instructions from the input unit 21. For example, the control unit 511 controls the drive 31 of the playing unit 512 to read out the index file, movie object file, playlist file, clip information file, and so forth, from the disc 501. Also, the control unit 511 recognizes packets of packet Nos. for an AV stream for the left eye and an AV stream for the right eye to be played, based on the clip information file that has been read out. The control unit 511 then controls the drive 31 to read out the AV stream for the left eye and AV stream for the right eye for those packets.

The PID filter 521 extracts each of the video data for the left eye and subtitle data PES packets included in the AV stream for the left eye, based on the PIDs for each packet in the AV stream for the left eye from the readout buffer 32. Also, the PID filter 521 extracts each of the menu data for the left eye and audio data PES packets included in that AV stream for the left eye.

The PID filter 521 also extracts each of the video data for the right eye and subtitle data PES packets for the right eye included in the AV stream for the right eye, based on the PIDs for each packet in the AV stream for the right eye from the readout buffer 32. Also, the PID filter 521 extracts PES packets of the menu data for the right eye included in the AV stream for the right eye, based on the PIDs of the packets in the AV stream for the right eye.

The 3D video generating unit 522 decodes the PES packets for video data for the left eye and the PES packets for video data for the right eye, supplied from the PID filter 521. The 3D video generating unit 522 then supplies the video data for the left eye and the video data for the right eye, obtained as the result of decoding, to the 3D display data generating unit 36 as 3D video data.

The 3D graphics generating unit 523 is configured of a subtitle generating unit 531 and a menu generating unit 532. The subtitle generating unit 531 decodes PES packets of subtitle data for the left eye and subtitle data for the right eye supplied from the PID filter 521. The subtitle generating unit 531 then supplies the subtitle data for the left eye and subtitle data for the right eye obtained as a result of the decoding, to the 3D display data generating unit 36, as 3D subtitle data.

The menu generating unit 532 decodes PES packets of menu data for the left eye and menu data for the right eye supplied from the PID filter 521. The menu generating unit 532 then supplies the menu data for the left eye and menu data for the right eye obtained as a result of the decoding, to the 3D display data generating unit 36, as 3D menu data.

[Detailed Configuration Example of Subtitle Generating Unit]

Figure 56:
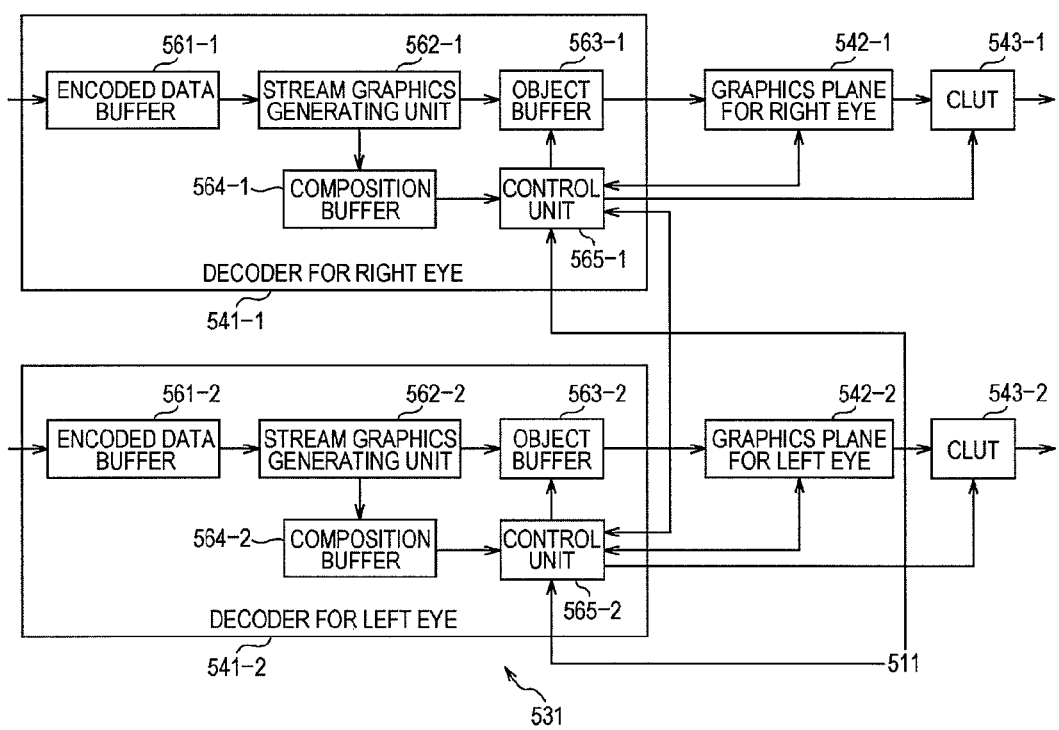
FIG. 56 is a diagram illustrating a detailed configuration example of the subtitle generating unit in FIG. 55.

FIG. 56 is a block diagram illustrating a detailed configuration example of the subtitle generating unit 531 in FIG. 55.

In FIG. 55, the subtitle generating unit 531 is configured of a decoder for right eye 541-1, a decoder for left eye 541-2, a graphics plane for right eye 542-1, a graphics plane for left eye 542-2, a CLUT 543-1, and a CLUT 543-2.

The decoder for right eye 541-1 is configured of an encoded data buffer 561-1, a stream graphics generating unit 562-1, an object buffer 563-1, a 3D generating unit 564-1, and a graphics plane for right eye 565-1.

The encoded data buffer 561-1 holds, of the PES packets for subtitle data for the right eye supplied from the PID filter 521, the segments. The encoded data buffer 561-1 reads out the segments held therein, and supplies these to the stream graphics generating unit 562-1.

The stream graphics generating unit 562-1 decodes the ODSs supplied from the encoded data buffer 561-1. The stream graphics generating unit 562-1 then supplies the subtitle data for the right eye in an uncompressed state made up of index color obtained as a result thereof, to the object buffer 563-1 as a subtitle object for the right eye. The stream graphics generating unit 562-1 also supplies the PDS, PCS, and WDS supplied from the encoded data buffer 561-1 to the composition buffer 564-1.

The object buffer 563-1 holds the subtitle object for the right eye supplied from the stream graphics generating unit 562-1. The object buffer 563-1 deletes subtitle objects for the right eye held therein, in increments of epochs. Also, the object buffer 563-1 reads out subtitle objects for the right eye held therein and supplies these to the graphics plane for right eye 542-1 under control of the control unit 565-1.

The composition buffer 564-1 holds the PDS, PCS, and WDS supplied from the stream graphics generating unit 562-1.

The control unit 565-1 monitors the state of storage of one screen worth of subtitle objects for the right eye by the graphics plane for right eye 542-1, and notifies completion of storage of the one screen worth of subtitle objects for the right eye to the control unit 565-2. The control unit 565-1 instructs transfer to the graphics plane for right eye 542-1, based on the PTS included in the PES packet header or notification of completion of storage of the one screen worth of subtitle objects for the left eye from the control unit 565-2. Further, the control unit 565 reads out the PDS from the composition buffer 564, and supplies this to the CLUT 543-1.

Also, the control unit 565-1 controls each part following instructions from the control unit 511 (FIG. 55).

The decoder for left eye 541-2 is configured of an encoded data buffer 561-2, a stream graphics generating unit 562-2, an object buffer 563-2, a 3D generating unit 564-2, and a graphics plane for left eye 565-2. The decoder for left eye 541-2 is configured in the same way as the decoder for right eye 541-1, and performs the same processing except for the point that the object of processing is subtitle data for the left eye, so description will be omitted.

The graphics plane for right eye 542-1 holds one screen worth of subtitle objects for the right eye, supplied from the object buffer 563-1. The graphics plane for right eye 542-1 deletes the subtitle objects for the right eye which it holds in increments of epochs. Also, the graphics plane for right eye 542-1 reads out the subtitle objects for the right eye which it holds, and supplies to the CLUT 543-1, in response to an instruction from the control unit 565-1.

The graphics plane for left eye 542-2 holds one screen worth of subtitle objects for the left eye, supplied from the object buffer 563-2. The graphics plane for left eye 542-2 deletes the subtitle objects for the left eye which it holds in increments of epochs. Also, the graphics plane for left eye 542-2 reads out the subtitle objects for the left eye which it holds, and supplies to the CLUT 543-2, in response to an instruction from the control unit 565-2.

The CLUT 543-1 stores a table correlating the index color with Y, Cr, Cb values, based on the PDS supplied from the control unit 565-1. The CLUT 543-1 converts the index color of the subtitle objects for the right eye supplied from the graphics plane for right eye 542-1 into image data made up of Y, Cr, Cb values, based on the stored table. The CLUT 543-1 then supplies the image data to the 3D display data generating unit 36 as subtitle data for the right eye.

The CLUT 543-2 stores a table correlating the index color with Y, Cr, Cb values, based on the PDS supplied from the control unit 565-2. The CLUT 543-2 converts the index color of the subtitle objects for the left eye supplied from the graphics plane for left eye 542-2 into image data made up of Y, Cr, Cb values, based on the stored table. The CLUT 543-2 then supplies the image data to the 3D display data generating unit 36 as subtitle data for the left eye.

In this way, with the subtitle generating unit 531, the object buffer 563-1, object buffer 563-2, graphics plane for right eye 542-1, and graphics plane for left eye 542-2, are cleared, in increments of epochs. However, with the disc 401, the number of display sets configuring an epoch is the same between the AV stream for the right eye and the AV stream for the left eye, and accordingly, stopping of display of just one of the subtitles for the right eye and subtitles for the left eye cannot be performed. Consequently, subtitles can be constantly displayed in 3D.

Figure 57:
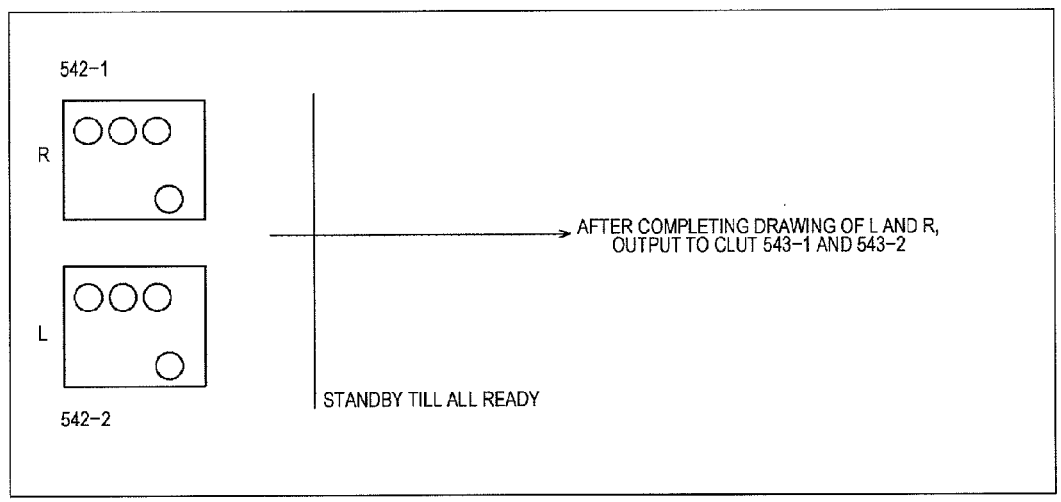
FIG. 57 is a diagram describing transfer instructions based on a completion notification by the control unit in FIG. 55.

FIG. 57 is a diagram for describing transfer instructions based on completion notification by the control units 565-1 and 565-2.

The control unit 565-1 monitors the state of storage of one screen worth of subtitle objects of the right eye by the graphics plane for right eye 542-1. In the event that storage of one screen worth of subtitle objects for the right eye has been completed at the graphics plane for right eye 542-1, the control unit 565-1 notifies this completion to the control unit 565-2.

The control unit 565-1 then stands by for a completion notification from the control unit 565-2. That is to say, as shown in FIG. 57, standby is performed until one screen worth of subtitle objects for the right eye and one screen worth of subtitle objects for the left eye are ready at the graphics plane for right eye 542-1 and the graphics plane for left eye 542-2. Upon receiving the completion notification, the control unit 565-1 instructs transfer to the graphics plane for right eye 542-1.

In the same way, the control unit 565-2 monitors the state of storage of one screen worth of subtitle objects for the left eye by the graphics plane for left eye 542-2. In the event that storage of one screen worth of subtitle objects for the left eye has been completed at the graphics plane for left eye 542-2, the control unit 565-2 notifies this completion to the control unit 565-1.

The control unit 565-2 then stands by for a completion notification from the control unit 565-1. Upon receiving the completion notification, the control unit 565-2 instructs transfer to the graphics plane for left eye 542-2.

As described above, with the playing device 510, after one screen worth of subtitle objects for the right eye and one screen worth of subtitle objects for the left eye are each ready at the graphics plane for right eye 542-1 and the graphics plane for left eye 542-2, transfer is performed.

Note that with the present embodiment, transfer from the graphics plane for right eye 542-1 and the graphics plane for left eye 542-2 has been synchronized, but transfer from the CLUTs 543-1 and 543-2 may be synchronized.

[Detailed Configuration Example of Menu Generating Unit]

Though omitted from illustrating in the drawings, the menu generating unit 532 is configured in the same way as with the subtitle generating unit 531 in FIG. 56, except for the point that the object of processing is not subtitle data but rather menu data.

Accordingly, with the menu generating unit 532 as well, transfer is performed after one screen worth of menu objects for the right eye and one screen worth of menu objects for the left eye are ready.

Accordingly, 3D display of menu buttons can be performed in a sure manner, even for cases wherein display is not performed based on PTS, such as when switching screen structure, when performing highlighted display in response to selection of menu buttons, when removing menu buttons, when adding menu buttons, and so forth.

Figure 58:
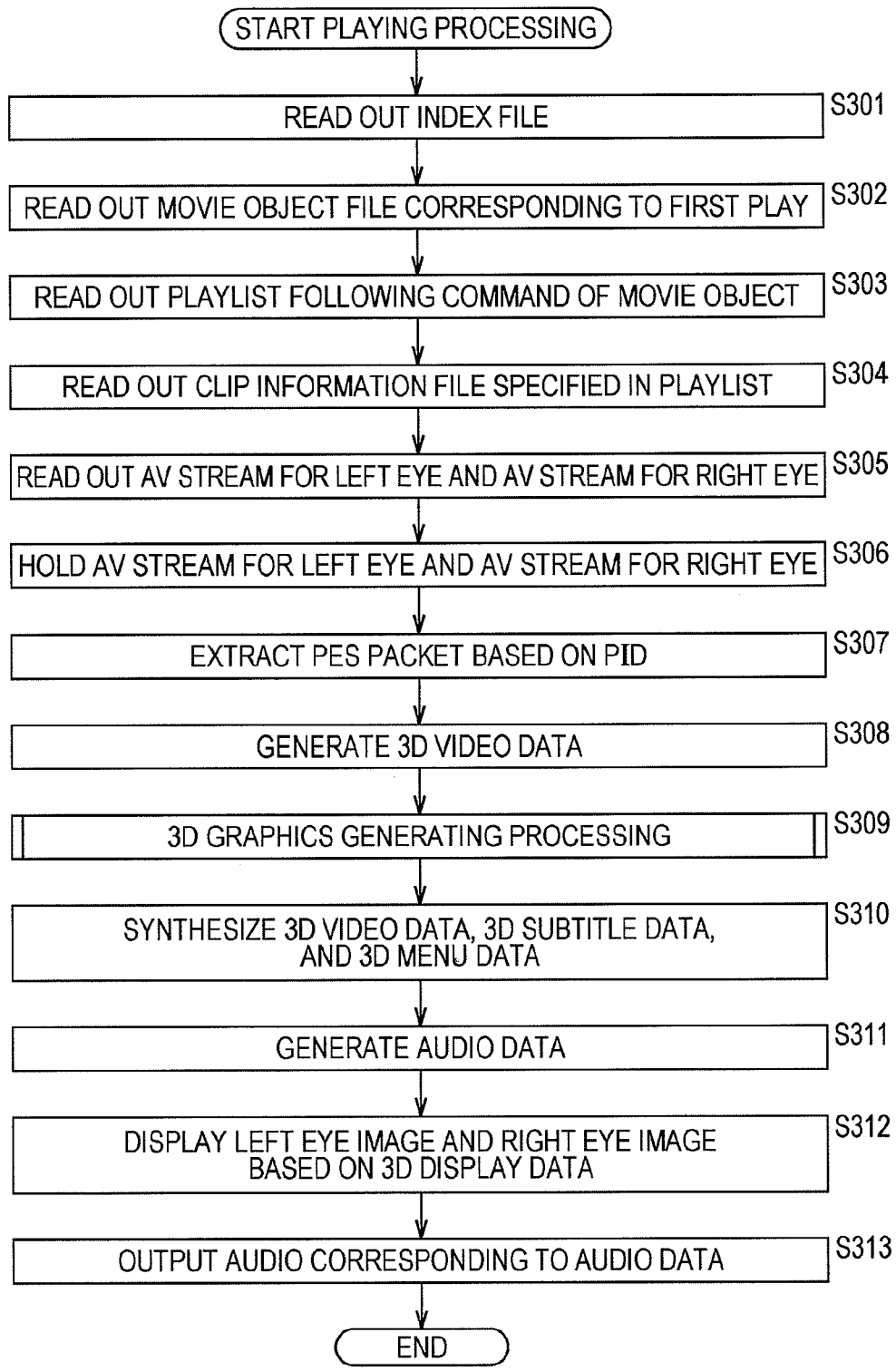
FIG. 58 is a flowchart describing playing processing with the playing device in FIG. 55.

FIG. 58 is a flowchart for describing the processing performed by the playing device 510. This playing processing is started when, for example, a disc 501 is mounted to the drive 31.

The processing of steps S301 through S304 is the same as the processing of steps S11 through S14 in FIG. 15, so description thereof will be omitted.

After the processing of step S304, the control unit 511 recognizes packet Nos. of the AV stream for the left eye and the AV stream for the right eye to be played, based on the playlist and clip information file. The control unit 511 then instructs the drive 31 to play the AV stream for the left eye and the AV stream for the right eye made up of the packets of the packet Nos. to be played.

In step S305, the drive 31 reads out the AV stream for the left eye and the AV stream for the right eye to be played, in response to the instruction from the control unit 511, and supplies these to the readout buffer 32. In step S306, the readout buffer 32 holds the AV stream for the left eye and the AV stream for the right eye supplied from the drive 31.

In step S307, the PID filter 521 extracts PES packets based on the PIDs of the packets of the AV stream for the left eye and the AV stream for the right eye from the readout buffer 32.

Specifically, the PID filter 521 extracts PES packets for each of the video data for the left eye, subtitles for the left eye, menu data for the left eye, and audio data, based on the PIDs of the packets in the AV stream for the left eye. Also, the PID filter 521 extracts PES packets for each of the video data for the right eye, and subtitles for the right eye, menu data for the right eye, based on the PIDs of the packets in the AV stream for the right eye.

In step S308, the 3D video generating unit 522 decodes the video data for the left eye and the video data for the right eye supplied from the PID filter 521, and generates 3D video data.

In step S309, the 3D graphics generating unit 523 generates 3D subtitle data using the subtitle data for the left eye and the for the right eye, and performs 3D graphics generating processing for generating 3D menu data using the menu data for the left eye and for the right eye. Details of this 3D graphics generating processing will be described with reference to FIG. 59 which will be described later.

After the processing of step S309, the flow advances to step S310. The processing of steps S310 through S313 is the same as the processing of steps S20 through S23 in FIG. 15, so description thereof will be omitted.

Note that while description has been made with FIG. 58 regarding playing processing immediately following mounting of the disc 501, the same playing processing is performed also in the case of playing a title corresponding to a movie object file other than for first play. Note however, that in this case, the movie object file read out in step S302 is a movie object file corresponding to the title No. of a title to be played in the index file.

Figure 59:
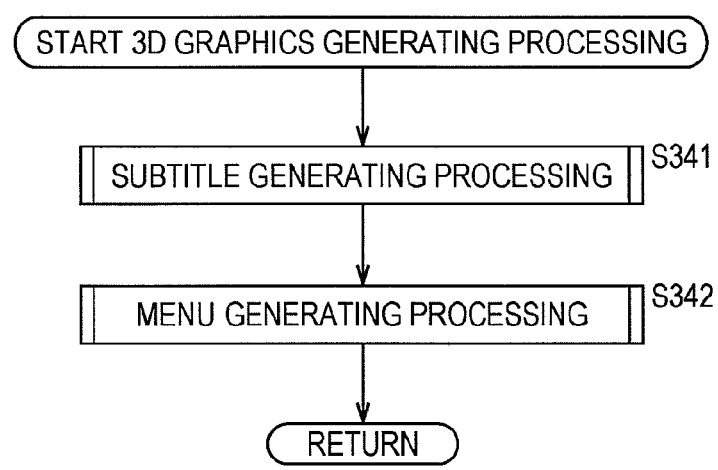
FIG. 59 is a flowchart describing details of subtitle generating processing in FIG. 58.

FIG. 59 is a flowchart for describing the details of 3D graphics generating processing in step S309 in FIG. 58.

In step S341 in FIG. 59, the subtitle generating unit 531 performs subtitle generating processing for generating 3D subtitle data using the PES packets for subtitle data for the left eye and subtitle data for the right eye. Details of this subtitle generating processing will be described with reference to FIG. 60 which will be described later.

In step S342, the menu generating unit 532 performs menu generating processing for generating 3D menu data using the PES packets for menu data for the left eye and menu data for the right eye, and the flow returns to step S309 in FIG. 58. Subsequently, processing from step S310 on is performed.

Figure 60:
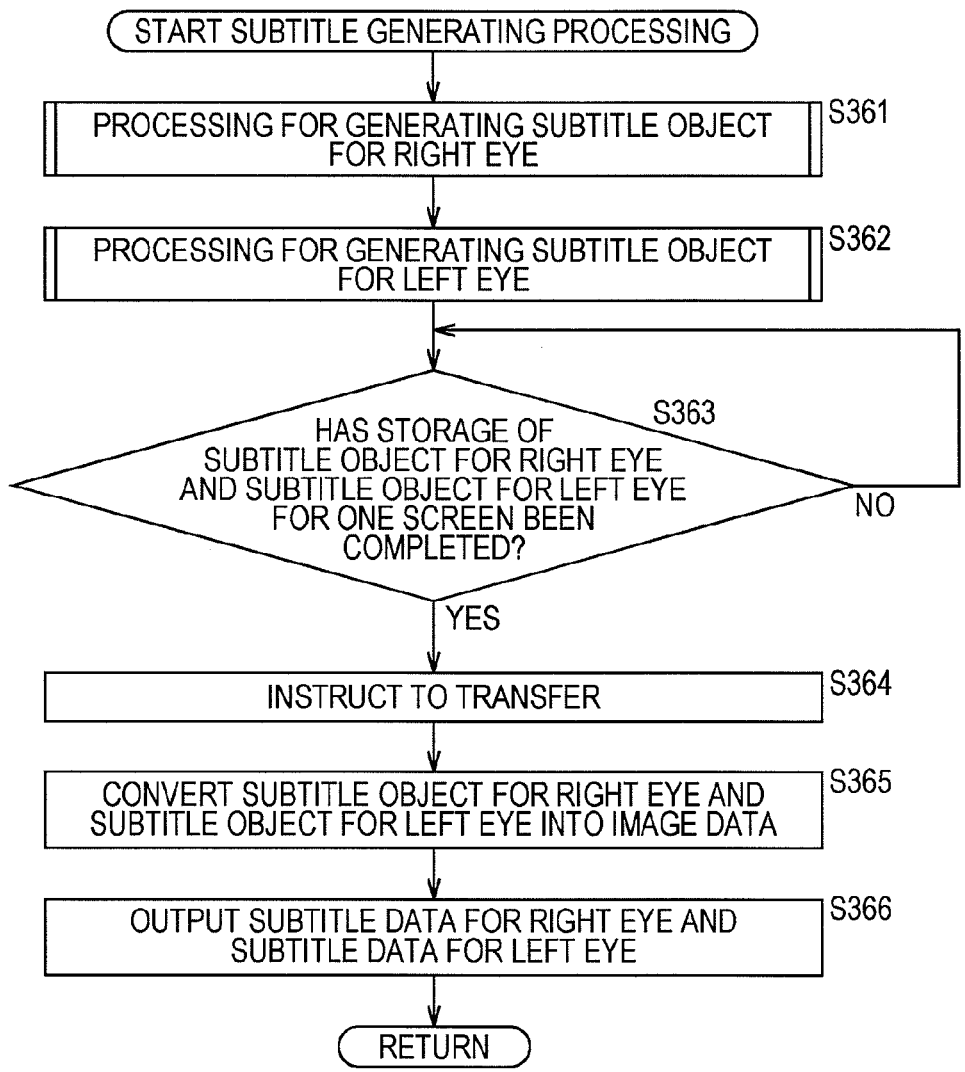
FIG. 60 is a flowchart describing details of subtitle generating processing in FIG. 59.

FIG. 60 is a flowchart for describing the details of subtitle generating processing of step S341 in FIG. 59.

In step S361 in FIG. 60, the decoder for right eye 541-1 performs subtitle object generating processing for the right eye, for generating subtitle objects for the right eye using the PES packets of subtitle data for the right eye from the PID filter 521. Details of the subtitle object generating processing for the right eye will be described with reference to FIG. 61 which will be described later.

In step S362, the decoder for left eye 541-2 performs subtitle object generating processing for the left eye, for generating subtitle objects for the left eye using the PES packets of subtitle data for the left eye from the PID filter 521.

In step S363, the control units 565-1 and 565-2 determine whether or not storage of one screen worth of subtitle objects for the right eye and subtitle objects for the left eye. Specifically, the control units 565-1 and 565-2 determine whether storage of one screen worth by the object buffers 563-1 and 563-2 has been completed and also completion of storage of the one screen worth has been notified from the control units 565-1 and 565-2.

In the event that determination is made in step S363 that storage of one screen worth of subtitle objects for the right eye and subtitle objects for the left eye has not been completed yet, standby is performed until storage is completed.

On the other hand, in the event that determination is made in step S363 that storage of one screen worth of subtitle objects for the right eye and subtitle objects for the left eye has been completed, in step S364 the control units 565-1 and 565-2 instruct the object buffers 563-1 and 563-2 to transfer. Accordingly, the one screen worth of subtitle objects for the right eye and the one screen worth of subtitle objects for the left eye that have been held in the object buffers 563-1 and 563-2 are each transferred to the graphics plane for right eye 542-1 and the graphics plane for left eye 542-2.

In step S365, the CLUTs 543-1 and 543-2 convert each of the subtitle object for the right eye from the graphics plane for right eye 542-1 and the subtitle object for the left eye from the graphics plane for left eye 542-2 into image data.

In step S366, the CLUT 543-1 outputs the subtitle data for the right eye obtained as a result of the conversion in step S365 to the 3D display data generating unit 36, and the CLUT 543-2 outputs the subtitle data for the left eye to the 3D display data generating unit 36. The flow then returns to step S341 in FIG. 59, and advances to step S342.

Note that the menu generating processing in step S342 of FIG. 59 is performed in the same way as the subtitle generating changing processing in FIG. 60, except for the object of processing being menu data instead of subtitle data, so description will be omitted.

Figure 61:
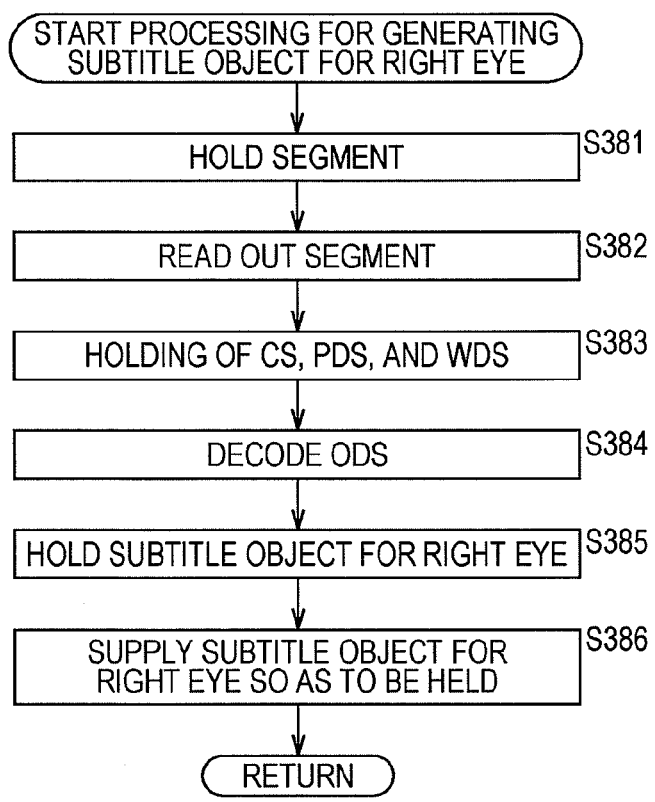
FIG. 61 is a flowchart describing details of processing for generating a subtitle object for the right eye in FIG. 60.

FIG. 61 is a flowchart for describing the details of the subtitle object generating processing for the right eye in step S361 in FIG. 60.

In step S381 in FIG. 61, the encoded data buffer 561-1 holds, of the PES packets for subtitle data for the right eye supplied from the PID filter 521, the segments. In step S382 the encoded data buffer 561-1 reads out the segments held therein, and supplies these to the stream graphics generating unit 562-1.

In step S383, the stream graphics generating unit 562-1 supplies the PCS, PDS, and WDS supplied from the encoded data buffer 561-1 to the composition buffer 564-1, so as to be held.

In step S384, the stream graphics generating unit 562-1 decodes the ODSs supplied from the encoded data buffer 561-1. The stream graphics generating unit 562-1 then supplies the subtitle data for the right eye in an uncompressed state made up of index color obtained as a result thereof, to the object buffer 563-1 as a subtitle object for the right eye. In step S385, the object buffer 563-1 holds the subtitle object for the right eye supplied from the stream graphics generating unit 562-1.

In step S386, the object buffer 563-1 reads out subtitle objects for the right eye held therein and supplies these to the graphics plane for right eye 542-1 under control of the control unit 565-1 so as to be held. The flow then returns to step S361 in FIG. 60, and advances to step S362.

Note that the subtitle object generating processing for the left eye in step S362 of FIG. 60 is performed in the same way as the subtitle object generating processing for the right eye in FIG. 61, except for the object of processing being subtitle data for the left eye instead of subtitle data for the right eye, so description will be omitted.

Also, with the present description, mention has been made that different PDSs may be had between a display set for the right eye and a display set for the left eye that are played simultaneously, but an arrangement may be made wherein the same PDS is had between a display set for the right eye and a display set for the left eye that are played simultaneously. In this case, only one CLUT is needed, so the load of implementation in the playing device can be alleviated.

Ninth Embodiment

Configuration Example of Display Set in Ninth Embodiment of Disc

Figure 62:
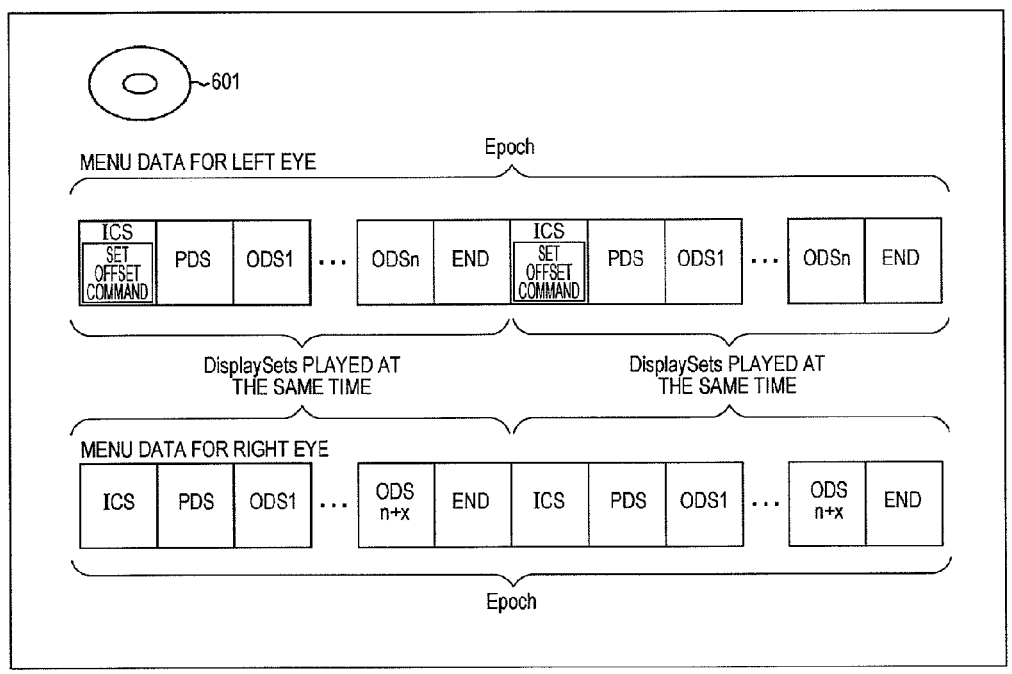
FIG. 62 is a diagram describing a configuration example of epochs of subtitle data according to a ninth embodiment of a disc to which the present invention has been applied.

FIG. 62 is a diagram illustrating a configuration example of epochs of menu data in a ninth embodiment of a disc to which the present invention has been applied.

With a disc 601 in FIG. 62, two AV streams of an AV stream for the left eye and an AV stream for the right eye are recorded, as with the disc 501 in FIG. 53. Also, as shown in FIG. 62, the structure of the epochs of the menu data for the left eye and the structure of the epochs of the menu data for the right eye, are the same, as with the disc 501 in FIG. 53.

Also, with the disc 601, the relation between a display set for the left eye and a display set for the right eye, which are played simultaneously is the same as that of the disc 501 excluding the point that the PDS is the same, and a set offset command is described in only the ICS for the left eye. Note that in the ninth embodiment and a later-described tenth embodiment, offset information following changing is used as the offset changing information.

As described above, with the disc 601, a set offset command is described in the ICS for the left eye, so a playing device 610 (to be described later) which plays the disc 601 can change the length in the depth direction of all subtitles and menu buttons within the screen corresponding to the ICS.

Note that the structure of epochs of subtitle data, and the relation between a display set for the left eye and a display set for the right eye, which are played simultaneously, are the same with the disc 501, excluding the point that the PDS is the same.

[Configuration Example of Playing Device]

Figure 63:
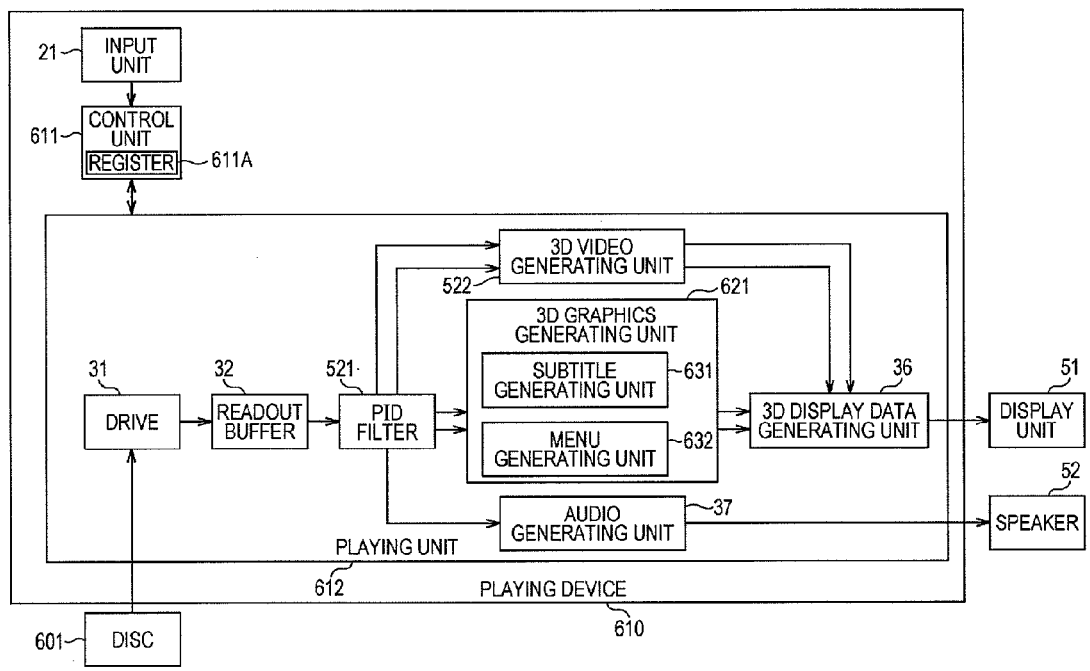
FIG. 63 is a block diagram illustrating a configuration example of a playing device.

FIG. 63 is a block diagram illustrating a configuration example of the playing device 610 for playing the above-described disc 601.

Of the configurations shown in FIG. 63, configurations the same as the configurations in FIG. 55 are denoted with the same reference numerals. Redundant description will be omitted as appropriate.

The configuration of the playing device 510 in FIG. 63 mainly differs from the configuration in FIG. 55 with regard to the point that a control unit 611 is provided instead of the control unit 511, and a playing unit 612 is provided instead of the playing unit 512. The configuration of the playing unit 612 differs from the configuration in FIG. 55 with regard to the point that a 3D graphics generating unit 621 is provided instead of the 3D graphics generating unit 523.

In the same way as with the control unit 511, the control unit 611 controls the playing unit 612 in accordance with instructions from the input unit 21. Also, in response to an instruction corresponding to operation of a menu button from the input unit 21, the control unit 611 requests the 3D graphics generating unit 621 for a command corresponding to that menu button. The control unit 611 then holds the offset changing information, in increments of screens, of the subtitles and menu buttons described in the set offset command transmitted thereto as a result thereof, in a built-in register 611A. The control unit 611 supplies the offset changing information in increments of screens of the subtitles and menu buttons held in the register 611A to the 3D graphics generating unit 621.

The register 611A is configured of a PSR in the same way as with the register 161A, and holds offset changing information in increments of screens of subtitles and menu buttons, and so forth.

The 3D graphics generating unit 621 is configured of a subtitle generating unit 631 and menu generating unit 632.

The subtitle generating unit 631 decodes the PES packets of subtitle data for the left eye and subtitle data for the right eye supplied from the PID filter 512, in the same way as with the subtitle generating unit 531 in FIG. 55. The subtitle generating unit 631 then supplies the subtitle data for the right eye and subtitle data for the left eye, obtained as a result of decoding, to the 3D display data generating unit 36 as 3D subtitle data, in the same way as with the subtitle generating unit 531.

Also, the subtitle generating unit 631 updates the subtitle data for the left eye, based on the offset changing information in increments of screens of subtitles transmitted from the control unit 611.

The menu generating unit 632 decodes the PES packets of menu data for the left eye and menu data for the right eye supplied from the PID filter 521, in the same way as with the menu generating unit 532 in FIG. 55. The menu generating unit 632 then supplies the menu data for the right eye and menu data for the left eye, obtained as a result of decoding, to the 3D display data generating unit 36 as 3D menu data, in the same way as with the menu generating unit 532.

Also, the menu generating unit 632 transmits the offset command included in the ICS to the control unit 611 in response to the command corresponding to the offset changing button 195 from the control unit 611. The menu generating unit 632 then updates the menu data for the left eye, based on the offset changing information in increments of screens for the menu button transmitted from the control unit 611 as a result thereof.

[Detailed Configuration Example of Subtitle Generating Unit]

Figure 64:
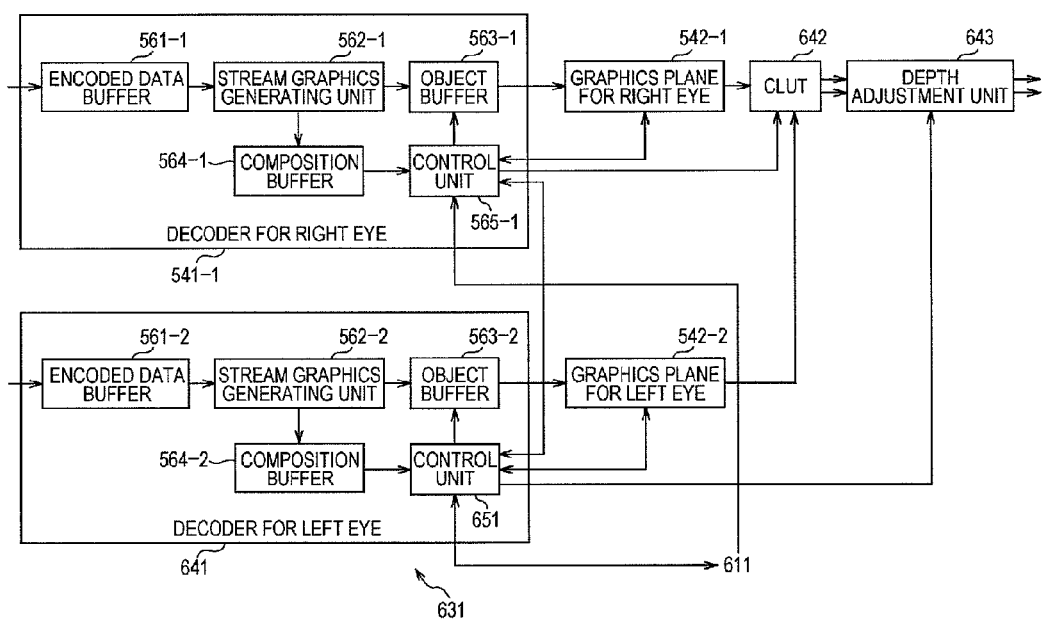
FIG. 64 is a block diagram illustrating a detailed configuration example of the subtitle generating unit in FIG. 63.

FIG. 64 is a block diagram illustrating a detailed configuration example of the subtitle generating unit 631 in FIG. 63.

Of the configurations shown in FIG. 64, configurations the same as the configurations in FIG. 56 are denoted with the same reference numerals. Redundant description will be omitted as appropriate.

In FIG. 64, the configuration of the subtitle generating unit 631 mainly differs from the configuration in FIG. 56 with regard to the point that a decoder for left eye 641 is provided instead of the decoder for left eye 541-1, the point that a CLUT 642 is provided instead of the CLUTs 543-1 and 543-2, and the point that a depth adjustment unit 643 is newly provided. The configuration of the decoder for left eye 641 differs from the configuration in FIG. 56 with regard to the point that a control unit 651 is provided instead of the control unit 565-2.

The control unit 651 of the decoder for left eye 641 monitors the state of storage of one screen worth of subtitle objects for the left eye by the graphics plane for left eye 542-2, and notifies completion of storage to the control unit 565-1, in the same way as with the control unit 565-2 in FIG. 56. The control unit 651 instructs transfer to the graphics plane for left eye 542-2, based on the PTS included in the PES packet header or notification from the control unit 565-1, in the same way as with the control unit 565-2.

Also, the control unit 651 controls each part following instructions from the control unit 611 (FIG. 63).

Further, the control unit 651 receives offset changing information in increments of screens of the subtitles stored in the register 611A, transmitted from the control unit 611, and supplies this to the depth adjustment unit 643.

The CLUT 642 stores a table correlating the index color with Y, Cr, Cb values, based on the PDS supplied from the control unit 565-1. Note that with the disc 601, the PDS is the same for the display set for the left eye and the display set for the right eye which are played simultaneously is the same, so this table corresponds to both subtitle objects for the left eye and subtitle objects for the right eye.

The CLUT 642 converts the index color of the subtitle objects for the right eye supplied from the graphics plane for right eye 542-1 into image data made up of Y, Cr, Cb values, based on the stored table. The CLUT 642 then supplies the image data to the depth adjustment unit 643 as subtitle data for the right eye.

Also, the CLUT 642 converts the index color of the subtitle objects for the left eye supplied from the graphics plane for left eye 542-2 into image data made up of Y, Cr, Cb values, based on the stored table. The CLUT 642 then supplies the image data to the depth adjustment unit 643 as subtitle data for the left eye.

The depth adjustment unit 643 generates subtitle data of subtitles obtained as the result of shifting subtitles in increments of screens corresponding to the subtitle data for the left eye from the CLUT 642, by the offset value in the offset direction indicated by the offset changing information from the control unit 651. The depth adjustment unit 643 then supplies this subtitle data to the 3D display data generating unit 36 as new subtitle data for the left eye. The depth adjustment unit 643 also generates subtitle data of subtitles obtained as the result of shifting subtitles in increments of screens corresponding to the subtitle data for the right eye from the CLUT 642, by the offset value in the offset direction indicated by the offset changing information from the control unit 651. The depth adjustment unit 643 then supplies this subtitle data to the 3D display data generating unit 36 as new subtitle data for the right eye.

Note that the depth adjustment unit 643 does not have to be provided downstream of the CLUT 642, and may be separated into functions for the right eye and functions for the left eye, with each being positioned between the object buffer 563-1 and graphics plane for right eye 542-1, and between the object buffer 563-2 and graphics plane for left eye 542-2, respectively.

[Detailed Configuration Example of Menu Generating Unit]

Though omitted from illustrating in the drawings, the menu generating unit 632 is configured in the same way as with the subtitle generating unit 631 in FIG. 64, except for the point that the object of processing is not subtitle data but rather menu data. Note however, that the control unit of the decoder for the left eye of the menu generating unit 632 reads out a set offset command included in the ICS from the composition buffer, in accordance with a request for a command corresponding to the offset changing button 195 from the control unit 611, and transmits this to the control unit 611.

[Processing of Playing Device]

Playing processing, 3D graphics generating processing, subtitle generating processing, and subtitle object generating processing for the right eye, by the playing device 610, are each the same as the playing processing in FIG. 58, the 3D graphics generating processing in FIG. 59, subtitle generating processing in FIG. 60, and subtitle object generating processing for the right eye in FIG. 61, so description will be omitted.

Figure 65:
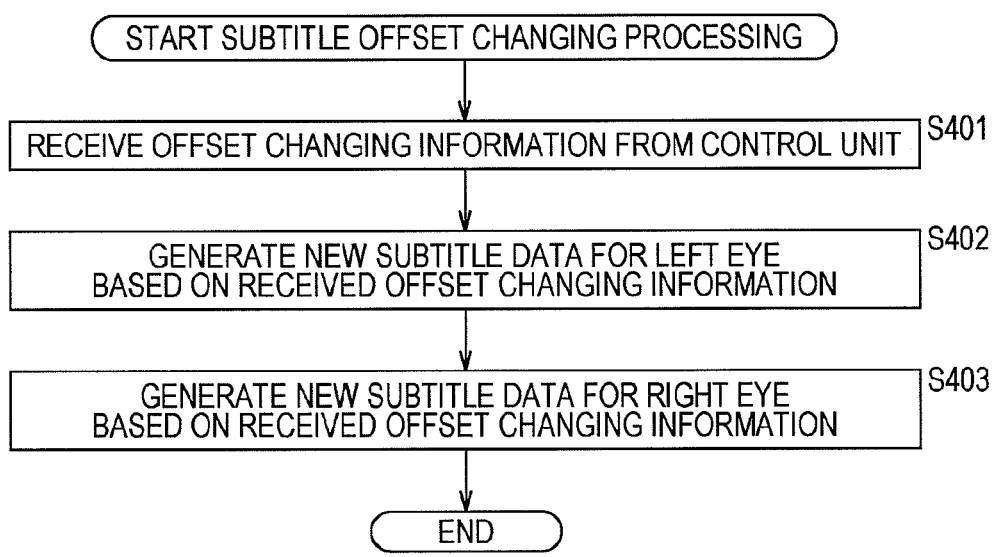
FIG. 65 is a flowchart describing subtitle offset changing processing with the subtitle generating unit in FIG. 64.

FIG. 65 is a flowchart for describing the details of subtitle offset changing processing by the subtitle generating unit 631 of the playing device 610. This subtitle offset changing processing is started when the control unit 611 transmits offset changing information in response to an instruction corresponding to an operation of the offset changing button 195 from the input unit 21.

In step S401 of FIG. 65, the control unit 651 receives offset changing information, in increments of screens, of subtitles held in the register 611A, from the control unit 611, which are then supplied to the depth adjustment unit 643.

In step S402, the depth adjustment unit 643 generates new subtitle data for the left eye, based on the offset changing information in increments of screens of subtitles received from the control unit 611. In step S403, the depth adjustment unit 643 generates new subtitle data for the right eye, based on the offset changing information in increments of screens of subtitles received from the control unit 611. The new subtitle data for the right eye and subtitle data for the left eye are output to the 3D display data generating unit 36 as 3D subtitle data, and the flow ends.

Note that the menu offset changing processing by the menu generating unit 632 is performed in the same way as the subtitle offset changing processing in FIG. 65, except for the object of processing being menu data instead of subtitle data, so description will be omitted.

Also, the offset control processing by the control unit 611 is the same as the offset control processing in FIG. 30, so description will be omitted.

[Example of 3D Display of Subtitles]

Figure 66:
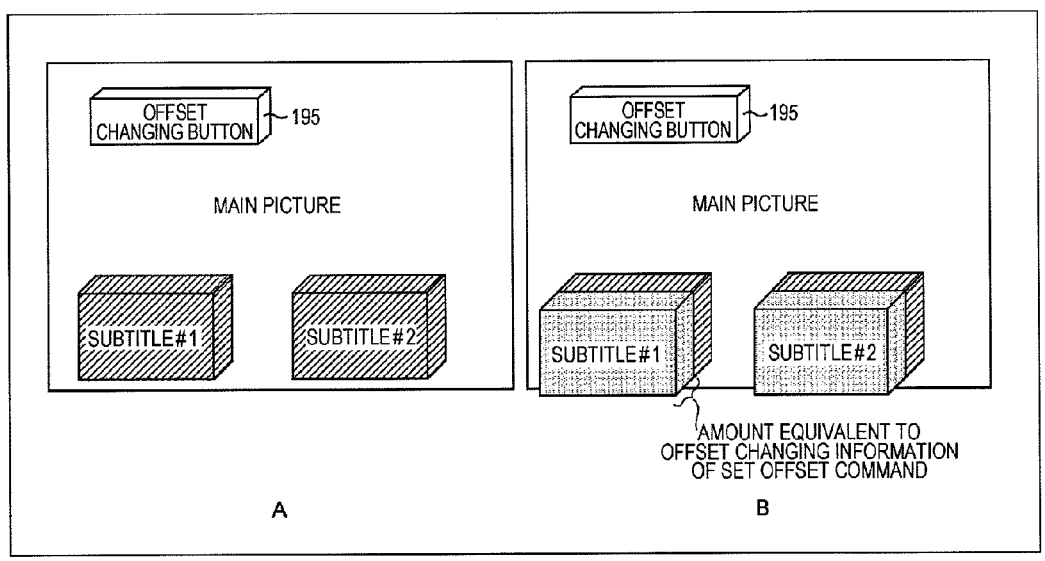
FIG. 66 is a diagram illustrating an example of a subtitle displayed in 3D at the display unit in FIG. 63.

FIG. 66 is a diagram illustrating an example of subtitles displayed in 3D on the display unit 51 of the playing device 610.

As shown in A in FIG. 66, with the playing device 610, an offset changing button 195 which is a 3D image having a predetermined length in a predetermined depth direction is displayed on the screen of the display unit 51, based on the offset information in increments of screens included in the ICS. In the example in A in FIG. 66, a subtitle #1 and subtitle #2 which are 3D images having the same length in the same depth direction are displayed on this screen, based on the display set for the left eye and the display set for the right eye.

With the screen in A in FIG. 66, upon the user operating the offset changing button 195 using the input unit 21, to instruct changing of offset, the screen of the display unit 51 is changed to the screen shown in B in FIG. 66.

Specifically, upon the offset changing button 195 being operated, at the playing device 610 offset changing information in increments of screens of subtitles described in the set offset command included in the ICS corresponding to this offset changing button 195 is held in the register 611A. Subtitle data of subtitles obtained as the result of subtitles in increments of screens corresponding to the subtitle data for the left eye being shifted by the offset value in the offset direction indicated by the offset changing information is generated as new subtitle data for the left eye. As a result, the length of the subtitle #1 and subtitle #2 in the depth direction increases in the depth direction by a length corresponding to the offset changing information in increments of screens held in the register 611A.

Tenth Embodiment

Configuration Example of Display Set in Tenth Embodiment of Disc

Figure 67:
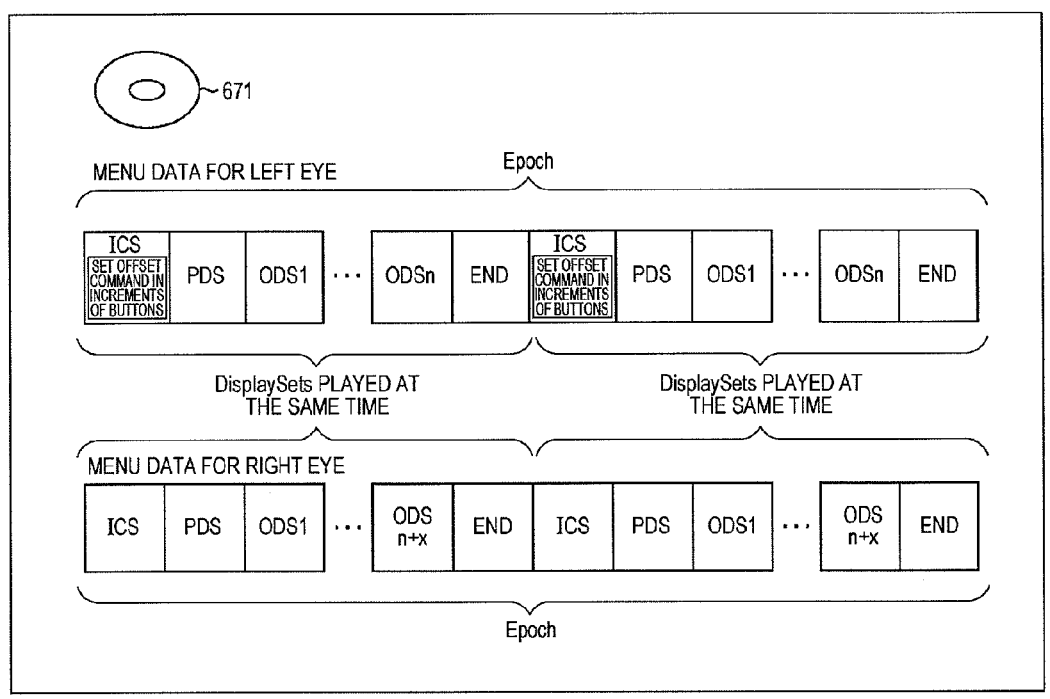
FIG. 67 is a diagram describing a configuration example of epochs of menu data according to a tenth embodiment of a disc to which the present invention has been applied.

FIG. 67 is a diagram illustrating a configuration example of epochs of menu data in a tenth embodiment of a disc to which the present invention has been applied.

With a disc 671 in FIG. 67, two AV streams of an AV stream for the left eye and an AV stream for the right eye are recorded, as with the disc 501 in FIG. 53. Also, as shown in FIG. 67, with the disc 671, the structure of the epochs of the menu data for the left eye and the structure of the epochs of the menu data for the right eye, are the same, as with the disc 501.

Also, with the disc 671, the relation between a display set for the left eye and a display set for the right eye, which are played simultaneously is the same as that of the disc 501 excluding the following two points. The two differing points is a point that the PDS is the same, and a point that a set offset command in increments of buttons is described in only the ICS for the left eye.

As described above, with the disc 671, set offset command in increments of buttons is described in the ICS for the left eye. Accordingly, a playing device 680 (to be described later) which plays the disc 671 can change the length in the depth direction of menu buttons within the screen corresponding to the ICS, in increments of menu buttons.

Note that the structure of epochs of subtitle data recorded in the disc 671, and the relation between a display set for the left eye and a display set for the right eye, which are played simultaneously, are the same with the disc 501, and accordingly description will be omitted.

[Configuration Example of Playing Device]

Figure 68:
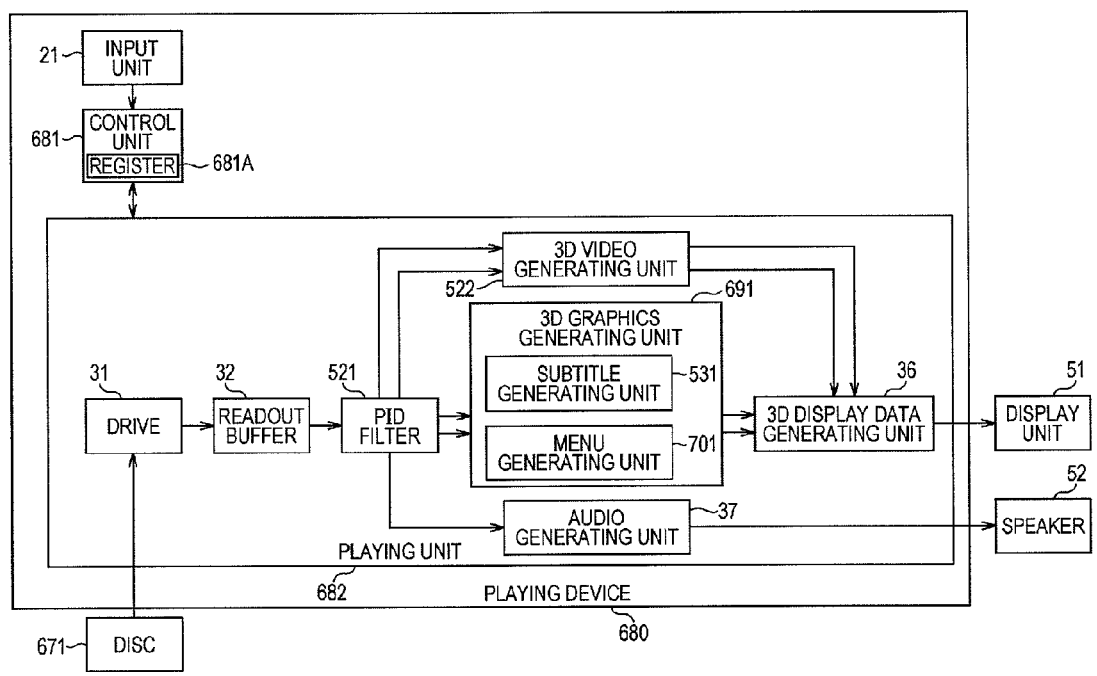
FIG. 68 is a block diagram illustrating a configuration example of a playing device.

FIG. 68 is a block diagram illustrating a configuration example of the playing device 680 for playing the above-described disc 671.

Of the configurations shown in FIG. 68, configurations the same as the configurations in FIG. 63 are denoted with the same reference numerals. Redundant description will be omitted as appropriate.

The configuration of the playing device 680 in FIG. 68 mainly differs from the configuration in FIG. 63 with regard to the point that a control unit 681 is provided instead of the control unit 611, and a playing unit 682 is provided instead of the playing unit 612. The configuration of the playing unit 682 differs from the configuration in FIG. 63 with regard to the point that a 3D graphics generating unit 691 is provided instead of the 3D graphics generating unit 621.

In the same way as with the control unit 611, the control unit 681 controls the playing unit 682 in accordance with instructions from the input unit 21. Also, in response to an instruction corresponding to operation of a menu button from the input unit 21, the control unit 681 requests the 3D graphics generating unit 691 for a set offset command corresponding to that menu button. The control unit 681 then supplies the offset changing information in increments of buttons described in the set offset command in increments of buttons transmitted from the menu generating unit 701 as a result, and the button ID, to a menu generating unit 701.

The 3D graphics generating unit 691 is configured of the subtitle generating unit 531 shown in FIG. 55 and the menu generating unit 701. The menu generating unit 701 decodes the PES packets of menu data for the left eye and menu data for the right eye supplied from the PID filter 521, in the same way as with the menu generating unit 632 in FIG. 63. The menu generating unit 701 then supplies the menu data for the right eye and menu data for the left eye, obtained as a result of decoding, to the 3D display data generating unit 36 as 3D menu data, in the same way as with the menu generating unit 632.

Also, the menu generating unit 701 transmits the set offset command in increments of buttons included in the ICS to the control unit 681 in response to the command corresponding to the offset changing button 195 from the control unit 681. The menu generating unit 701 then updates the menu data for the left eye, based on the offset changing information in increments of menu buttons transmitted from the control unit 681 as a result thereof, and the button ID.

[Detailed Configuration Example of Menu Generating Unit]

Figure 69:
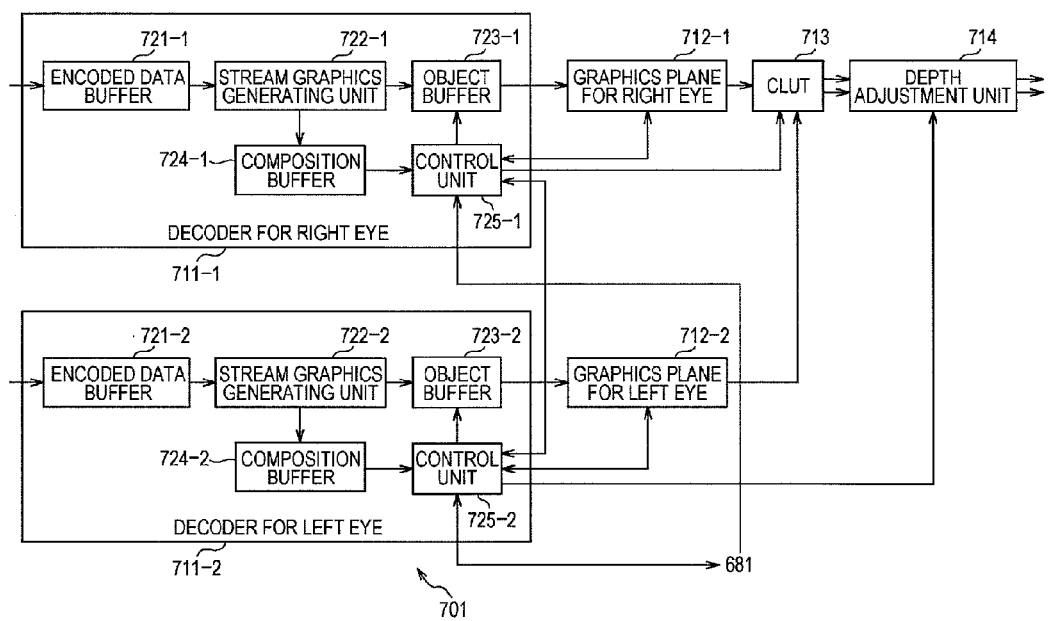
FIG. 69 is a block diagram illustrating a detailed configuration example of the menu generating unit in FIG. 68.

FIG. 69 is a block diagram illustrating a detailed configuration example of the menu generating unit 701 in FIG. 68.

In FIG. 69, the menu generating unit 701 is configured of a decoder for right eye 711-1, a decoder for left eye 711-2, a graphics plane for right eye 712-1, a graphics plane for left eye 712-2, a CLUT 713, and depth adjustment unit 714.

The decoder for right eye 711-1 is configured of an encoded data buffer 721-1, a stream graphics generating unit 722-1, an object buffer 723-1, a composition buffer 724-1, and a control unit 725-1. The decoder for left eye 711-2 is configured of an encoded data buffer 721-2, a stream graphics generating unit 722-2, an object buffer 723-2, a composition buffer 724-2, and a control unit 725-2.

Of the configurations shown in FIG. 69, configurations other than the control unit 725-2 and depth adjustment unit 714 are the same as the configurations of the menu generating unit 632 in FIG. 63, so description will be omitted.

The control unit 725-2 monitors the state of storage of one screen worth of subtitle objects for the left eye by the graphics plane for left eye 712-2, and notifies completion of storage to the control unit 725-1. The control unit 725-2 instructs transfer to the graphics plane for left eye 712-2, based on the ICS from the composition buffer 724-2 or notification from the control unit 725-1.

Also, the control unit 725-2 controls each part following instructions from the control unit 681 (FIG. 68).

Further, the control unit 725-2 reads out the set offset command in increments of buttons included in the ICS from the composition buffer 724-2 in response to a request for a command corresponding to the offset changing button 195 from the control unit 681, and transmits this to the control unit 681. Also, the control unit 725-2 receives the offset changing information in increments of menu buttons and button ID transmitted from the control unit 681 as the result thereof. The control unit 725-2 supplies the received offset changing information in increments of menu buttons to the depth adjustment unit 714 as offset changing information in increments of ODSs, of the ODS corresponding to the button ID transmitted along therewith.

The depth adjustment unit 714 generates menu data of menu buttons obtained as the result of shifting each of the menu buttons in the screen corresponding to the menu data for the left eye from the CLUT 713, based on the offset changing information in increments of ODSs corresponding to the menu buttons. The depth adjustment unit 714 then supplies this menu data to the 3D display data generating unit 36 as new menu data for the left eye. The depth adjustment unit 714 also generates menu data of menu buttons obtained as the result of shifting each of the menu buttons in the screen corresponding to the menu data for the right eye from the CLUT 713, based on the offset changing information in increments of ODSs corresponding to the menu buttons. The depth adjustment unit 714 then supplies this menu data to the 3D display data generating unit 36 as new menu data for the right eye.

[Processing of Playing Device]

Playing processing, 3D graphics generating processing, subtitle generating processing, and subtitle object generating processing for the right eye, by the playing device 680, are each the same as the playing processing in FIG. 58, the 3D graphics generating processing in FIG. 59, subtitle generating processing in FIG. 60, and subtitle object generating processing for the right eye in FIG. 61, so description will be omitted.

Figure 70:
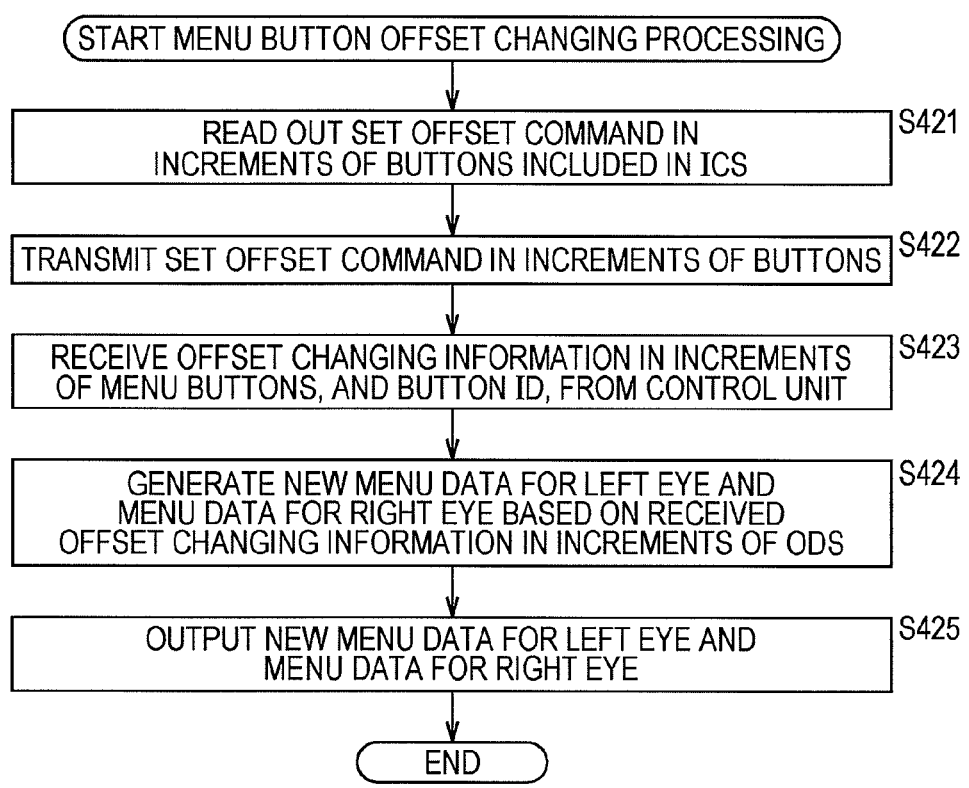
FIG. 70 is a flowchart describing menu button offset changing processing with the menu generating unit in FIG. 69.

FIG. 70 is a flowchart for describing the details of menu button offset changing processing by the menu generating unit 701 of the playing device 680. This menu button offset changing processing is started when the control unit 681 requests the menu generating unit 701 for a command corresponding to the offset changing button 195, in response to an instruction corresponding to operation of the offset changing button 195 from the input unit 21.

In step S421 in FIG. 70, the control unit 725-2 reads out the set offset command in increments of buttons included in the ICS from the composition buffer 724-2, in response to the request from the control unit 681 for the command corresponding to the offset changing button 195.

In step S422, the control unit 725-2 transmits the set offset command in increments of buttons read out in step S421 to the control unit 681. The control unit 681 transmits the offset changing information in increments of menu buttons described in the set offset command in increments of buttons transmitted from the control unit 725-2, and the button ID, to the control unit 725-2.

In step S423, the control unit 725-2 receives the offset changing information in increments of menu buttons and button ID from the control unit 681. Also, the control unit 725-2 recognizes the ODS corresponding to the button ID received from the control unit 681, based on the button ID included in the ICS hold in the composition buffer 724-2. The control unit 725-2 supplies the offset changing information in increments of menu buttons received from the control unit 681 to the depth adjustment unit 714, as offset changing information in increments of ODSs, for the recognized ODS.

In step S424, the depth adjustment unit 714 generates new menu data for the left eye and menu data for the right eye, based on the offset changing information in increments of ODSs, supplied from the control unit 725-2. In step S425, the depth adjustment unit 714 outputs the new menu data for the left eye and menu data for the right eye generated in step S424 to the 3D display data generating unit 36, and the flow ends.

Note that the offset control processing by the control unit 681 is the same as the offset control processing in FIG. 42, so description will be omitted.

[Example of 3D Display of Subtitles]

Figure 71:
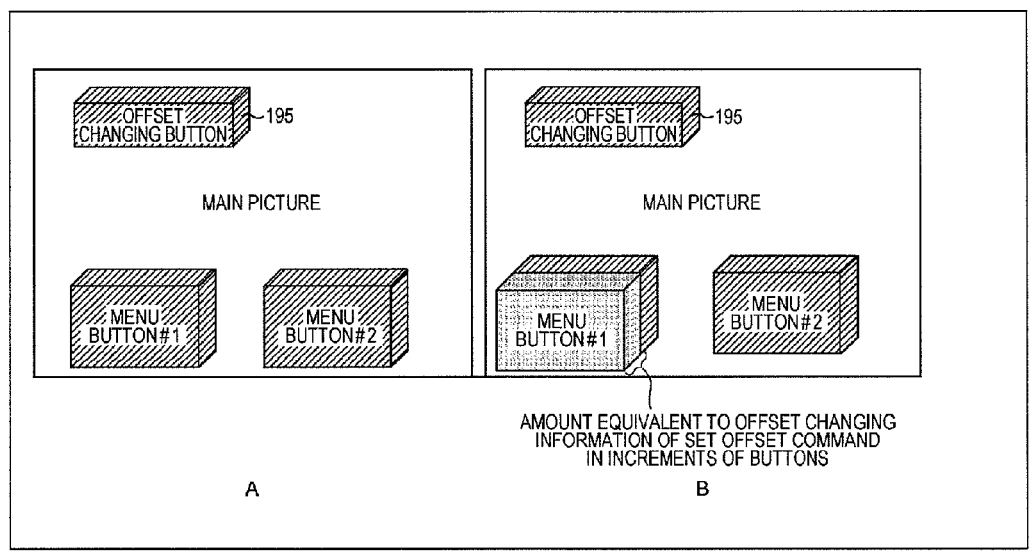
FIG. 71 is a diagram illustrating an example of a menu button displayed in 3D at the display unit in FIG. 68.

FIG. 71 is a diagram illustrating an example of menu buttons displayed in 3D on the display unit 51 of the playing device 680.

In the example in A in FIG. 71, a menu button #1, a menu button #2, and the offset changing button 195, which are 3D images having the same length in the same depth direction are displayed on this screen based on the display set for the left eye and the display set for the right eye.

With the screen in A in FIG. 71, upon the user operating the offset changing button 195 using the input unit 21, to instruct changing of offset, the screen of the display unit 51 is changed to the screen shown in B in FIG. 71.

Specifically, upon the offset changing button 195 being operated, the playing device 680 generates menu data obtained as a result of shifting the position of each of the menu buttons for the left eye that are currently being displayed, based on the offset changing information in increments of menu buttons. The playing device 610 takes this menu data as new menu data for the left eye. Also, the playing device 680 generates menu data obtained as a result of shifting the position of each of the menu buttons for the right eye that are currently being displayed, based on the offset changing information in increments of menu buttons. The playing device 610 takes this menu data as new menu data for the right eye.

As a result, the length in the depth direction for the menu button #1, menu button #2, and offset changing button 195, is increased in the depth direction by a length corresponding to the offset changing information in increments of menu buttons within the set offset command in increments of buttons.

Note that in the example in FIG. 71, the set offset command in increments of buttons does not include offset changing information for the menu button #2 and the offset changing button 195, so the distance in the depth direction of the menu button #2 and the offset changing button 195 is unchanged before and after operation of the offset changing button 195.

Further, as an additional condition, in the event of setting offsets for each menu button, if there are multiple menu buttons within one screen, a menu button image for the right eye and a menu button image for the left eye each must not overlap with a menu button image for the right eye or a menu button image for the left eye for another menu button.

Eleventh Embodiment

Configuration Example of Display Set in Eleventh Embodiment of Disc

Figure 72:
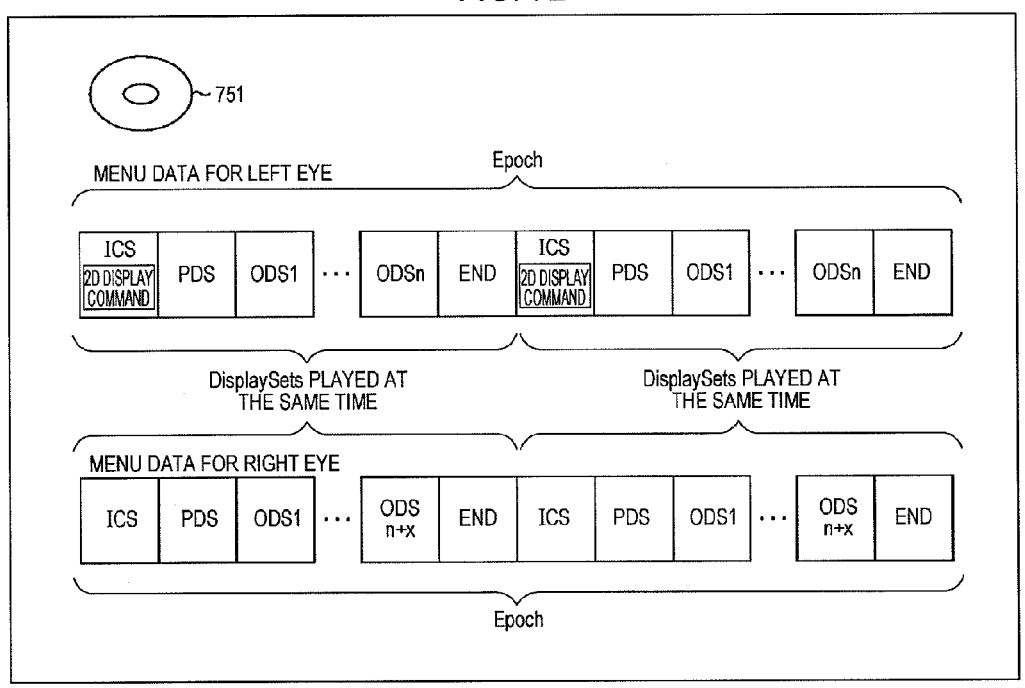
FIG. 72 is a diagram describing a configuration example of epochs of subtitle data according to an eleventh embodiment of a disc to which the present invention has been applied.

FIG. 72 is a diagram illustrating a configuration example of epochs of menu data in an eleventh embodiment of a disc to which the present invention has been applied.

With a disc 751 in FIG. 72, two AV streams of an AV stream for the left eye and an AV stream for the right eye are recorded, as with the disc 501 in FIG. 53. Also, as shown in FIG. 72, the structure of the epochs of the menu data for the left eye and the structure of the epochs of the menu data for the right eye, are the same, as with the disc 501.

Also, with the disc 751, the relation between a display set for the left eye and a display set for the right eye, which are played simultaneously, is the same as that of the disc 501 excluding the following two points. The two differing points is a point that the PDS is the same, and a point that a 2D display command is described in only the ICS for the left eye. With the eleventh embodiment, information instructing menu data for the left eye to be taken as menu data for both eyes is described in a 2D display command.

Thus, with the disc 751, a 2D display command is described in the ICS for the left eye, so a playing device 760 (to be described later) which plays the disc 751 can perform 2D display of menu buttons.

Note that the structure of epochs of subtitle data, and the relation between a display set for the left eye and a display set for the right eye, which are played simultaneously, are the same with the disc 501, excluding the point that the PCS is the same, so description will be omitted.

[Configuration Example of Playing Device]

Figure 73:
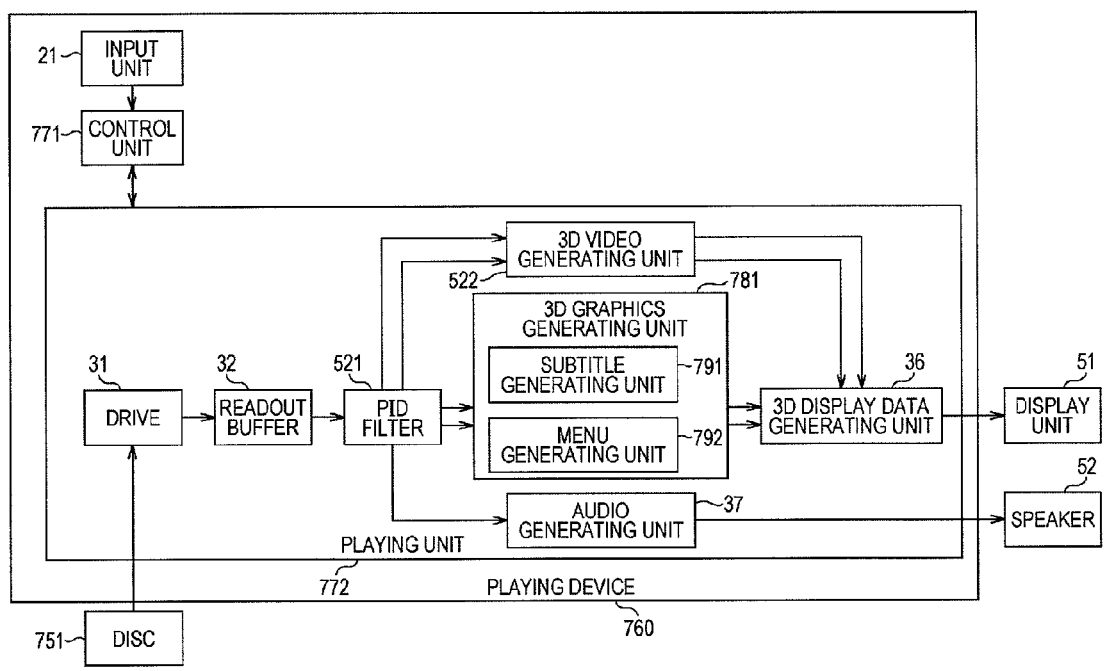
FIG. 73 is a block diagram illustrating a configuration example of a playing device.

FIG. 73 is a block diagram illustrating a configuration example of the playing device 760 for playing the above-described disc 751.

Of the configurations shown in FIG. 73, configurations the same as the configurations in FIG. 55 are denoted with the same reference numerals. Redundant description will be omitted as appropriate.

The configuration of the playing device 760 in FIG. 73 mainly differs from the configuration in FIG. 55 with regard to the point that a control unit 771 is provided instead of the control unit 511, and a playing unit 772 is provided instead of the playing unit 512. The configuration of the playing unit 772 differs from the configuration in FIG. 55 with regard to the point that a 3D graphics generating unit 781 is provided instead of the 3D graphics generating unit 523.

In the same way as with the control unit 511, the control unit 771 controls the playing unit 772 in accordance with instructions from the input unit 21. Also, in response to an instruction corresponding to operation of a menu button from the input unit 21, the control unit 771 requests the 3D graphics generating unit 781 for a command corresponding to that menu button. The control unit 771 then supplies the instruction corresponding to the 2D display command transmitted as a result thereof, to the 3D graphics generating unit 781.

The 3D graphics generating unit 781 is configured of a subtitle generating unit 791 and menu generating unit 792.

The subtitle generating unit 791 decodes the PES packets of subtitle data for the left eye and subtitle data for the right eye supplied from the PID filter 521, in the same way as with the subtitle generating unit 531 in FIG. 55. The subtitle generating unit 791 then supplies the subtitle data for the right eye and subtitle data for the left eye, obtained as a result of the decoding, to the 3D display data generating unit 36 as 3D subtitle data, in the same way as with the subtitle generating unit 531. Also, the subtitle generating unit 791 updates the 3D subtitle data based on instructions transmitted from the control unit 771.

The menu generating unit 792 decodes the PES packets of menu data for the left eye and menu data for the right eye supplied from the PID filter 521, in the same way as with the menu generating unit 532 in FIG. 55. The menu generating unit 792 then supplies the menu data for the right eye and menu data for the left eye, obtained as a result of decoding, to the 3D display data generating unit 36 as 3D menu data, in the same way as with the menu generating unit 532. Also, the menu generating unit 792 transmits the 2D display command included in the ICS of the menu data for the left eye to the control unit 771 in response to the command corresponding to the 2D display button from the control unit 771. The menu generating unit 792 then updates the 3D menu data, based on the instruction transmitted from the control unit 771 as a result thereof.

[Detailed Configuration Example of Subtitle Generating Unit]

Figure 74:
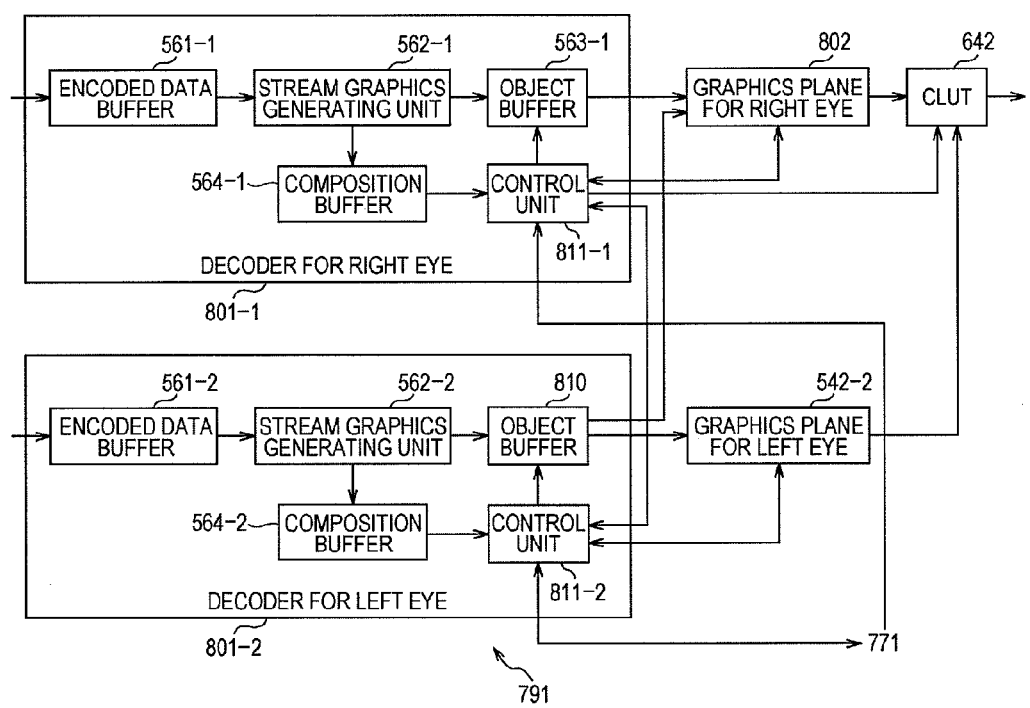
FIG. 74 is a block diagram illustrating a detailed configuration example of the subtitle generating unit in FIG. 73.

FIG. 74 is a block diagram illustrating a detailed configuration example of the subtitle generating unit 791 in FIG. 73.

Of the configurations shown in FIG. 74, configurations the same as the configurations in FIG. 56 or FIG. 64 are denoted with the same reference numerals. Redundant description will be omitted as appropriate.

In FIG. 74, the configuration of the subtitle generating unit 791 mainly differs from the configuration in FIG. 56 with regard to the point that a decoder for right eye 801-1 and a decoder for left eye 801-2 are provided instead of the decoder for right eye 541-1 and decoder for left eye 541-2. Also differing are the point that a graphics plane for right eye 802 is provided instead of the graphics plane for right eye 542-1, and the point that a CLUT 642 is provided instead of the CLUTs 543-1 and 543-2.

The configuration of the decoder for right eye 801-1 differs from the configuration in FIG. 56 with regard to the point that a control unit 811-1 is provided instead of the control unit 565-1. Also, the configuration of the decoder for left eye 801-2 differs from the configuration in FIG. 56 with regard to the point that an object buffer 810 is provided instead of the object buffer 563-2, and that a control unit 811-2 is provided instead of the control unit 565-2.

The control unit 811-1 of the decoder for right eye 801-1 monitors the state of storage of one screen worth of subtitle objects for the right eye by the graphics plane for right eye 802-1, and notifies completion of storage to the control unit 811-2, in the same way as with the control unit 565-1 in FIG. 56. The control unit 811-1 instructs transfer to the graphics plane for right eye 802, based on the PTS included in the PES packet header or notification from the control unit 811-2, in the same way as with the control unit 565-2.

Also, the control unit 811-1 controls each part following instructions from the control unit 771 (FIG. 73).

The object buffer 810 of the decoder for left eye 801-2 holds the subtitle object for the left eye supplied from the stream graphics generating unit 562-2. The object buffer 810 deletes subtitle objects for the left eye held therein, in increments of epochs. Also, the object buffer 810 reads out subtitle objects for the left eye held therein and supplies these to the graphics plane for left eye 542-2 under control of the control unit 811-2.

Further, the object buffer 810 supplies subtitle objects for the left eye held therein to the graphics plane for right eye 802 and the graphics plane for left eye 542-2 under control of the control unit 811-2.

The control unit 811-2 monitors the state of storage of one screen worth of subtitle objects for the left eye by the graphics plane for left eye 542-2, and notifies completion of storage to the control unit 811-1, in the same way as with the control unit 565-2 in FIG. 56. The control unit 811-2 instructs transfer to the graphics plane for left eye 542-2, based on the PTS included in the PES packet header or notification from the control unit 565-1, in the same way as with the control unit 565-2.

Also, the control unit 811-2 controls each part following instructions from the control unit 771 (FIG. 73).

Further, the control unit 811-2 instructs the object buffer 810 to transfer to the graphics plane for right eye 802 and the graphics plane for left eye 542-2, in accordance with instruction transmitted from the control unit 771.

In the same way as with the graphics plane for right eye 542-1, the graphics plane for right eye 802 holds one screen worth of subtitle objects for the right eye, supplied from the object buffer 563-1. Also, the graphics plane for right eye 802 holds one screen worth of subtitle objects for the left eye, supplied from the object buffer 810, as one screen worth of subtitle objects for the right eye.

Further, the graphics plane for right eye 802 deletes subtitle objects for the right eye held therein, in increments of epochs, in the same way as with the graphics plane for right eye 542-1. Also, the graphics plane for right eye 802 reads out the subtitle objects for the right eye held therein in response to a transfer instruction from the control unit 811-1, and supplies this to the CLUT 642, in the same way as with the graphics plane for right eye 542-1.

[Detailed Configuration Example of Menu Generating Unit]

Though omitted from illustrating in the drawings, the menu generating unit 792 is configured in the same way as with the subtitle generating unit 791 in FIG. 74, except for the point that the object of processing is not subtitle data but rather menu data. Note however, that the control unit of the decoder for the left eye of the menu generating unit 792 reads out a 2D display command included in the ICS from the composition buffer, in accordance with a request for a command corresponding to the 2D display button from the control unit 771, and transmits this to the control unit 771.

[Processing of Playing Device]

Playing processing, 3D graphics generating processing, subtitle generating processing, and subtitle object generating processing for the right eye, by the playing device 760, are each the same as the playing processing in FIG. 58, the 3D graphics generating processing in FIG. 59, subtitle generating processing in FIG. 60, and subtitle object generating processing for the right eye in FIG. 61, so description will be omitted.

Figure 75:
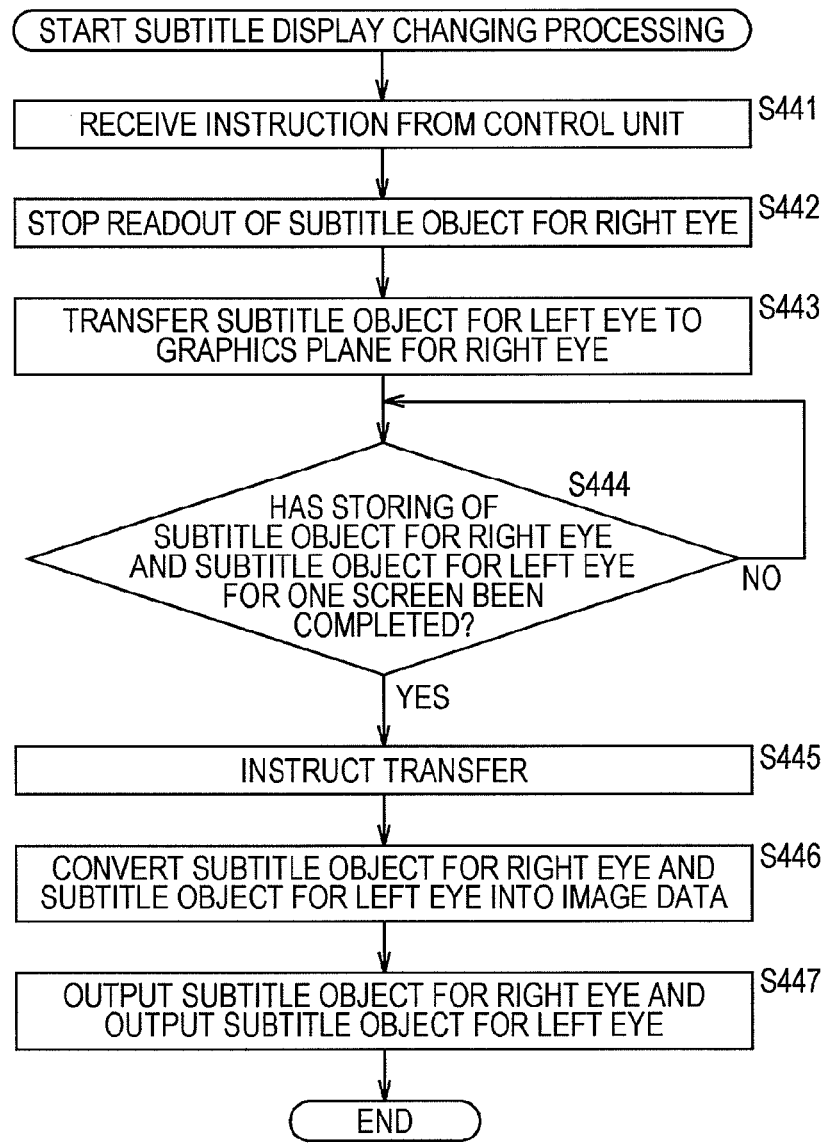
FIG. 75 is a flowchart describing subtitle display changing processing with the subtitle generating unit in FIG. 74.

FIG. 75 is a flowchart for describing the details of subtitle display changing processing by the subtitle generating unit 791 of the playing device 760. This subtitle offset changing processing is started when the control unit 771 requests the 3D graphics generating unit 781 for a 2D display command in response to an instruction to change the offset from the input unit 21.

In step S441 of FIG. 75, the control units 811-1 and 811-2 receive instruction from the control unit 771.

In step S442, the control unit 811-1 controls the object buffer 563-1 in accordance with the instruction received in step S441, to stop readout of the subtitle object for the right eye from the object buffer 563-1.

In step S443, the control unit 811-2 controls the object buffer 810 in accordance with the instruction received in step S441, to transfer the subtitle objects for the left eye in the object buffer 810 to the graphics plane for right eye 802. The graphics plane for right eye 802 holds the subtitle objects for the left eye as subtitle objects for the right eye. The flow then advances to step S444.

Steps S444 through S447 are the same as the processing in steps S363 through S366 in FIG. 60, so description will be omitted.

Due to the subtitle offset changing processing being performed as described above, the subtitle data for the right eye and the subtitle data for the left eye become the same subtitle data corresponding to the AV stream for the left eye. Accordingly, when the eyes are tired, or the like, the user can view the subtitles displayed in 2D. Accordingly, the user can instruct 2D display using the input unit 21 to change the 3D display of subtitles to 2D display.

Note that the menu display changing processing by the menu generating unit 792 is performed in the same way as the subtitle display changing processing in FIG. 75, except for the object of processing being menu data instead of subtitle data, so description will be omitted.

Also, while description has been made with the eleventh embodiment that information indicating an instruction to take subtitle data for the left eye as subtitle data for both eyes is described in the 2D display command, an arrangement may be made wherein information indicating an instruction to generate subtitle data for both eyes from subtitle data for the left eye and the right eye is described.

[Example of Other Detailed Configuration of Subtitle generating Unit]

Figure 76:
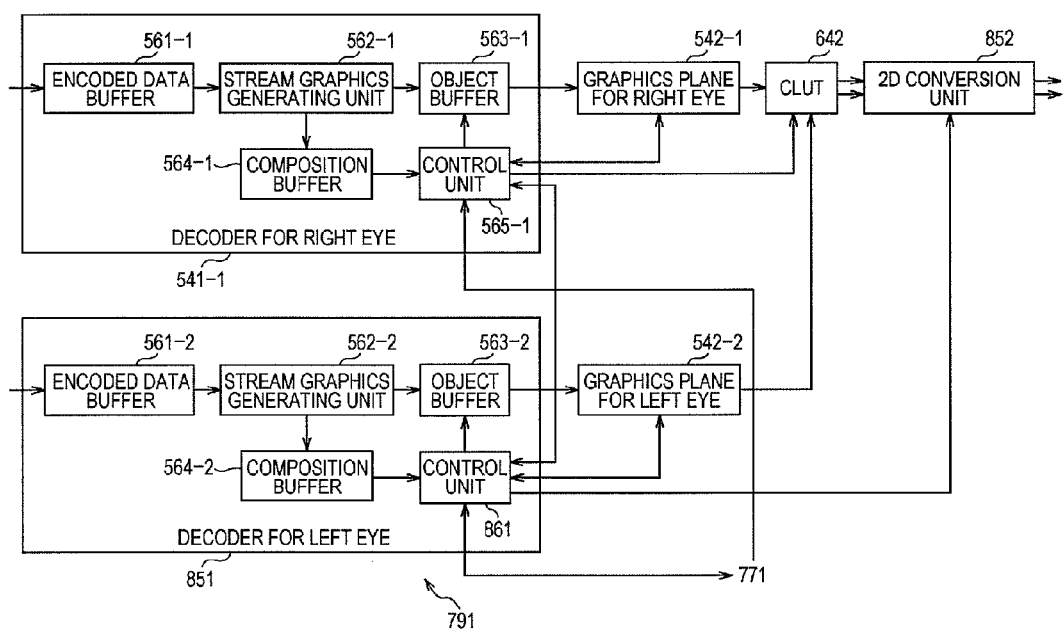
FIG. 76 is a block diagram illustrating another detailed configuration example of the subtitle generating unit in FIG. 73.

FIG. 76 is a diagram illustrating a detailed configuration example of the subtitle generating unit 791 in such a case.

Of the configurations shown in FIG. 76, configurations the same as the configurations in FIG. 56 or FIG. 74 are denoted with the same reference numerals. Redundant description will be omitted as appropriate.

In FIG. 76, the configuration of the subtitle generating unit 791 mainly differs from the configuration in FIG. 74 with regard to the point that a decoder for right eye 541-1 and a decoder for left eye 851 are provided instead of the decoder for right eye 801-1 and decoder for left eye 801-2. Also differing with the configuration in FIG. 76 is the point that a graphics plane for right eye 542-1 is provided instead of the graphics plane for right eye 802, and the point that a 2D conversion unit 852 is newly provided.

The configuration of the decoder for left eye 851 differs from the configuration in FIG. 74 with regard to the point that an object buffer 563-1 is provided instead of the object buffer 810, and that a control unit 861 is provided instead of the control unit 811-2.

The control unit 861 of the decoder for left eye 851 monitors the state of storage of one screen worth of subtitle objects for the left eye by the graphics plane for left eye 542-2, and notifies completion of storage to the control unit 565-1, in the same way as with the control unit 811-2 in FIG. 74. The control unit 861 instructs transfer to the graphics plane for left eye 542-2, based on the PTS included in the PES packet header or notification from the control unit 565-1, in the same way as with the control unit 811-2.

Also, the control unit 861 controls each part following instructions from the control unit 771 (FIG. 73).

Further, the control unit 861 receives instructions transmitted from the control unit 771, and supplies these to the 2D conversion unit 852.

The 2D conversion unit 852 generates subtitle data common to both eyes, from the subtitle data for the left eye and the subtitle data for the right eye output from the CLUT 642, in response from instruction supplied from the control unit 861. The 2D conversion unit 852 supplies the generated subtitle data common to both eyes to the 3D display data generating unit 36, as subtitle data for the left eye and subtitle data for the right eye.

[Processing for 2D Conversion]

Figure 77:
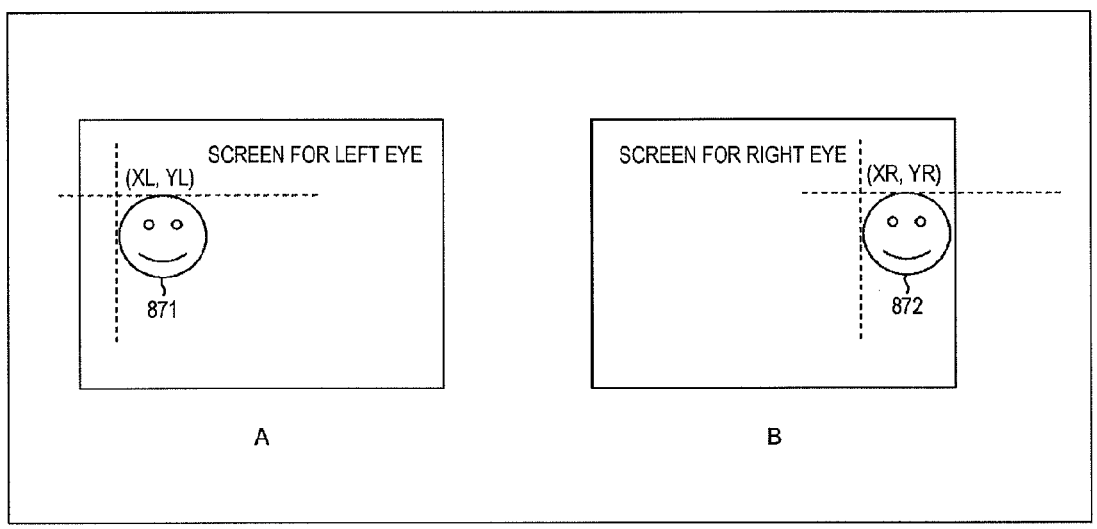
FIG. 77 is a diagram describing about a method for generating subtitle data for both eyes with the 2D conversion unit in FIG. 76.

FIG. 77 is a diagram for describing an example of a method for generating subtitle data common to both eyes with the 2D conversion unit 852 in FIG. 76. Transferring one of the subtitle data for the left or for the right eye as subtitle data following synthesizing is the easiest way to perform 2D conversion.

First, as shown in A in FIG. 77, we will say that the position on the screen of a subtitle 871 for the left eye is (XL, YL), and that the position on the screen of a subtitle 872 for the right eye is (XR, YR). Note that YL and YR are the same.

In this case, with the position on the screen for the subtitle common to both eyes as (X, Y), X is represented by expressions $X=XR-\alpha$, $X=XR-\beta$, using constants $\alpha$ and $\beta$ preset at the 2D conversion unit 852. Accordingly, the 2D conversion unit 852 computes the expression $X-\{(XR+XL)-\alpha-\beta\}/2$, to obtain X, and uses the expression $Y=YL=YR$ to obtain Y.

The 2D conversion unit 852 then generates subtitle data obtained as the result of converting the positions of the subtitles corresponding to the subtitle data for the right eye to (X, Y), as subtitle data for the right eye. The 2D conversion unit 852 also generates subtitle data obtained as the result of converting the positions of the subtitles corresponding to the subtitle data for the left eye to (X, Y), as subtitle data for the left eye.

As described above, subtitle data for the right eye and subtitle data for the left eye which is the same is generated, so the user can view 2D display of subtitles.

Note that in the description above, set offset commands and 2D display commands are described in the menu data for the left eye, but set offset commands and 2D display commands may be described in the menu data for the right eye. Also, set offset commands and 2D display commands are described in the menu data for both the left eye and the right eye.

Also, a 3D display command for switching from 2D display to 3D display may be provided to the ICS. In this case, the processing according to the 2D display command is returned to the original processing by the 3D display command.

Further, a case has been described above regarding a case wherein the ODS, menu button, and subtitle are in a one-to-one relation, but in the event that one menu button or subtitle corresponds to multiple ODSs, or in the event that multiple menu buttons or subtitles correspond to one ODS, the above-described "offset information in increments of ODSs" becomes "offset information in increments of menu buttons or increments of subtitles". Also, this holds true for "Offset changing information in increments of ODSs", with offset information being changed in increments of menu buttons at the time of executing set offset commands in increments of buttons.

Twelfth Embodiment

Now, the series of processing described above may be executed by hardware, or may be executed by software.

Figure 78:
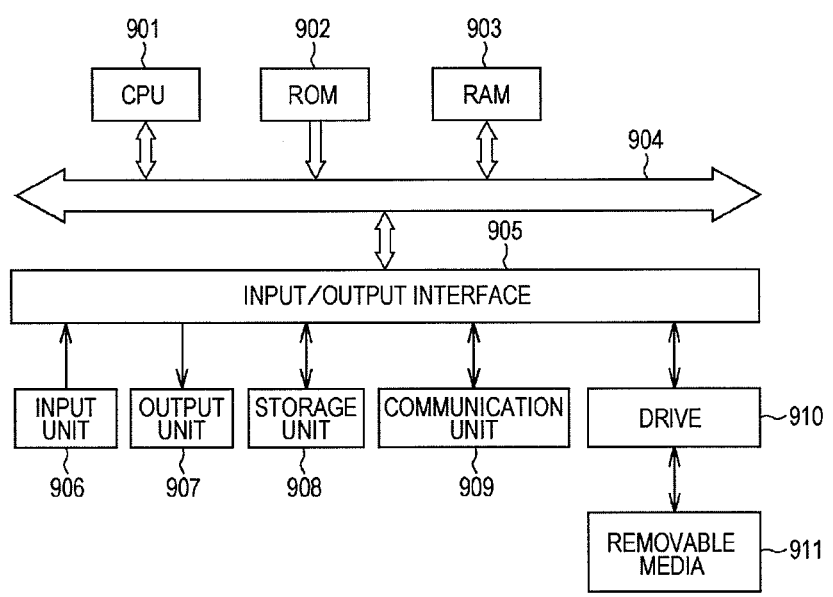
FIG. 78 is a block diagram illustrating a configuration example of a personal computer.

In this case, a personal computer shown in FIG. 78, for example, may be employed as at least one part of the above-described playing device.

In FIG. 78, a CPU (Central Processing Unit) 901 executes various types of processing following programs recoded in ROM (Read Only Memory) 902 or programs loaded from a storage unit 908 to RAM (Random Access Memory) 903. The RAM 903 also stores, as appropriate, data necessary for the CPU 901 to execute various types of processing.

The CPU 901, ROM 902, and RAM 903 are connected to each other via a bus 904. The bus 904 is also connected with an input/output interface 905.

Connected to the input/output interface 905 are an input unit 906 made up of a keyboard, mouse, or the like, an output unit 907 made up of a display or the like, the storage unit 908 made up of a hard disk or the like, and a communication unit 909 configured of a modem, terminal adapter, or the like. The communication unit 909 controls communication performed with another device (not shown) via a network including the Internet.

A drive 910 is also connected to the input/output interface 905 as necessary, to which removable media 911, such as a magnetic disk, optical disc, magento-optical disc, or semiconductor memory or the like, is mounted as suitable, with computer programs read out therefrom being installed to the storage unit 908 as necessary.

In the event of executing the series of processing by software, a program configuring that software is installed into a computer built into dedicated hardware, or a general-purpose personal computer, for example, capable of executing various types of functions by various types of programs being installed thereto, from a network or a recording medium.

A recording medium including such a program is not only configured of the removable media (packaged media) 911 made up of a magnetic disk (including floppy disks), optical disc (including CD-ROM (Compact Disk-Read Only Memory), DVD (Digital Versatile Disk), Blu-ray Disc), magneto-optical disc (including MD (Mini-Disk)), or semiconductor memory or the like, with programs recorded therein to be distributed for providing users with programs separately from the device itself, but also is configured of ROM 902 or a hard disk included in the storage unit 908 or the like, in which the program is recorded.

Note that with the above description, the 3D video generating unit 34 uses PES packets of video data supplied form the PID filter 33 to generate video data for the right eye and for the left eye, but in the event that video data for the right eye and for the left eye is recorded in a disc, processing the same as with the 3D video generating unit 522 may be performed. In this case, the 3D video generating unit 34 decodes PES packets in the video data for the left eye supplied from the PID filter 33 to generate video data for the left eye, and decodes PES packets in the video data for the right eye supplied from the PID filter 33 to generate video data for the right eye.

<Detailed Description of PCS and ICS>

FIG. 79 is a diagram illustrating an example of PCS syntax, and FIG. 80 is a diagram illustrating an example of ICS syntax.

As shown in FIG. 79, described in the PCS is sub-image IDs for each subtitle, offset information made up of offset direction and offset value, and so forth.

Also, as shown in A in FIG. 80, interactive_composition is placed in the ICS, with offset information, button information, etc., being described in the interactive_compositio.

<Detailed Description of 3D Video Generating Unit>

Figure 81:
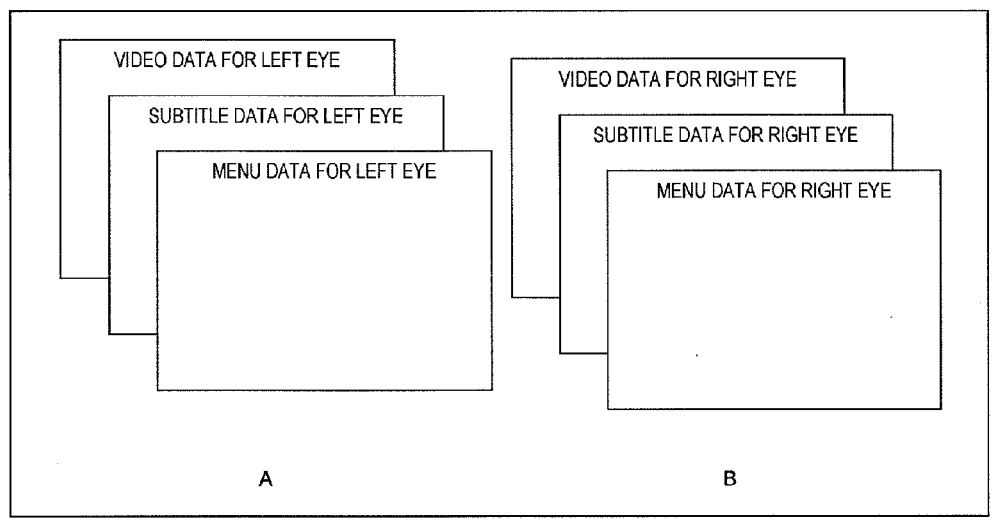
FIG. 81 is a diagram describing about display data for the left eye and for the right eye.

FIG. 81 is a diagram for describing display data for the left eye and the right eye, generated by the 3D display data generating unit 36.

As shown in A in FIG. 81, the 3D display data generating unit 36 synthesizes the three data of video data for the left eye, subtitle data for the left eye, and menu data for the left eye, to generate display data for the left eye. Also, as shown in B in FIG. 81, the 3D display data generating unit 36 synthesizes the three data of video data for the right eye, subtitle data for the right eye, and menu data for the right eye, to generate display data for the right eye. Note that the order of superimposing video data, subtitle data, and menu data for each eye, is, in order from the bottom, video data, subtitle data, and menu data.

Figure 82:
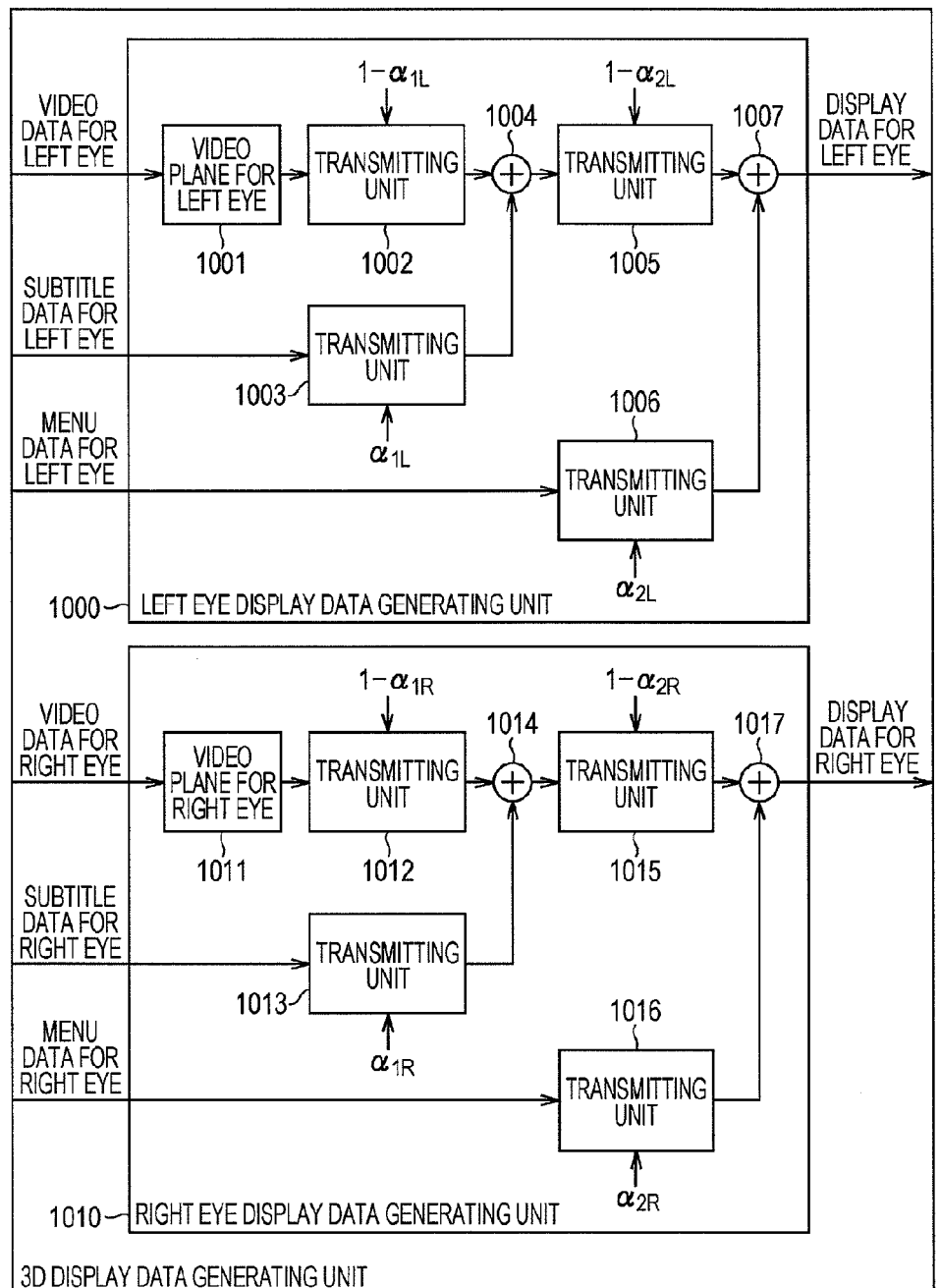
FIG. 82 is a block diagram illustrating a detailed configuration example of a 3D display data generating unit.

FIG. 82 is a block diagram illustrating a detailed configuration example of the 3D display data generating unit 36.

As shown in FIG. 82, the 3D display data generating unit 36 is configured of a left eye display data generating unit 1000 and a right eye display data generating unit 1010.

The left eye display data generating unit 1000 is configured of a video plane for left eye 1001, a transmitting unit 1002, a transmitting unit 1003, a synthesizing unit 1004, a transmitting unit 1005, a transmitting unit 1006, and a synthesizing unit 1007.

The video plane for left eye 1001 holds video data for the left eye supplied from the 3D video generating unit 34 (522).

The transmitting unit 1002 reads out video data for the left eye that is held in the video plane for left eye 1001. The transmitting unit 1002 converts the video data for the left eye that has been read out so that the main image for the left eye is transmits at a preset transmissivity ($1-\alpha_{1L}$). The transmitting unit 1002 supplies the video data for the left eye following conversion to the synthesizing unit 1004.

The transmitting unit 1003 converts subtitle data for the left eye supplied from the subtitle generating unit 41 (111, 181, 231, 431, 531, 631, 791) so that the subtitle for the left eye transmits at a preset transmissivity ($\alpha_{1L}$). The transmitting unit 1003 supplies the subtitle data for the left eye following conversion to the synthesizing unit 1004.

The synthesizing unit 1004 synthesizes the video data for the left eye that is supplied from the transmitting unit 1002 and the subtitle data for the left eye supplied from the transmitting unit 1003, and supplies the data obtained as the result thereof to the transmitting unit 1005.

The transmitting unit 1005 converts the data from the transmitting unit 1004 so that an image corresponding to this data is transmits at a preset transmissivity ($1-\alpha_{2L}$), and supplies to the synthesizing unit 1007.

The transmitting unit 1006 converts menu data for the left eye supplied from the menu generating unit 42 (112, 182, 232, 331, 432, 532, 632, 701, 792) so that the menu for the left eye transmits at a preset transmissivity ($\alpha_{2L}$). The transmitting unit 1006 supplies the menu data for the left eye following conversion to the synthesizing unit 1007.

The synthesizing unit 1007 synthesizes the data that is supplied from the transmitting unit 1005 and the menu data supplied from the transmitting unit 1006, and outputs the data obtained as the result thereof as display data for the left eye.

The right eye display data generating unit 1010 is configured of a video plane for left eye 1011, a transmitting unit 1012, a transmitting unit 1013, a synthesizing unit 1014, a transmitting unit 1015, a transmitting unit 1016, and a synthesizing unit 1017. The processing of each part of the right eye display data generating unit 1010 is the same as the processing of each part of the left eye display data generating unit 1000 except for the object of processing being data for the right eye, so description will be omitted.

Now, description has been made above that subtitle data and menu data for each eye is generated at the 3D graphics generating unit 35 (101, 171, 221, 321, 421, 523, 621, 691, 781), but subtitle data and menu data for each eye may be generated at the 3D display data generating unit 36. In this case, the playing device 20 is configured as shown in FIG. 83, for example.

<Description of Other Playing Device Playing First Embodiment of Disc>

[Configuration Example of Playing Device]

Figure 83:
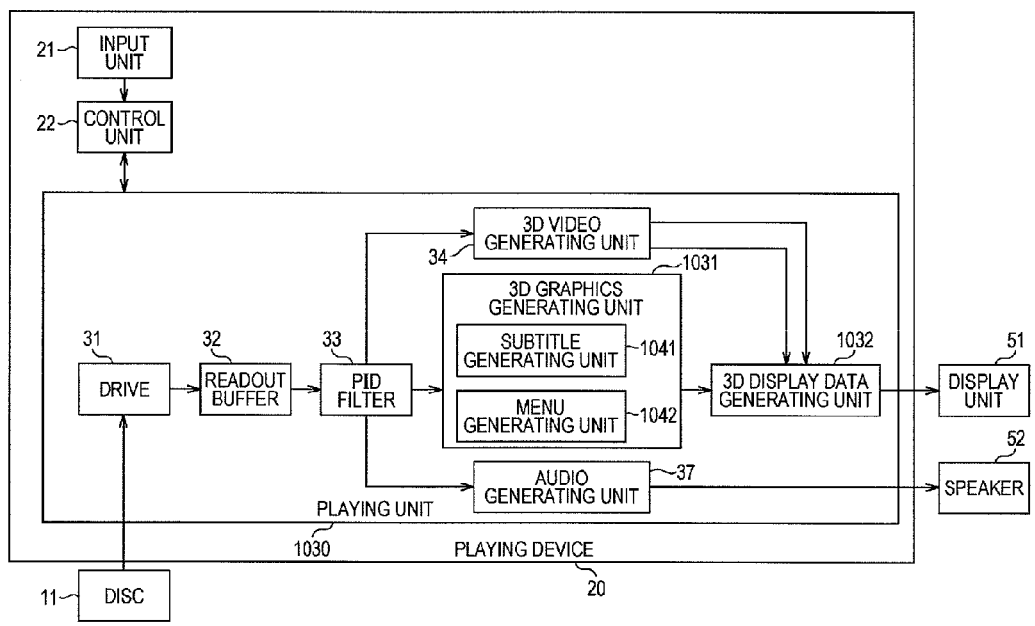
FIG. 83 is a block diagram illustrating another detailed configuration example of the playing device in FIG. 13.

FIG. 83 is a block diagram illustrating another configuration example of the playing device 20 in FIG. 13.

The configuration in FIG. 83 differs from the configuration in FIG. 13 in that a playing unit 1030 is provided instead of the playing unit 23.

The configuration of the playing unit 1030 in FIG. 83 mainly differs from the playing unit 23 in FIG. 13 with regard to the point that a 3D graphics generating unit 1031 and a 3D display data generating unit 1032 are provided instead of the 3D graphics generating unit 35 and 3D display data generating unit 36. Of the configurations shown in FIG. 83, configurations the same as the configurations in FIG. 13 are denoted with the same reference numerals, and redundant description will be omitted as appropriate.

The 3D graphics generating unit 1031 is configured of a subtitle generating unit 1041 and menu generating unit 1042. The subtitle generating unit 1041 generates subtitle data and offset information in increments of screens using the PES packets in subtitle data supplied from the PID filter 33, and supplies this to the 3D display data generating unit 1032. Details of the subtitle generating unit 1041 will be described with reference to FIG. 84 described later.

The menu generating unit 1042 generates menu data and offset information in increments of screens using the PES packets of menu data supplied from the PID filter 33, and supplies to the 3D display data generating unit 1032.

The 3D display data generating unit 1032 generates the subtitle data for the left eye and subtitle data for the right eye as 3D subtitle data, based on the subtitle data and offset information in increments of screens, supplied from the subtitle generating unit 1041. The 3D display data generating unit 1032 also generates subtitle data for the left eye and subtitle data for the right eye as 3D subtitle data, based on the subtitle data and offset information in increments of screens, supplied from the menu generating unit 1042.

In the same way as generating the 3D display data in FIG. 13, the 3D display data generating unit 1032 synthesizes the 3D video data supplied from the 3D video generating unit 34 and the 3D subtitle data and 3*d* subtitle data, for data of each of the left and right eyes. The 3D display data generating unit 1032 supplies the display data for the left eye and display data for the right eye obtained as the result thereof to the display unit 51 as 3D display data. Details of the 3D display data generating unit 1032 will be described with reference to the later-described FIG. 85.

[Detailed Configuration Example of Subtitle Generating Unit]

Figure 84:
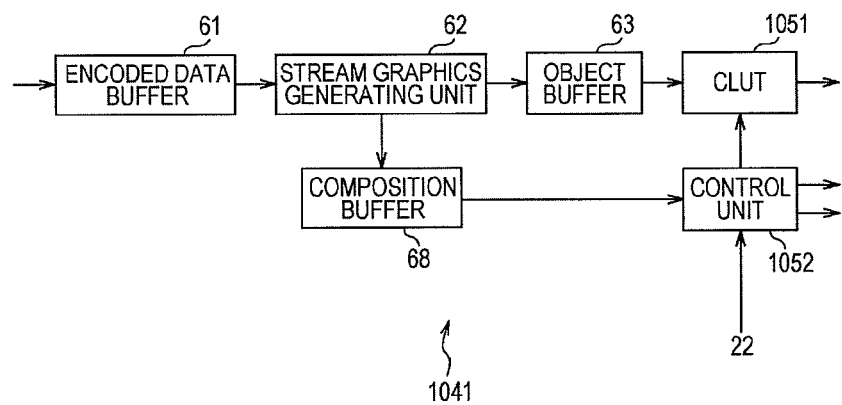
FIG. 84 is a block diagram illustrating a detailed configuration example of the subtitle generating unit in FIG. 83.

FIG. 84 is a block diagram illustrating a detailed configuration example of the subtitle generating unit 1041 in FIG. 83.

The configuration in FIG. 84 mainly differs from the configuration in FIG. 14 with regard to the point that the graphics plane for right eye 65 and the graphics plane for left eye 66 are not provided, and that a CLUT 1051 and control unit 1052 are provided instead of the CLUT 67 and control unit 69. Of the configurations shown in FIG. 84, configurations the same as the configurations in FIG. 14 are denoted with the same reference numerals, and redundant description will be omitted as appropriate.

In the same way as with the CLUT 67 in FIG. 14, based on the PDS supplied from the control unit 1052 the CLUT 1051 of the subtitle generating unit 1041 stores a table correlating the index color and Y, Cr, Cb values. The CLUT 1051 reads out a subtitle object from the object buffer 63, and converts the index color of the subtitle object into image data of Y, Cr, Cb values, based on the table stored therein. The CLUT 1051 then supplies the image data of the subtitle object to the 3D display data generating unit 1032 (FIG. 83) as subtitle data.

The control unit 1052 reads out the offset information in increments of screens, included in the PCS from the composition buffer 68, and supplies this to the 3D generating unit 1032. Also, the control unit 1052 reads out the PDS from the composition buffer 68, and supplies this to the CLUT 1051. Further, the control unit 1052 controls each part following instructions of the control unit 22 (FIG. 83).

The menu generating unit 1042 is configured in the same way as the subtitle generating unit 1041 in FIG. 84, except for the object of processing being menu data instead of subtitle data, so illustration thereof in the drawings is omitted.

[Detailed Configuration Example of 3D Display Data Generating Unit]

Figure 85:
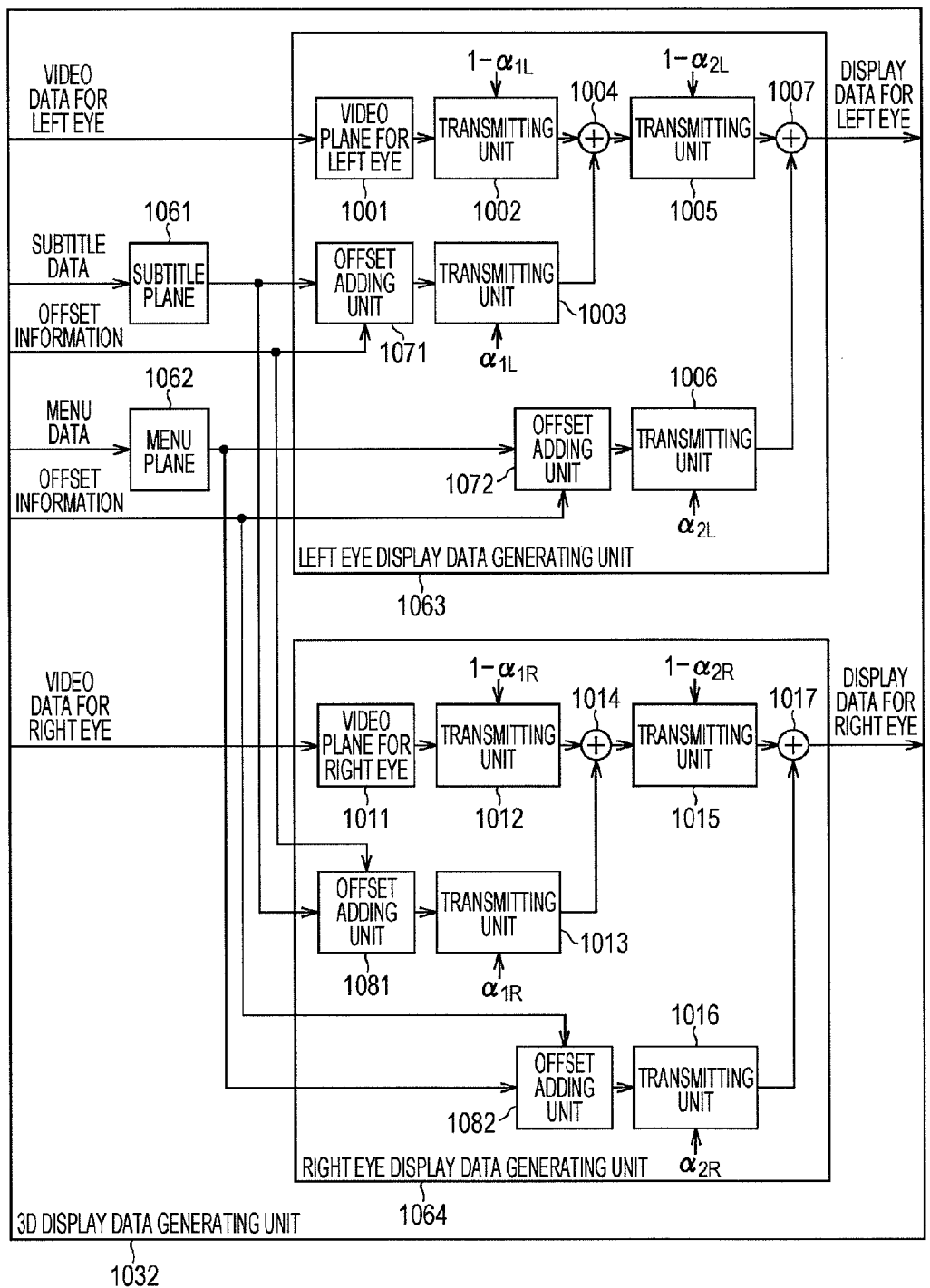
FIG. 85 is a block diagram illustrating a detailed configuration example of the 3D display data generating unit in FIG. 83.

FIG. 85 is a block diagram illustrating a detailed configuration example of the 3D display data generating unit 1032 in FIG. 83.

The 3D display data generating unit 1032 in FIG. 85 is configured of a subtitle plane 1061, a menu plane 1062, a left eye display data generating unit 1063, and a right eye display data generating unit 1064.

The subtitle plane 1061 holds subtitle data supplied from the subtitle generating unit 1041 (FIG. 83) of the 3D graphics generating unit 1031.

The menu plane 1062 holds menu data supplied from the menu generating unit 1042 (FIG. 83) of the 3D graphics generating unit 1031.

The configuration of the left eye display data generating unit 1063 differs from the configuration of the left eye display data generating unit 1000 (FIG. 82) in that an offset adding unit 1071 and offset adding unit 1072 are newly added. Of the configurations shown in FIG. 85, configurations the same as the configurations in FIG. 82 are denoted with the same reference numerals, and redundant description will be omitted as appropriate.

The offset adding unit 1071 reads out subtitle data from the subtitle plane 1061. The offset adding unit 1071 generates subtitle data for the left eye from the subtitle data that has been read out, based on the offset information in increments of screens that is supplied from the subtitle generating unit 1041. Specifically, the offset adding unit 1071 generates subtitle data obtained as the result of shifting subtitles in increments of screens corresponding to the subtitle data that has been read out, by an offset value in the offset direction of the offset information, as subtitle data for the left eye. The offset adding unit 1071 supplies the subtitle data for the left eye to the transmission unit 1003.

The offset adding unit 1072 reads out menu data from the menu plane 1062. The offset adding unit 1072 generates menu data for the left eye from the menu data that has been read out, based on the offset information in increments of screens that is supplied from the menu generating unit 1042. Specifically, the offset adding unit 1072 generates menu data obtained as the result of shifting menu in increments of screens corresponding to the menu data that has been read out, by an offset value in the offset direction of the offset information, as menu data for the left eye. The offset adding unit 1072 supplies the menu data for the left eye to the transmission unit 1006.

The configuration of the right eye display data generating unit 1064 differs from the configuration of the right eye display data generating unit 1010 (FIG. 82) in that an offset adding unit 1081 and offset adding unit 1082 are newly added. Note that the processing of the parts of the right eye display data generating unit 1064 is the same as the parts of the left eye display data generating unit 1063 except for the data for the left eye being replaced with the data for the right eye, so description will be omitted.

Note that the additional condition described in FIG. 52 that the subtitles or menu buttons for each eye must not run over the edge of the screen is provided for not only the second embodiment but also other embodiments as well.

Note that with the present Description, steps describing the program stored in the recording medium include processing executed in time sequence following that order as a matter of course, but is not restricted to being processed in time sequence, and also includes processing executed in parallel or individually.

Also, the present invention can be applied to playing devices which recognize the format of display including display not compatible with 3D display, and thereupon switch to output image signals suitable for the display format.

Further, the present invention can be applied to not only playing devices which play discs, but also playing devices which play broadcast signals of digital broadcasting and signals distributed by IP (Internet Protocol).

Also, the above-described disc may be a disc other than BD-ROM.

Embodiments of the present invention are not restricted to the above-described embodiments, and various modifications may be made without departing from the essence of the present invention.

REFERENCE SIGNS LIST

31 drive
501 disc 510 playing device
542-1 graphics plane for right eye
542-2 graphics plane for left eye
565-1, 565-2 control unit
601 disc
610 playing device
651 control unit
671 disc
680 playing device
712-1 graphics plane for right eye
712-2 graphics plane for left eye
725-1, 725-2 control unit
751 disc
760 playing device
802 graphics plane for right eye
811-1, 811-2, 861 control unit

The invention claimed is:

1. A reproduction apparatus comprising:
a reading unit; and
an output unit,
wherein when data with a data structure in which
image data on an L image for a left eye and an R image for a right eye as sub images in increments of screens, which is used in 3D (3 Dimensional) display of the sub images including captions and a menu button, is included, and
the image data of the L image in increments of screens and the image data of the R image in increments of screens respectively include a same number of PDSs (Palette Definition Segments), with the number of ODSs (Objective Definition Segments) respectively included in the image data of each of the L and R images being different, is reproduced,
the reading unit reads the image data on the L image and the R image in increments of screens, which are contained in the data, and
the output unit generates the L image and the R image in increments of screens based on the same number of PDSs, with the number of ODSs respectively included in the image data of each of the L and R images being different, the generated L and R images being respectively included in the image data of the L image in increments of screens and the image data of the R image in increments of screens, which have been read by the reading unit, and outputs the generated L image and the R image.

2. A reproduction method of a reproduction apparatus for reproducing data with a data structure in which
image data of an L image for a left eye and an R image for a right eye as sub images in increments of screens, which is used in 3D (3 Dimensional) display of the sub images including captions and a menu button, is included, and
the image data of the L image in increments of screens and the image data of the R image in increments of screens respectively include a same number of PDSs (Palette Definition Segments), with the number of ODSs (Objective Definition Segments) respectively included in the image data of each of the L and R images being different,
the method comprising the steps of:
reading the image data on the L image and the R image in increments of screens, which are contained in the data; and
generating the L image and the R image in increments of screens based on the same number of PDSs, with the number of ODSs respectively included in the image data of each of the L and R images being different, the generated L and R images being respectively included in the image data of the L image in increments of screens and the image data of the R image in increments of screens, which have been read in the process of the reading step, and outputting the generated L image and the R image.

3. A recording method comprising the step of:
causing a recording apparatus to record image data, which is configured by an L image for a left eye and an R image for a right eye of a sub image and is used for 3D (3 Dimensional) display of the sub image configured by subtitles or a menu button, in increments of screens in a recording medium such that numbers of PDSs (Palette Definition Segments) respectively included in image data of the L and R images are the same and the number of ODSs (Object Definition Segments) included in the image data of one of the L and R images is permitted to be different from the number of ODSs included in the image data of the other one of the L and R images.

* * * * *